United States Patent
Adib et al.

(10) Patent No.: US 9,988,174 B2
(45) Date of Patent: *Jun. 5, 2018

(54) DELAMINATION RESISTANT GLASS CONTAINERS

(71) Applicant: Corning Incorporated, Corning, NY (US)

(72) Inventors: Kaveh Adib, Corning, NY (US); Paul Stephen Danielson, Dundee, NY (US); James Patrick Hamilton, Horseheads, NY (US); Robert Michael Morena, Lindley, NY (US); John Stephen Peanasky, Big Flats, NY (US); Robert Anthony Schaut, Painted Post, NY (US); Susan Lee Schiefelbein, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 865 days.

This patent is subject to a terminal disclaimer.

(21) Appl. No.: 13/912,457

(22) Filed: Jun. 7, 2013

(65) Prior Publication Data
US 2013/0327740 A1    Dec. 12, 2013

Related U.S. Application Data

(60) Provisional application No. 61/656,998, filed on Jun. 7, 2012.

(51) Int. Cl.
*A61J 1/00* (2006.01)
*B65D 1/02* (2006.01)
(Continued)

(52) U.S. Cl.
CPC ............ *B65D 1/0207* (2013.01); *A61J 1/00* (2013.01); *A61J 1/1468* (2015.05); *C03C 3/087* (2013.01); *C03C 3/091* (2013.01); *C03C 21/002* (2013.01)

(58) Field of Classification Search
CPC ........ B65D 1/0207; C03C 3/091; C03C 3/087
(Continued)

(56) References Cited

U.S. PATENT DOCUMENTS 2,323,643 A * 7/1943 Barton .................... C03C 3/091
                                                                501/66
2,753,304 A    7/1956 Orozco
(Continued)

FOREIGN PATENT DOCUMENTS

CN    1222478 C    10/2005
CN    101585666 A    11/2009
(Continued)

OTHER PUBLICATIONS

Yashchishin et al., "Homogeneity and lamination of sheet glass," L'vov Mechanized Glass Works, Translated from Steklo i Keramika, No. 4, 1978, p. 192-194.*
(Continued)

*Primary Examiner* — Gerard Higgins
(74) *Attorney, Agent, or Firm* — Dinsmore & Shol LLP

(57) ABSTRACT

Embodiments of glass containers resistant to delamination and methods for forming the same are disclosed. According to one embodiment, a delamination resistant glass container may include a glass article having a body extending between an interior surface and an exterior surface. The body defines an interior volume. The body may include an interior region extending from 10 nm below the interior surface of the body
(Continued)

into a thickness of the body. The interior region has a persistent layer homogeneity such that the body is resistant to delamination.

82 Claims, 14 Drawing Sheets

(51) Int. Cl.
  *A61J 1/14* (2006.01)
  *C03C 21/00* (2006.01)
  *C03C 3/087* (2006.01)
  *C03C 3/091* (2006.01)

(58) Field of Classification Search
  USPC ....... 215/379; 65/108, 30.14; 428/212, 34.4, 428/426, 429, 141, 142, 201, 336, 337, 428/34, 34.6, 34.7, 412, 428, 435, 457, 428/159, 161, 164, 181, 195.1, 206, 210, 428/213, 215, 216, 217, 220, 332, 339, 428/343, 345, 355 AC, 355 EN, 355 EP, 428/408, 411.1, 414, 41.1, 41.3, 41.8, 428/423.1, 425.6, 441, 446, 451, 474.4, 428/480, 698, 702, 76
  See application file for complete search history.

(56) References Cited

U.S. PATENT DOCUMENTS

| | | | |
|---|---|---|---|
| 3,577,256 A | 5/1971 | Benford, Jr. et al. |
| 3,607,186 A | 9/1971 | Bognar |
| 3,772,135 A | 11/1973 | Hara et al. |
| 3,811,921 A | 5/1974 | Crawford et al. |
| 3,819,346 A | 6/1974 | Southwick et al. |
| 3,876,410 A | 4/1975 | Scholes |
| 3,926,604 A | 12/1975 | Smay et al. |
| 3,967,995 A | 7/1976 | Fabianic |
| 3,975,175 A | 8/1976 | Foster et al. |
| 4,021,218 A | 5/1977 | Watanabe |
| 4,023,953 A | 5/1977 | Megles, Jr. et al. |
| 4,056,208 A | 11/1977 | Prejean |
| 4,065,317 A | 12/1977 | Baak et al. |
| 4,161,556 A | 7/1979 | Lenard et al. |
| 4,164,402 A | 8/1979 | Watanabe |
| 4,214,886 A | 7/1980 | Shay et al. |
| 4,386,164 A | 5/1983 | Moser |
| 4,636,411 A | 1/1987 | Dubois et al. |
| 4,689,085 A | 8/1987 | Plueddemann |
| 4,860,906 A | 8/1989 | Pellegrini et al. |
| 4,870,034 A | 9/1989 | Kiefer |
| 4,880,895 A | 11/1989 | Higashi et al. |
| 4,882,210 A | 11/1989 | Romberg et al. |
| 5,112,658 A | 5/1992 | Skutnik et al. |
| 5,114,757 A | 5/1992 | Linde et al. |
| 5,230,429 A | 7/1993 | Etheredge, III |
| 5,246,782 A | 9/1993 | Kennedy et al. |
| 5,286,527 A | 2/1994 | Blum et al. |
| 5,326,601 A | 7/1994 | Kawano et al. |
| 5,337,537 A | 8/1994 | Soughan |
| 5,476,692 A | 12/1995 | Ellis et al. |
| 5,498,758 A | 3/1996 | Scholes et al. |
| 5,721,181 A | 2/1998 | Sehgal et al. |
| 5,853,833 A | 12/1998 | Sudo et al. |
| 5,979,714 A | 11/1999 | Bleile et al. |
| 6,013,333 A | 1/2000 | Carson et al. |
| 6,200,658 B1 | 3/2001 | Walther et al. |
| 6,232,428 B1 | 5/2001 | Deets et al. |
| 6,277,950 B1 | 8/2001 | Yang et al. |
| 6,346,315 B1 | 2/2002 | Sawatsky |
| 6,358,519 B1 | 3/2002 | Waterman |
| 6,444,783 B1 | 9/2002 | Dodd et al. |
| 6,537,626 B1 | 3/2003 | Spallek et al. |
| 6,599,594 B1 | 7/2003 | Walther et al. |
| 7,315,125 B2 | 1/2008 | Kass |
| 7,980,096 B2 | 7/2011 | Bartsch |
| 8,234,883 B2 | 8/2012 | Krall, Jr. et al. |
| 8,415,337 B1 | 4/2013 | Krishna |
| 8,518,545 B2 | 8/2013 | Akiba et al. |
| 8,522,575 B2 | 9/2013 | Wada |
| 8,820,119 B2 | 9/2014 | Kuwabara et al. |
| 9,010,150 B2 | 4/2015 | Kuwabara et al. |
| 9,034,442 B2 * | 5/2015 | Chang .................... B65D 25/14 215/12.1 |
| 9,096,461 B2 | 8/2015 | Brix |
| 9,107,805 B2 | 8/2015 | Langsdorf et al. |
| 9,272,946 B2 * | 3/2016 | Chang .................... B65D 25/14 |
| 9,346,707 B2 * | 5/2016 | Danielson ............. B65D 25/14 |
| 9,428,302 B2 * | 8/2016 | Fadeev ................. C03C 17/005 |
| 2004/0096588 A1 | 5/2004 | Brandt |
| 2004/0105985 A1 | 6/2004 | Henze et al. |
| 2005/0061033 A1 | 3/2005 | Petrany et al. |
| 2006/0260360 A1 | 11/2006 | Erhard et al. |
| 2007/0010700 A1 | 1/2007 | Bensmann et al. |
| 2007/0060465 A1 | 3/2007 | Varshneya et al. |
| 2007/0065366 A1 | 3/2007 | Soliani Raschini et al. |
| 2007/0224427 A1 | 9/2007 | Kunita et al. |
| 2007/0293388 A1 | 12/2007 | Zuyev et al. |
| 2008/0121621 A1 | 5/2008 | Stockum et al. |
| 2008/0308444 A1 | 12/2008 | McClain et al. |
| 2009/0048537 A1 | 2/2009 | Lydon et al. |
| 2009/0126404 A1 | 5/2009 | Sakhrani et al. |
| 2009/0155490 A1 | 6/2009 | Bicker et al. |
| 2009/0215607 A1 * | 8/2009 | Dejneka ................. C03C 1/004 501/27 |
| 2009/0220761 A1 * | 9/2009 | Dejneka ................ C03B 17/067 428/220 |
| 2009/0286058 A1 | 11/2009 | Shibata et al. |
| 2010/0009154 A1 | 1/2010 | Allan et al. |
| 2010/0047521 A1 | 2/2010 | Amin et al. |
| 2010/0087307 A1 | 4/2010 | Murata et al. |
| 2010/0089097 A1 | 4/2010 | Brack et al. |
| 2010/0203270 A1 | 8/2010 | Langsdorf et al. |
| 2010/0246016 A1 | 9/2010 | Carlson et al. |
| 2010/0297393 A1 | 11/2010 | Wu |
| 2010/0317506 A1 | 12/2010 | Fechner et al. |
| 2011/0045219 A1 | 2/2011 | Stewart et al. |
| 2011/0062619 A1 | 3/2011 | Leine et al. |
| 2011/0098172 A1 | 4/2011 | Brix |
| 2011/0165393 A1 | 7/2011 | Bayne et al. |
| 2011/0177987 A1 | 7/2011 | Lenting et al. |
| 2011/0186464 A1 | 8/2011 | Carta et al. |
| 2011/0200805 A1 | 8/2011 | Tomamoto et al. |
| 2011/0226658 A1 | 9/2011 | Tata-Venkata et al. |
| 2011/0272322 A1 | 11/2011 | Yamagata et al. |
| 2012/0034435 A1 | 2/2012 | Borrelli et al. |
| 2012/0061342 A1 | 3/2012 | Perrot |
| 2012/0097159 A1 | 4/2012 | Iyer et al. |
| 2012/0148770 A1 | 6/2012 | Rong et al. |
| 2012/0282449 A1 | 11/2012 | Gross |
| 2012/0297829 A1 | 11/2012 | Endo et al. |
| 2013/0011650 A1 | 1/2013 | Akiba et al. |
| 2013/0095261 A1 | 4/2013 | Ahn et al. |
| 2013/0122306 A1 | 5/2013 | Bookbinder et al. |
| 2013/0216742 A1 | 8/2013 | DeMartino et al. |
| 2013/0299380 A1 | 11/2013 | Zambaux et al. |
| 2014/0001143 A1 | 1/2014 | Fadeev et al. |
| 2014/0069202 A1 | 3/2014 | Fisk |
| 2014/0220327 A1 | 8/2014 | Adib et al. |
| 2014/0339194 A1 | 11/2014 | Gu et al. |
| 2015/0107303 A1 | 4/2015 | Bookbinder et al. |
| 2016/0145150 A1 | 5/2016 | Bookbinder et al. |

FOREIGN PATENT DOCUMENTS

| | | |
|---|---|---|
| CN | 201390409 Y | 1/2010 |
| CN | 101717189 | 6/2010 |
| CN | 102050572 A | 5/2011 |
| DE | 2138159 A1 | 2/1973 |
| DE | 4128634 A1 | 3/1993 |
| DE | 29702816 U1 | 4/1997 |
| DE | 102004011009 A1 | 9/2005 |
| DE | 102011085267 A1 | 5/2013 |
| EP | 2031124 A1 | 3/2009 |

(56) References Cited

FOREIGN PATENT DOCUMENTS

| | | |
|---|---|---|
| FR | 2515633 A1 | 5/1983 |
| JP | H01201048 A | 8/1989 |
| JP | H0437632 A | 2/1992 |
| JP | 2001294447 A | 10/2001 |
| JP | 2003128439 A | 5/2003 |
| JP | 2003146699 A | 5/2003 |
| JP | 2010202413 A | 9/2010 |
| JP | 2010274091 A | 12/2010 |
| JP | 2011001253 A | 1/2011 |
| JP | 2012180276 A | 9/2012 |
| RO | 83460 A2 | 3/1984 |
| SU | 722865 A1 | 3/1980 |
| SU | 990700 A | 1/1983 |
| SU | 1025680 A1 | 6/1983 |
| SU | 1293134 A1 | 2/1987 |
| TW | 201113233 A | 4/2011 |
| TW | 201213260 A | 4/2012 |
| WO | 95/10487 A1 | 4/1995 |
| WO | 2007016516 A2 | 2/2007 |
| WO | 2009002660 A2 | 12/2008 |
| WO | 2010129758 A1 | 11/2010 |
| WO | 2011145661 A1 | 11/2011 |
| WO | 2012026290 A1 | 3/2012 |
| WO | 2013063290 A1 | 5/2013 |
| WO | 2013130724 A2 | 9/2013 |
| WO | 2014005030 A1 | 1/2014 |

OTHER PUBLICATIONS

Cerdan-Diaz, et al., "Improving chemical durability and resistance to corrosion/delamination through chemistry enhancement in glass manufacturing," Glass Delamination Scientific Symposium, 2011, Arlington VA, p. 1-29.*
Jannotti et al. "Photoelastic Measurement of High Stress Profiles in Ion-Exchanged Glass", Int. J. Appl. Glass Sci., 2011, vol. 2, p. 275-281.*
De Rosa et al. "Scratch Resistant Polyimide Coatings for Aluminosilicate Glass Surfaces", J. of Adhesion, 2002, vol. 78, p. 113-127.*
International Search Report & Written Opinion dated Oct. 2, 2013 for International Patent Application No. PCT/US2013/044686 filed Jun. 7, 2013. pp. 1-17.
International Search Report & Written Opinion dated Oct. 28, 2013 for International Patent Application No. PCT/US2013/048589 filed Jun. 28, 2013. pp. 1-15.
International Search Report & Written Opinion dated Feb. 26, 2014 for International Patent Application No. PCT/US2013/071437 filed Nov. 22, 2013. pp. 1-12.
International Search Report & Written Opinion dated Feb. 26, 2014 for International Patent Application No. PCT/US2013/071447 filed Nov. 22, 2013. pp. 1-13.
International Search Report & Written Opinion dated Feb. 26, 2014 for International Patent Application No. PCT/US2013/071460 filed Nov. 22, 2013. pp. 1-12.
International Search Report & Written Opinion dated Feb. 26, 2014 for International Patent Application No. PCT/US2013/071473 filed Nov. 22, 2013. pp. 1-13.
International Search Report & Written Opinion dated May 6, 2014 for International Patent Application No. PCT/US2013/071776 filed Nov. 26, 2013. pp. 1-12.
Non-Final Office Action dated Mar. 10, 2014 relating to U.S. Appl. No. 14/052,048, filed Oct. 11, 2013. pp. 1-11.
Non-Final Office Action dated Mar. 20, 2014 relating to U.S. Appl. No. 14/057,697, filed Oct. 18, 2013. pp. 1-14.
Non-Final Office Action dated Sep. 9, 2014 relating to U.S. Appl. No. 14/057,697, filed Oct. 18, 2013. pp. 1-15.
Final Office Action dated Jul. 16, 2014 relating to U.S. Appl. No. 14/052,048, filed Oct. 11, 2013. pp. 1-9.
ASTM, "Standard Specification for Glasses in Laboratory Apparatus," Designation E438-92 (Reapproved 2006). Retrieved from the Internet: <URL: http://enterprise2.astm.org/DOWNLOAD/E438-92R06.1656713-1.pdf>. p. 1.

U. Watjen, et al. "The Certification of a Reference Material for the Determination of the Alkali Leaching From Pharmaceutical Glass Containers IRMM-435", May 4, 2007, XP055114934, Retrieved from the Internet: URL: http://www.irmm.jrc.be/html/reference_materials_catalogue/catalogue/attachments/IRMM-435_report.pdf. pp. 1-46.
U.S. Pharmacopeial Convention Medicines Compendium, "<660> Containers-Glass" [online], (2014). Retrieved from the Internet: <URL: https://mc.usp.org/general-chapters>. pp. 1-5.
European Pharmacopeia, 5th edition, 3.2 Containers, [online]. Retrieved from the Internet: <URL: http://pharmacyebooks.com/2009/09/european-pharmacopoeia-5-0-online.html>. pp. 1-4.
Ciullo, P.A., Industrial Minerals and Their Uses—A Handbook and Formulary. William Andrew Publishing/Noyes, (1996). ISBN: 0-8155-1408-5. Online version available at: <URL: http://app.knovel.com/hotlink/toc/id:kpIMTUAHFB/industrial-minerals-their/industrial-minerals-their>. pp. 1-7.
Plueddemann, Edwin, "Silane Coupling Agents," Springer Science+Business Media, LLC (1982). ISBN: 978-1-4899-0344-0. pp. 1-18.
Non-Final Office Action dated Nov. 14, 2014 relating to U.S. Appl. No. 14/075,605, filed Nov. 8, 2013. pp. 1-9.
Notice of Allowance dated Jan. 7, 2015 relating to U.S. Appl. No. 14/052,048, filed Oct. 11, 2013. pp. 1-10.
Non-Final Office Action dated Jan. 29, 2015 relating to U.S. Appl. No. 13/780,740, filed Feb. 28, 2013. pp. 1-79.
Hawley's Condensed Chemical Dictionary Melting Points, 2007. pp. 1-5.
Non-Final Office Action dated Mar. 4, 2015 relating to U.S. Appl. No. 14/057,697, filed Oct. 18, 2013. pp. 1-12.
Final Office Action dated Jun. 3, 2015 relating to U.S. Appl. No. 14/075,605, filed Nov. 8, 2013. pp. 1-12.
Notice of Allowance dated Jun. 26, 2015 relating to U.S. Appl. No. 14/057,697, filed Oct. 18, 2013. pp. 1-9.
Non-Final Office Action dated Oct. 7, 2015 relating to U.S. Appl. No. 13/827,732, filed Mar. 14, 2013; pp. 1-22.
Non-Final Office Action dated Jul. 14, 2015 relating to U.S. Appl. No. 14/088,556, filed Nov. 25, 2013; pp. 1-17.
Schwarzenbach, et al., "Interferon a-2a interactions on Glass Vial Surfaces Measured by Atomic Force Microscopy", PDS J. Pharmaceutical Science and Technology, vol. 56, No. 2, Mar.-Apr. 2002, pp. 78-89.
Shelby, "Introduction to Glass Science and Technology", Royal Chemistry, Jan. 1, 2005—Technology & Engineering, p. 193.
Jiang, et al., "Novel Mechanism of Glass Delamination in Type 1A Borosilicate Vials Containing Frozen Protein Formulations", PDA Journal of Pharmaceutical Science and Technology, Jul. / Aug. 2013, vol. 67, No. 4, 323-335.
Ennis, et al., "Glass Vials for Small Volume Parenterals: Influence of drug and manufacturing process on glass delamination," Pharmaceutical Development and Technology, 6(3): p. 393-405, (2001).
Guadagnino, et al., "Delamination Propensity of Pharmaceutical Glass Containers by Accelerated Testing with Different Extraction Media," PDA Journal of Pharmaceutical Science and Technology, Mar. / Apr. 2012, vol. 66, No. 2,116-125. DOI: 10.5731/pdajpst.2012.00853.
Iacocca, et al., "Corrosive attack of glass by a pharmaceutical compound," Journal of Materials Science, 42:801-811, Springer Science+Business Media, LLC (2007), DOI: 10.1007/s10853-006-0156-y.
Iacocca, et al., "Factors Affecting the Chemical Durability of Glass Used in the Pharmaceutical Industry," AAPS PharmSciTech, vol. 11, No. 3, pp. 1340-1349, Sep. 2010.
Rupertus, V., "PDA Europe Thanks Universe of Pre-Filled Syringes: Two ways to minimize the delamination risk of glass containers," P&M—EU; PDA Letter, p. 42-23, Jan. 2012.
Schmid, et al., "Glass Delamination: Facts—Prevention—Recommendations", Stevanato Group Market Update, News Issue 5, May 2011, pp. 1-4.
Schmid, et al., "Recommendations on Delamination Risk Mitigation & Prediction for Type I Pharmaceutical Containers Made of Tubing Glass", Nuova Ompi: Glass Division, p. 40-42, Frederick Furness Publishing (2012).

(56) References Cited

OTHER PUBLICATIONS

Schott North America, Inc., "Schott Type 1 plus: SiO2 coating resists delamination" [online], Schott North America, Inc., retrieved from the internet: <URL: http://www.us.schott.com/pharmaceutical_packaging/english/download/flyer_type_i_plus_us.pdf>.

Schwarzenbach, et al., "Topological Structure and Chemical Composition of Inner Surfaces of Borosilicate," PDA Journal of Pharmaceutical Science and Technology, May / Jun. 2004, vol. 58, No. 3, 169-175.

Sloey, et al., "Determining the Delamination Propensity of Pharmaceutical Glass Vials Using a Direct Stress Method," PDA Journal of Pharmaceutical Science and Technology, Jan. / Feb. 2013, vol. 67, No. 1, 35-42. DOI: 10.5731/pdajpst.2013.00900.

U.S. Department of Health & Human Services, "Advisory to Drug Manufactures: Formation of Glass Lamellae in Certain Injectable Drugs" [online] U.S. Food & Drug Administration, Mar. 25, 2011, retrieved from the internet: <URL: http://www.fda.gov/Drugs/DrugSafety/ucm248490.htm>.

Wagner, C., "PDA/FDA Glass Quality Conference: an alternative glass packing solution to reduce delamination risks," [PowerPoint Presentation] PDA/FDA Glass Quality Conference, Washington, D.C., Jun. 4-5, 2012.

Walther, et al., "Pharmaceutical Vials with Extremely High Chemical Inertness" [online], PDA Journal of Pharmaceutical Science and Technology, May / Jun. 2002, vol. 56, No. 3, 124-129 (abstract); retrieved from the internet: <URL: http://journal.pda.org/content/56/3/124.abstract>.

Non-Final Office Action dated Oct. 5, 2016, for U.S. Appl. No. 13/930,647, filed Jun. 28, 2013. pp. 1-30.

Non-Final Office Action dated Oct. 28, 2016, for U.S. Appl. No. 14/949,320, filed Nov. 23, 2015. pp. 1-16.

Rx-360 Consortium; "Highlights from Jun. 2011 Glass Container Delamination Scientific Symposium"; Report published Jul. 9, 2011; pp. 1-13.

Non-Final Office Action dated Feb. 22, 2017, for U.S. Appl. No. 13/827,732, filed Mar. 14, 2013. pp. 1-34.

"Parylene Conformal Coating Specification and Properties", acquired from http://www.nbtc.cornell.edu/sites/default/files/Parylene%20Information%20Sheets.pdf on Dec. 20, 2016.

Non-Final Office Action dated Mar. 9, 2017 for U.S. Appl. No. 15/331,120, filed Oct. 21, 2016; pp. 1-43.

Non-Final Office Action dated Mar. 21, 2017 for U.S. Appl. No. 14/075,630, filed Nov. 8, 2013. pp. 1-35.

Non-Final Office Action dated May 30, 2017 for U.S. Appl. No. 14/075,620, filed Nov. 8, 2013. pp. 1-61.

Non-Final Office Action dated May 31, 2017 for U.S. Appl. No. 14/075,593, filed Nov. 8, 2013. pp. 1-51.

English Translation of Taiwan Official Communication dated Apr. 17, 2017 & Search Report dated Feb. 20, 2017, for TW Patent Application No. 102143473. pp. 1-3.

English Translation of Japanese Office Action dated May 30, 2017 for JP Patent Application No. 2015-520574. pp. 1-9.

Russian 1st Office Action and Search Report and English Translation dated Oct. 27, 2017, for RU Patent Application No. 2015125783. pp. 1-13.

English Translation of Taiwan 2nd Office Action & Search Report dated Dec. 4, 2017, for TW Patent Application No. 102143473. pp. 1-2.

Russian Official Communication and English translation dated Jun. 5, 2017 for RU Patent Application No. 2014154053. pp. 1-9.

Borba s rasslaivaniem stekla v farmatsevticheskoy upakovke (Glass delamination control in a pharmaceutical package). Henning Katte. Glass International, 05. 2012. pp. 25-30.

Taiwan Search Report dated May 20, 2017 for TW Patent Application No. 102143475. pp. 1-2.

Non-Final Office Action dated Jul. 7, 2017 for U.S. Appl. No. 14/949,320, filed Nov. 23, 2015. pp. 1-15.

Russian 1st Office Action and Search Report dated Oct. 25, 2017, for RU Patent Application No. 2015125706. pp. 1-12.

Kitaygorodsky I.I. et al., "Technology of Glass", The state publishing house of literature on construction, architecture and building materials, third edition, revised, Moscow, Russia, 1961.

Japanese 1st Office Action dated Oct. 24, 2017, for Japanese Patent Application No. 2015-545160. pp. 1-8.

Russian 1st Office Action and Search Report and English Translation dated Nov. 10, 2017 for RU Patent Application No. 2015125912. pp. 1-16.

Final Office Action dated Jan. 24, 2018, for U.S. Appl. No. 14/075,620, filed Nov. 8, 2013. pp. 1-41.

Dean et al., "Pharmaceutical Packaging Technology", CRC Press. Nov. 2000. p. 149.

Singapore Search Report & Written Opinion dated Jan. 12, 2016 for SG Patent Application No. 11201408732U. pp. 1-9.

Notice of Allowance dated Jan. 22, 2016 for U.S. Appl. No. 14/088,556, filed Nov. 25, 2013.

Australian first Examination Report dated Mar. 4, 2016 for AU Patent Application No. 2013271436.

Non-Final Offce Action dated Mar. 23, 2016 for U.S. Appl. No. 13/827,732, filed Mar. 14, 2013. pp. 1-28.

Singapore Written Opinion dated Feb. 23, 2016 for SG Patent Application No. 11201504070P. pp. 1-9.

Singapore Written Opinion dated May 4, 2016 for SG Patent Application No. 11201503964W. pp. 1-10.

Karlsson, S. et al., The technology of chemical glass strengthening—a review. Glass Technology: European Journal of Glass Science and Technology A, Apr. 30, 2010, vol. 51, No. 2, pp. 41-54.

Singapore Written Opinion dated May 4, 2016 for SG Patent Application No. 11201504033T. pp. 1-9.

Liu, Y.H. et al., Tunable water-based lubrication behavior of alkyl- and fluoroalkyl-silanes, Chinese Science Bulletin, May 31, 2012, vol. 57, No. 15, pp. 1879-1885. doi: 10.1007/s11434-012-5106-2.

Cichomski, M. et al., Investigation of the structure of fluoroalkylsilanes deposited on alumina surface, Applied Surface Science, Jun. 18, 2012, vol. 258, No. 24, pp. 9849-9855.

Kimble Chase, 2008-2009 Catalog (International Edition), pp. 26-60.

Chinese 1st Office Action & Search Report dated May 20, 2016 for CN Patent Application No. 201380033302.2. pp. 1-17.

\* cited by examiner

DELAMINATION RESISTANT GLASS CONTAINERS

CROSS REFERENCE TO RELATED APPLICATIONS

The present application claims priority to U.S. Provisional Patent Application Ser. No. 61/656,998 filed Jun. 7, 2012 and entitled "De-Lamination Resistant Glass Containers," the entirety or which is incorporated by reference herein.

BACKGROUND

Field

The present specification generally relates to glass containers and, more specifically, to glass containers which are resistant to delamination.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical compositions contained therein. Glasses having suitable chemical durability include those glass compositions within the ASTM standard E438.92 'Type 1a' and 'Type 1b' glass compositions which have a proven history of chemical durability. In general terms, chemically durable glasses are glasses whose constituent components do not dissolve from the glass when the glass is exposed to a solution for extended periods of time.

Although Type 1a and Type 1b glass compositions are commonly used in pharmaceutical packages due to their chemical durability, they do suffer from several deficiencies, including a tendency for the interior surfaces of the pharmaceutical package to shed glass particulates or "de-laminate" following exposure to pharmaceutical solutions.

Accordingly, a need exists for alternative glass containers which exhibit a reduced propensity to delaminate.

SUMMARY

According to one embodiment, a delamination resistant glass container may include a glass article having a glass body extending between an interior surface and an exterior surface and defining an interior volume. The glass article may also include an interior region extending from about 10 nm below the interior surface of the body into a thickness of the body with a persistent layer homogeneity such that the body is resistant to delamination.

In another embodiment, a delamination resistant glass container may include a glass article having a glass body extending between an interior surface and an exterior surface and defining an interior volume, the glass body having a delamination factor less than or equal to 10.

In another embodiment, a delamination resistant glass container may include a glass article having a glass body extending between an interior surface and an exterior surface and defining an interior volume. An interior region may extend from about 10 nm below the interior surface of the body into a thickness of the body and have a persistent layer homogeneity. The glass body may have a delamination factor less than or equal to 10.

In another embodiment, a delamination resistant glass container may include a glass article formed from an ion-exchangeable glass composition. The glass article may have a glass body extending between an interior surface and an exterior surface and defining an interior volume. An interior region may extend from about 10 nm below the interior surface of the body into a thickness of the body and have a thickness $T_{LR}$ of at least about 100 nm. An extrema in a layer concentration of each constituent component of the ion-exchangeable glass composition in the interior region may be greater than or equal to about 80% and less than or equal to about 120% of a bulk concentration of a same constituent component in the glass composition at a mid-point of the thickness of the glass body when the glass container is in an as-formed condition.

In another embodiment, a delamination resistant glass container may include a glass article having a glass body extending between an interior surface and an exterior surface and defining an interior volume. A surface region may extend over an entire interior surface of the glass container and have a depth extending from the interior surface of the glass container into a thickness of the body. The surface region may have a persistent surface homogeneity such that the glass body is resistant to delamination.

In another embodiment, a delamination resistant glass container may include a glass article having a glass body extending between an interior surface and an exterior surface and defining an interior volume. A surface region may extend over an entire interior surface of the glass container and have a depth extending from the interior surface of the glass container into a thickness of the body. The surface region may have a persistent surface homogeneity. The glass body may have a delamination factor less than or equal to 10.

In another embodiment, a delamination resistant glass container may include a glass article formed from an ion-exchangeable glass composition. The glass article may have a glass body extending between an interior surface and an exterior surface and defining an interior volume. A surface region may extend over an entire interior surface of the glass container to a depth of about 10 nm from the interior surface of the glass container. For a discrete point on the interior surface of the glass container, an extrema of a surface concentration of each constituent component in the surface region at the discrete point may be greater than or equal to about 70% and less than or equal to about 130% of a same constituent component in the surface region at any second discrete point on the interior surface of the glass container when the glass container is in an as-formed condition.

In another embodiment, a method for forming a delamination resistant glass container includes providing stock material formed from a delamination resistant glass composition. The stock material is shaped into a glass article having a glass body extending between an interior surface and an exterior surface and defining an interior volume such that the glass body has an interior region extending from about 10 nm below the interior surface of the body into a thickness of the body. The interior region may have a persistent layer homogeneity such that the glass body is resistant to delamination.

In another embodiment, a method for forming a delamination resistant glass container includes providing stock material formed from a delamination resistant glass composition. The stock material may be shaped into a glass article having a glass body extending between an interior surface and an exterior surface and defining an interior volume such that the glass body has a surface region extending over an entire interior surface of the body. The surface region may have a depth extending from the interior surface of the body into a thickness of the body and a persistent surface homogeneity such that the body is resistant to delamination.

In another embodiment, a delamination resistant glass container may include a glass article having a body extending between an interior surface and an exterior surface. The body may include a wall portion that transitions to a floor portion through a heel portion. The body may also include an interior region in at least the heel portion of the body which extends from about 10 nm below the interior surface of the body into a thickness of the body. The interior region may have a persistent layer homogeneity such that the body is resistant to delamination.

In another embodiment, a delamination resistant glass container may include a glass article having a body extending between an interior surface and an exterior surface and comprising a wall portion that transitions to a floor portion through a heel portion. A surface region may extend over at least a surface of the heel portion and have a depth extending from the interior surface of the glass container into a thickness of the body. The surface region may have a persistent surface homogeneity such that at least the heel portion is resistant to delamination.

Additional features and advantages of the glass container described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
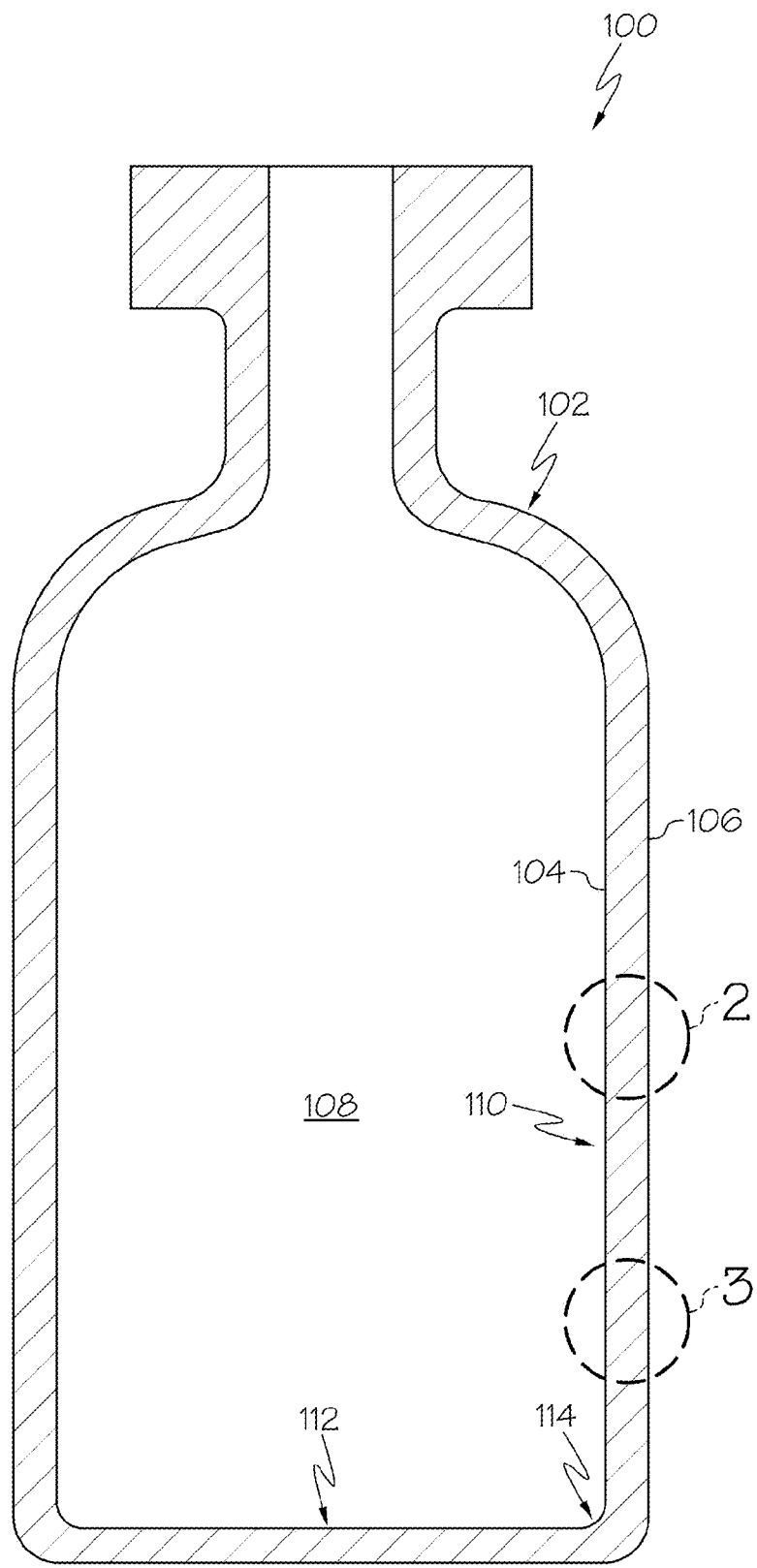
FIG. 1 schematically depicts a cross section of a glass container, specifically a glass vial, according to one or more embodiments described herein.

Reference will now be made in detail to various embodiments of glass containers which have improved resistance to delamination, examples of which are illustrated in the accompanying drawings. Whenever possible, the same reference numerals will be used throughout the drawings to refer to the same or like parts. In one embodiment, a glass container with an improved resistance to delamination may include a glass body extending between an interior surface and an exterior surface, the glass body defining an interior volume. The glass body may be formed from an alkali aluminosilicate glass or alkaline-earth aluminosilicate glass. A layer concentration of each constituent component in the glass composition in an interior region extending from the interior surface of the glass body to a depth of at least 100 nm from the interior surface may be greater than or equal to 90% and less than or equal to 110% of a bulk concentration of a same constituent component in the glass composition at a mid-point of a thickness of the glass body when the glass container is in an as-formed condition. The glass containers and properties of the glass containers will be described in more detail herein with specific reference to the appended drawings.

In the embodiments of the glass compositions described herein, the concentration of constituent components (e.g., $SiO_2$, $Al_2O_3$, $B_2O_3$ and the like) are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.05 mol. %.

The term "chemical durability," as used herein, refers to the ability of the glass composition to resist degradation upon exposure to specified chemical conditions. Specifically, the chemical durability of the glass compositions described herein was assessed according to 3 established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 entitled "Glass Containers For Pharmaceutical Use" which assess the durability of the surface of the glass.

Conventional glass containers or glass packages for containing pharmaceutical compositions are generally formed from glass compositions which are known to exhibit chemical durability and low thermal expansion, such as alkali borosilicate glasses. While alkali borosilicate glasses exhibit good chemical durability, container manufacturers have observed silica-rich glass flakes dispersed in the solution contained in the glass containers. This phenomena is referred to as delamination. Delamination occurs particularly when the solution has been stored in direct contact with the glass surface for long time periods (months to years). Accordingly, a glass which exhibits good chemical durability may not necessarily be resistant to delamination.

Delamination refers to a phenomenon in which glass particles are released from the surface of the glass following a series of leaching, corrosion, and/or weathering reactions. In general, the glass particles are silica-rich flakes of glass which originate from the interior surface of the package as a result of the leaching of modifier ions into a solution contained within the package. These flakes may generally be from about 1 nm to about 2 μm thick with a width greater than about 50 μm. As these flakes are primarily composed of silica, the flakes generally do not further degrade after being released from the surface of the glass.

It has heretofore been hypothesized that delamination is due to the phase separation which occurs in alkali borosilicate glasses when the glass is exposed to the elevated temperatures used for reforming the glass into a container shape.

However, it is now believed that the delamination of the silica-rich glass flakes from the interior surfaces of the glass containers is due to the compositional characteristics of the glass container in its as-formed condition. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the interior surfaces of the glass container). For example, as one end of a glass tube is closed to form the bottom or floor of the container, borate species may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures may have silica-rich surfaces. Other areas of the container which are amenable to boron deposition may have a boron-rich layer at the surface. Areas amenable to boron deposition which are at a temperature greater than the anneal point of the glass composition but less than the hottest temperature the glass is subjected to during reformation can lead to boron incorporation on the surface of the glass. Solutions contained in the container may leach the boron from the boron-rich layer. As the boron-rich layer is leached from the glass, a high silica glass network (gel) remains which swells and strains during hydration and eventually spalls from the surface.

One conventional solution to delamination is to coat the interior surface of the body of the glass container with an inorganic coating, such as $SiO_2$. This coating may have a thickness from about 100 nm to 200 nm and prevents the contents of the container from contacting the interior surface of the body and causing delamination. However, the application of such coatings may be difficult and require additional manufacturing and/or inspection steps, thereby increasing the overall cost of container manufacture. Further, if the contents of the container penetrate the coating and contact the interior surface of the body, such as through a discontinuity in the coating, the resultant delamination of the glass body may cause portions of the coating to detach from the interior surface of the body.

The glass containers described herein have homogenous compositional characteristics in the as-formed condition and, as such, exhibit an improved resistance to delamination without requiring any additional processing.

Referring now to FIG. 1, a delamination resistant glass container 100 for storing a pharmaceutical composition is schematically depicted in cross section. The glass container 100 generally comprises a glass article with a glass body 102. The glass body 102 extends between an interior surface 104 and an exterior surface 106 and generally encloses an interior volume 108. In the embodiment of the glass container 100 shown in FIG. 1, the glass body 102 generally comprises a wall portion 110 and a floor portion 112. The wall portions 110 and the floor portion 112 may generally have a thickness in a range from about 0.5 mm to about 3.0 mm. The wall portion 110 transitions into the floor portion 112 through a heel portion 114. The interior surface 104 and floor portion 112 are uncoated (i.e., they do not contain any inorganic coatings or organic coatings and, as such, the contents stored in the interior volume 108 of the glass container 100 are in direct contact with the glass from which the glass container 100 is formed. While the glass container 100 is depicted in FIG. 1 as having a specific shape form (i.e., a vial), it should be understood that the glass container 100 may have other shape forms, including, without limitation, vacutainers, cartridges, syringes, syringe barrels, ampoules, bottles, flasks, phials, tubes, beakers, or the like.

In some embodiments described herein, the glass body 102 is strengthened such as by ion-exchange strengthening. Accordingly, it should be understood that the glass body 102 is formed from a glass composition which includes at least one alkali oxide constituent. The glass body 102 may have a compressive stress of greater than or equal to about 300 MPa or even greater than or equal to about 350 MPa at the surface of the glass. In embodiments, the compressive stress may be greater than or equal to about 400 MPa at the surface of the glass or even greater than or equal to about 450 MPa at the surface of the glass. In some embodiments, the compressive stress may be greater than or equal to about 500 MPa at the surface of the glass or even greater than or equal to about 550 MPa at the surface of the glass. In still other embodiments, the compressive stress may be greater than or equal to about 650 MPa at the surface of the glass or even greater than or equal to about 750 MPa at the surface of the glass. The compressive stress in the glass body 102 generally extends to a depth of layer (DOL) of at least about 10 µm. In some embodiments, the glass body 102 may have a depth of layer greater than about 25 µm or even greater than about 50 µm. In some other embodiments, the depth of the layer may be up to about 75 µm or even about 100 µm. The ion-exchange strengthening may be performed in a molten salt bath maintained at temperatures from about 350° C. to about 500° C. To achieve the desired compressive stress, the glass container in as-formed condition may be immersed in the salt bath for less than about 30 hours or even less than about 20 hours. In embodiments, the container may be immersed for less than about 15 hours or even for less than about 12 hours. In other embodiments, the container may be immersed for less than about 10 hours. For example, in one embodiment the glass container is immersed in a 100% $KNO_3$ salt bath at about 450° C. for about 5 hours to about 8 hours in order to achieve the desired depth of layer and compressive stress while maintaining the chemical durability of the glass composition.

Figure 2:
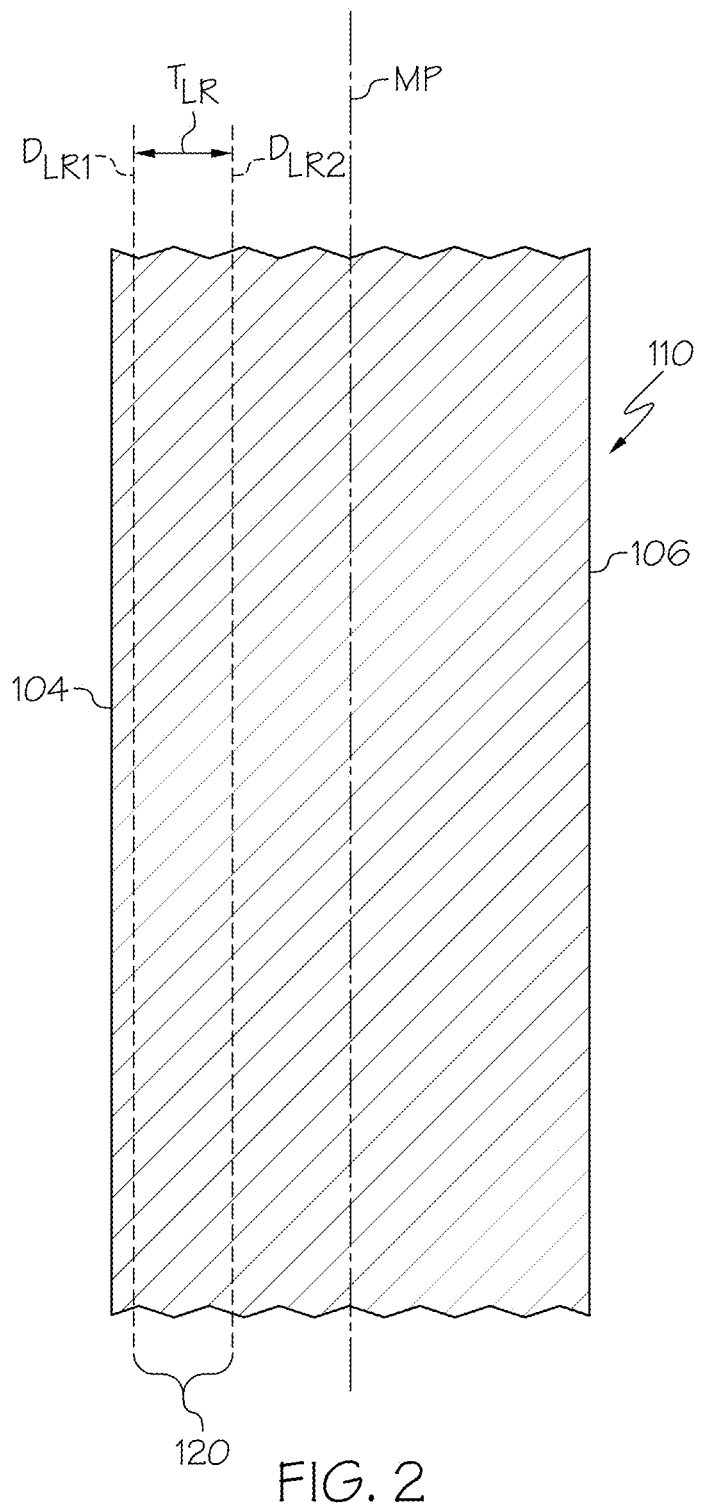
FIG. 2 schematically depicts a portion of the sidewall of the glass container of FIG. 1.

Referring now to FIGS. 1 and 2, the glass containers described herein have a homogenous composition through the thickness of the glass body 102 in each of the wall, heel, and floor portions. Specifically, FIG. 2 schematically depicts a partial cross section of a wall portion 110 of the glass container 100. The glass body 102 of the glass container 100 has an interior region 120 which extends from about 10 nm below the interior surface 104 of the glass container 100 (indicated in FIG. 2 as $D_{LR1}$) into the thickness of the wall portion 110 to a depth $D_{LR2}$ from the interior surface 104 of the glass container. The interior region extending from about 10 nm below the interior surface 104 is differentiated from the composition in the initial 5-10 nm below the surface due to experimental artifacts. At the start of a DSIMS analysis, the initial 5-10 nm is not included in the analysis because of three concerns: variable sputtering rate of ions from the surface as a result of adventitious carbon, establishment of a steady state charge in part due to the variable sputtering rate, and mixing of species while establishing a steady state sputtering condition. As a result, the first two data points of the analysis are excluded, as shown in the exemplary plots of FIGS. 8 and 9. Accordingly, it should be understood that the interior region 120 has a thickness $T_{LR}$ which is equal to the $D_{LR2}-D_{LR1}$. The glass composition within the interior region has a persistent layer homogeneity which, in conjunction with the thickness $T_{LR}$ of the interior region, is sufficient to prevent delamination of the glass body following long term exposure to a solution contained in the interior volume of the glass container. In some embodiments, the thickness $T_{LR}$ is at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

While the interior region is described herein above as extending from 10 nm below the interior surface 104 of the glass container 100 into the thickness of the wall portion 110 to a depth $D_{LR2}$ from the interior surface 104 of the glass container, it should be understood that other embodiments are possible. For example, it is hypothesized that, despite the experimental artifacts noted above, the interior region with the persistent layer homogeneity may actually extend from the interior surface 104 of the glass container 100 into the thickness of the wall portion. Accordingly, in some embodiments, the thickness $T_{LR}$ may extend from the interior surface to the depth $D_{LR2}$. In these embodiments, the thickness $T_{LR}$ may be at least about 100 nm. In some embodiments, the thickness $T_{LR}$ is at least about 150 nm. In some other embodiments, the thickness $T_{LR}$ is at least about 200 nm or even about 250 nm. In some other embodiments, the thickness $T_{LR}$ is at least about 300 nm or even about 350 nm. In yet other embodiments, the thickness $T_{LR}$ is at least about 500 nm. In some embodiments, the interior region 120 may extend to a thickness $T_{LR}$ of at least about 1 µm or even at least about 2 µm.

In the embodiments described herein, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass body (i.e., at a point along the midpoint line MP which evenly bisects the glass body between the interior surface 104 and the exterior surface 106) by an amount which would result in delamination of the glass body upon long term exposure to a solution contained within the glass container. In the embodiments described herein, the persistent layer homogeneity in the interior region of the glass body is such that an extrema (i.e., the minimum or maximum) of a layer concentration of each of the constituent components of the glass composition in the interior region 120 is greater than or equal to about 80% and less than or equal to about 120% of the same constituent component at a midpoint of a thickness of the glass body when the glass container 100 is in as-formed condition. In other embodiments, the persistent layer homogeneity in the interior region of the glass body is such that the extrema of the layer concentration of each of the constituent components of the glass composition in the interior region 120 is greater than or equal to about 90% and less than or equal to about 110% of the same constituent component at the midpoint of the thickness of the glass body when the glass container 100 is in as-formed condition. In still other embodiments, the persistent layer homogeneity in the interior region of the glass body is such that the extrema of the layer concentration of each of the constituent components of the glass composition in the interior region 120 is greater than or equal to about 92% and less than or equal to about 108% of the same constituent component at the midpoint of the thickness of the glass body when the glass container 100 is in as-formed condition. In some embodiments, the persistent layer homogeneity is exclusive of constituent components of the glass composition which are present in an amount less than about 2 mol. %.

The term "as-formed condition," as used herein, refers to the composition of the glass container 100 after the glass container has been formed from glass stock but prior to the container being exposed to any additional processing steps, such as ion-exchange strengthening, coating, ammonium sulfate treatment or the like. In the embodiments described herein, the layer concentration of the constituent components in the glass composition is determined by collecting a composition sample through the thickness of the glass body in the area of interest using dynamic secondary ion mass spectroscopy. In the embodiments described herein, the composition profile is sampled from areas of the interior surface 104 of the glass body 102. The sampled areas have a maximum area of 1 mm². This technique yields a compositional profile of the species in the glass as a function of depth from the interior surface of the glass body for the sampled area.

Forming the glass container with a persistent layer homogeneity as described above, generally improves the resistance of the glass container to delamination. Specifically, providing an interior region which is homogenous in composition (i.e., the extrema of the concentration of the constituent components in the interior region is within +/−20% of the same constituent components at the midpoint of the thickness of the glass body) avoids the localized concentration of constituent components of the glass composition which may be susceptible to leaching which, in turn, mitigates the loss of glass particles from the interior surface of the glass container in the event that these constituent components are leached from the glass surface.

As noted herein, the container in as-formed condition is free from coatings, including inorganic and/or organic coatings applied to the interior surface of the of the glass body. Accordingly, it should be understood that the body of the glass container is formed from a substantially unitary composition which extends from the interior surface of the body to a depth of at least 250 nm or even at least 300 nm. The term "unitary composition" refers to the fact that the glass from which the portion of the body extending from the interior surface into the thickness of the body to a depth of at least 250 nm or even at least than 300 nm is a single composition of material as compared to a coating material applied to another material of either the same or different composition. For example, in some embodiments, the body of the container may be constructed from a single glass composition. In another embodiment, the body of the container may be constructed from a laminated glass such that the interior surface of the body has a unitary composition which extends from the interior surface to a depth of at least 250 nm or even at least 300 nm. The glass container may include an interior region which extends from either the interior surface or from 10 nm below the interior surface to a depth of at least 100 nm, as noted above. This interior region may have a persistent layer homogeneity.

Figure 3:
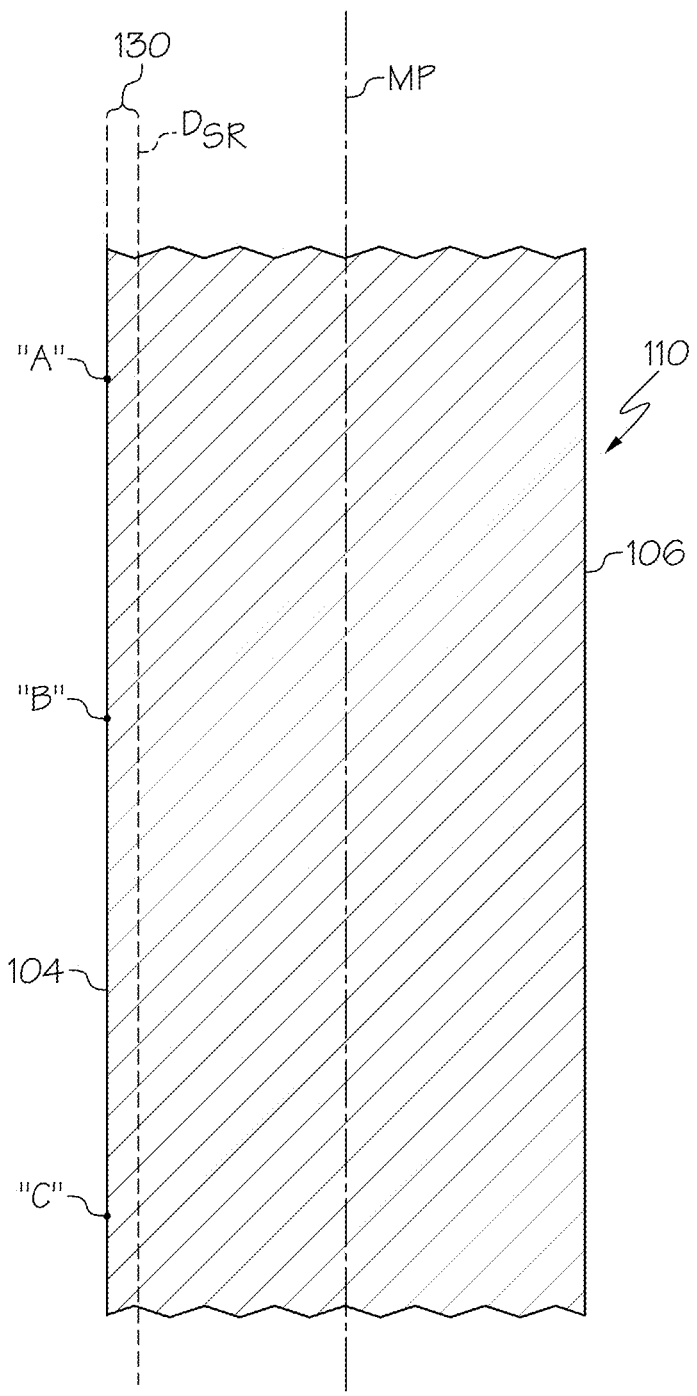
FIG. 3 schematically depicts a portion of the sidewall of the glass container of FIG. 1.

Referring now to FIGS. 1 and 3, the glass containers described herein may also have a homogenous surface composition over the interior surface 104 of the glass body 102 including in the wall, heel, and floor portions. FIG. 3 schematically depicts a partial cross section of a wall portion 110 of the glass container 100. The glass container 100 has a surface region 130 which extends over the entire interior surface of the glass container. The surface region 130 has a depth $D_{SR}$ which extends from the interior surface 104 of the glass container 100 into a thickness of the glass body towards the exterior surface. Accordingly, it should be understood that the surface region 130 has a thickness $T_{SR}$ which is equal to the depth $D_{SR}$. In some embodiments, the surface region extends to a depth $D_{SR}$ of at least about 10 nm from the interior surface 104 of the glass container 100. In some other embodiments, the surface region 130 may extend to a depth $D_{SR}$ of at least about 50 nm. In some other embodiments, the surface region 130 may extend to a depth $D_{SR}$ from about 10 nm to about 50 nm. Accordingly, it should be understood that the surface region 130 extends to a shallower depth than the interior region 120. The glass composition of the surface region has a persistent surface homogeneity which, in conjunction with the depth $D_{SR}$ of the interior region, is sufficient to prevent delamination of the glass body following long term exposure to a solution contained in the interior volume of the glass container.

In the embodiments described herein, the phrase "persistent surface homogeneity" means that the concentration of the constituent components (e.g., $SiO_2$, $Al_2O_3$, $Na_2O$, etc.) of the glass composition at a discrete point in the surface region do not vary from the concentration of the same constituent components at any second discrete point in the surface region by an amount which would result in delamination of the glass body upon long term exposure to a solution contained within the glass container. In the embodiments described herein, the persistent surface homogeneity in the surface region is such that, for a discrete point on the interior surface 104 of the glass container, the extrema (i.e., the minimum or maximum) of the surface concentration of each of the constituent components in the surface region 130 at a discrete point is greater than or equal to about 70% and less than or equal to about 130% of the same constituent components in the surface region 130 at any second discrete point on the interior surface 104 of the glass container 100 when the glass container 100 is in as-formed condition. For example, FIG. 3 depicts three discrete points (A, B, and C) on the interior surface 104 of the wall portion 110. Each point is separated from an adjacent point by at least about 3 mm. The extrema of the surface concentration of each of the constituent components in the surface region 130 at point "A" is greater than or equal to about 70% and less than or equal to about 130% of the same constituent components in the surface region 130 at points "B" and "C". When referring to the heel portion of the container, the discrete points may be approximately centered at the apex of the heel with adjacent points located at least 3 mm from the apex of the heel along the floor portion of the container and along the wall portion of the container, the distance between the points being limited by the radius of the vial and the height of the sidewall (i.e., the point where the sidewall transitions to the shoulder of the vial.

In some embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 75% and less than or equal to about 125% of the same constituent component in the surface region 130 at any second discrete point on the interior surface 104 of the glass container 100 when the glass container 100 is in as-formed condition. In some other embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 80% and less than or equal to about 120% of the same constituent component in the surface region 130 at any second discrete point on the interior surface 104 of the glass container 100 when the glass container 100 is in as-formed condition. In still other embodiments, the persistent surface homogeneity in the surface region is such that the extrema of the surface concentration of each of the constituent components of the glass composition in the surface region 130 for any discrete point on the interior surface 104 of the glass container 100 is greater than or equal to about 85% and less than or equal to about 115% of the same constituent component in the surface region 130 at any second discrete point on the interior surface 104 of the glass container 100 when the glass container 100 is in as-formed condition. In the embodiments described herein, the surface concentration of the constituent components of the glass composition in the surface region is measured by photoelectron spectroscopy. In some embodiments, the persistent surface homogeneity in the surface region is exclusive of constituent components of the glass composition which are present in an amount less than about 2 mol. %.

The homogeneity of the surface concentration of the glass constituent components in the surface region 130 is generally an indication of the propensity of the glass composition to de-laminate and shed glass particles from the interior surface 104 of the glass container 100. When the glass composition has a persistent surface homogeneity in the surface region 130 (i.e., when the extrema of the surface concentration of the glass constituent components in the surface region 130 at a discrete point on the interior surface 104 are within +/−30% of the same constituent components in the surface region 130 at any second discrete point on the interior surface 104), the glass composition has improved resistance to delamination.

It should now be understood that the glass containers described herein have a persistent layer homogeneity and/or a persistent surface homogeneity, each of which improves the resistance of the glass containers to delamination. The persistent layer homogeneity and/or the persistent surface homogeneity are present not only in the sidewall portions of the glass containers, but also in the heel and floor portions of the glass container such that the surfaces of the glass container bounding the interior volume are resistant to delamination.

As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions. In order to assess the long-term resistance of the glass container to delamination, an accelerated delamination test was utilized. The test was performed on both ion-exchanged and non-ion-exchanged glass containers. The test consisted of washing the glass container at room temperature for 1 minute and depyrogenating the container at about 320° C. for 1 hour. Thereafter a solution of 20 mM glycine with a pH of 10 in water is placed in the glass container to 80-90% fill, the glass container is closed, and rapidly heated to 100° C. and then heated from 100° C. to 121° C. at a ramp rate of 1 deg/min at a pressure of 2 atmospheres. The glass container and solution are held at this temperature for 60 minutes, cooled to room temperature at a rate of 0.5 deg./min and the heating cycle and hold are repeated. The glass container is then heated to 50° C. and held for ten or more days for elevated temperature conditioning. After heating, the glass container is dropped from a distance of at least 18" onto a firm surface, such as a laminated tile floor, to dislodge any flakes or particles that are weakly adhered to the inner surface of the glass container. The distance of the drop may be scaled appropriately to prevent larger sized vials from fracturing on impact.

Thereafter, the solution contained in the glass container is analyzed to determine the number of glass particles present per liter of solution. Specifically, the solution from the glass container is directly poured onto the center of a Millipore Isopore Membrane filter (Millipore #ATTP02500 held in an assembly with parts #AP1002500 and #M000025A0) attached to vacuum suction to draw the solution through the filter within 10-15 seconds for 5 mL. Thereafter, another 5 mL of water was used as rinse to remove buffer residue from the filter media. Particulate flakes are then counted by differential interference contrast microscopy (DIC) in the reflection mode as described in "Differential interference contrast (DIC) microscopy and modulation contrast microscopy" from Fundamentals of light microscopy and digital imaging. New York: Wiley-Liss, pp 153-168. The field of view is set to approximately 1.5 mm×1.5 mm and particles larger than 50 microns are counted manually. There are 9 such measurements made in the center of each filter membrane in a 3×3 pattern with no overlap between images. If larger areas of the filter media are analyzed, results can be normalized to equivalent area (i.e., 20.25 mm$^2$). The images collected from the optical microscope are examined with an image analysis program (Media Cybernetic's ImagePro Plus version 6.1) to measure and count the number of glass flakes present. This was accomplished as follows: all of the features within the image that appeared darker than the background by simple grayscale segmentation were highlighted; the length, width, area, and perimeter of all of the highlighted features that have a length greater than 25 micrometers are then measured; any obviously non-glass particles are then removed from the data; the measurement data is then exported into a spreadsheet. Then, all of the features greater than 25 micrometers in length and brighter than the background are extracted and measured; the length, width, area, perimeter, and X-Y aspect ratio of all of the highlighted features that have a length greater than 25 micrometers are measured; any obviously non-glass particles are removed from the data; and the measurement data is appended to the previously exported data in the spreadsheet. The data within the spreadsheet is then sorted by feature length and broken into bins according to size. The reported results are for features greater than 50 micrometers in length. Each of these groups were then counted and the counts reported for each of the samples.

A minimum of 100 mL of solution is tested. As such, the solution from a plurality of small containers may be pooled to bring the total amount of solution to 100 mL. For containers having a volume greater than 10 mL, the test is repeated for a trial of 10 containers formed from the same glass composition under the same processing conditions and the result of the particle count is averaged for the 10 containers to determine an average particle count. Alternatively, in the case of small containers, the test is repeated for a trial of 10 vials, each of which is analyzed and the particle count averaged over the multiple trials to determine an average particle count per trial. Averaging the particle count over multiple containers accounts for potential variations in the delamination behavior of individual containers. Table 1 summarizes some non-limiting examples of sample volumes and numbers of containers for testing:

TABLE 1

Table of Exemplary Test Specimens

| Nominal Vial Capacity (mL) | Vial Max Volume (mL) | Minimum Solution per Vial (mL) | Number of Vials in a Trial | Number of Trials | Total Solution Tested (mL) |
|---|---|---|---|---|---|
| 2.0 | 4.0 | 3.2 | 10 | 4 | 128 |
| 3.5 | 7.0 | 5.6 | 10 | 2 | 112 |
| 4.0 | 6.0 | 4.8 | 10 | 3 | 144 |
| 5.0 | 10.0 | 8.0 | 10 | 2 | 160 |
| 6.0 | 10.0 | 8.0 | 10 | 2 | 160 |
| 8.0 | 11.5 | 9.2 | 10 | 2 | 184 |
| 10.0 | 13.5 | 10.8 | 10 | 1 | 108 |
| 20.0 | 26.0 | 20.8 | 10 | 1 | 208 |
| 30.0 | 37.5 | 30.0 | 10 | 1 | 300 |
| 50.0 | 63.0 | 50.4 | 10 | 1 | 504 |

It should be understood that the aforementioned test is used to identify particles which are shed from the interior wall(s) of the glass container due to delamination and not tramp particles present in the container from forming processes or particles which precipitate from the solution enclosed in the glass container as a result of reactions between the solution and the glass. Specifically, delamination particles may be differentiated from tramp glass particles based on the aspect ratio of the particle (i.e., the ratio of the maximum length of the particle to the thickness of the particle, or a ratio of the maximum and minimum dimensions). Delamination produces particulate flakes or lamellae which are irregularly shaped and typically have a maximum length greater than about 50 µm but often greater than about 200 µm. The thickness of the flakes is usually greater than about 100 nm and may be as large as about 1 µm. Thus, the minimum aspect ratio of the flakes is typically greater than about 50. The aspect ratio may be greater than about 100 and sometimes greater than about 1000. In contrast, tramp glass particles will generally have a low aspect ratio which is less than about 3. Accordingly, particles resulting from delamination may be differentiated from tramp particles based on aspect ratio during observation with the microscope. Other common non-glass particles include hairs, fibers, metal particles, plastic particles, and other contaminants and are thus excluded during inspection. Validation of the results can be accomplished by evaluating interior regions of the tested containers. Upon observation, evidence of skin corrosion/pitting/flake removal, as described in "Nondestructive Detection of Glass Vial Inner Surface Morphology with Differential Interference Contrast Microscopy" from Journal of Pharmaceutical Sciences 101(4), 2012, pages 1378-1384, is noted.

In the embodiments described herein, the number of particles present following accelerated delamination testing may be utilized to establish a delamination factor for the set of vials tested. In the embodiments described herein, trials of glass containers which average less than 10 glass particles with a minimum length of about 50 µm and an aspect ratio of greater than about 50 per trial following accelerated delamination testing are considered to have a delamination factor of 10. In the embodiments described herein, trials of glass containers which average less than 9 glass particles with a minimum length of about 50 µm and an aspect ratio of greater than about 50 per trial following accelerated delamination testing are considered to have a delamination factor of 9. In the embodiments described herein, trials of glass containers which average less than 8 glass particles with a minimum length of about 50 µm and an aspect ratio of greater than about 50 per trial following accelerated delamination testing are considered to have a delamination factor of 8. In the embodiments described herein, trials of glass containers which average less than 7 glass particles with a minimum length of about 50 µm and an aspect ratio of greater than about 50 per trial following accelerated delamination testing are considered to have a delamination factor of 7. In the embodiments described herein, trials of glass containers which average less than 6 glass particles with a minimum length of about 50 µm and an aspect ratio of greater than about 50 per trial following accelerated delamination testing are considered to have a delamination factor of 6. In the embodiments described herein, trials of glass containers which average less than 5 glass particles with a minimum length of about 50 µm and an aspect ratio of greater than about 50 per trial following accelerated delamination testing are considered to have a delamination factor of 5. In the embodiments described herein, trials of glass containers which average less than 4 glass particles with a minimum length of about 50 µm and an aspect ratio of greater than about 50 per trial following accelerated delamination testing are considered to have a delamination factor of 4. In the embodiments described herein, trials of glass containers which average less than 3 glass particles with a minimum length of about 50 µm and an aspect ratio of greater than about 50 per trial following accelerated delamination testing are considered to have a delamination factor of 3. In the embodiments described herein, trials of glass containers which average less than 2 glass particles with a minimum length of about 50 µm and an aspect ratio of greater than about 50 per trial following accelerated delamination testing are considered to have a delamination factor of 2. In the embodiments described herein, trials of glass containers which average less than 1 glass particle with a minimum length of about 50 µm and an aspect ratio of greater than about 50 per trial following accelerated delamination testing are considered to have a delamination factor of 1. In the embodiments described herein, trials of glass containers which have 0 glass particles with a minimum length of about 50 µm and an aspect ratio of greater than about 50 per trial following accelerated delamination testing are considered to have a delamination factor of 0. Accordingly, it should be understood that the lower the delamination factor, the better the resistance of the glass container to delamination. In the embodiments described herein, the glass containers have a delamination factor of 10 or lower (i.e., a delamination factor of 3, 2, 1 or 0).

Glass containers having the characteristics described hereinabove (i.e., homogenous compositions over the interior surface and through the thickness as well as resistance to delamination) are obtained by forming the glass containers from glass compositions in which the constituent components of the glass composition form species with relatively low vapor pressures (i.e., species with a low volatility) at the temperatures required to reform the glass containers from glass stock into the desired container shape. Because these constituent components form species with relatively low vapor pressures at the reforming temperatures, the constituent components are less likely to volatilize and evaporate from the surfaces of the glass, thereby forming a glass container with a compositionally homogenous surface over the interior of the glass container and through the thickness of the glass container.

Certain constituent components of the glass composition may be sufficiently volatile at the glass forming and reforming temperatures which, in turn, may lead to compositional heterogeneities and subsequent delamination. Forming and reforming temperatures of the glass composition generally correspond to the temperatures at which the glass composition has a viscosity in the range from about 200 poise to about 100 kilopoise. Accordingly, in some embodiments, the glass compositions from which the glass containers are formed are free from constituent components which form species that volatilize significantly (i.e., form gas phase species with equilibrium partial pressures greater than about $10^{-3}$ atm) at temperatures corresponding to a viscosity in the range from about 200 poise to about 100 kilopoise. In some embodiments, the glass compositions from which the glass containers are formed are free from constituent components which volatilize significantly at temperatures corresponding to a viscosity in the range from about 1 kilopoise to about 50 kilopoise. In some other embodiments, the glass compositions from which the glass containers are formed are free from constituent components which volatilize significantly at temperatures corresponding to a viscosity in the range from about 1 kilopoise to about 20 kilopoise. In some other embodiments, the glass compositions from which the glass containers are formed are free from constituent components which volatilize significantly at temperatures corresponding to a viscosity in the range from about 1 kilopoise to about 10 kilopoise. Without wishing to be bound by theory, compounds which volatilize significantly under these conditions include, without limitation, boron and compounds of boron, phosphorous and compounds of phosphorous, zinc and compounds of zinc, fluorine and compounds of fluorine, chlorine and compounds of chlorine, tin and compounds of tin, and sodium and compounds of sodium.

In the embodiments described herein, the glass containers are generally formed from alkali aluminosilicate glass compositions or alkaline-earth aluminosilicate glass compositions. As noted hereinabove, boron containing species in the glass are highly volatile at the elevated temperatures used for glass forming and reforming which leads to delamination of the resultant glass container. Moreover, glass compositions containing boron are also susceptible to phase separation, as noted above. Accordingly, in the embodiments described herein, the boron concentration in the glass compositions from which the glass containers are formed is limited to mitigate both delamination and phase separation. In some embodiments, the glass compositions from which the glass containers are formed includes less than or equal to about 1.0 mol. % of oxides of boron and/or compounds containing boron, including, without limitation, $B_2O_3$. In some of these embodiments, the concentration of oxides of boron and/or compounds containing boron in the glass composition may be less than or equal to about 0.5 mol. %, less than or equal to about 0.4 mol. % or even less than or equal to about 0.3 mol. %. In some of these embodiments, the concentration of oxides of boron and/or compounds containing boron in the glass composition may be less than or equal to about 0.2 mol. % or even less than or equal to about 0.1 mol. %. In some other embodiments, the glass compositions are substantially free from boron and compounds containing boron.

Phosphorous, like boron, generally forms species in the glass composition which are highly volatile at the elevated temperatures used for glass forming and reforming. As such, phosphorous in the glass composition can lead to compositional heterogeneities in the finished glass container which, in turn, may lead to delamination. Accordingly, in the embodiments described herein, the concentration of phosphorous and compounds containing phosphorous (such as $P_2O_5$ or the like) in the glass compositions from which the glass containers are formed is limited to mitigate delamination. In some embodiments, the glass compositions from which the glass containers are made includes less than or equal to about 0.3 mol. % of oxides of phosphorous and/or compounds containing phosphorous. In some of these embodiments, the concentration of oxides of phosphorous and/or compounds containing phosphorous in the glass composition may be less than or equal to about 0.2 mol. % or even less than or equal to about 0.1 mol. %. In some other embodiments, the glass compositions are substantially free from phosphorous and compounds containing phosphorous.

Zinc, like boron and phosphorous, generally forms species in the glass composition which are highly volatile at the elevated temperatures used for glass forming and reforming. As such, zinc in the glass composition can lead to compositional heterogeneities in the finished glass container which, in turn, may lead to delamination. Accordingly, in the embodiments described herein, the concentration of zinc and compounds containing zinc (such as ZnO or the like) in the glass compositions from which the glass containers are formed is limited to mitigate delamination. In some embodiments, the glass compositions from which the glass containers are made includes less than or equal to about 0.5 mol. % of oxides of zinc and/or compounds containing zinc. In some other embodiments, the glass compositions from which the glass containers are made includes less than or equal to about 0.3 mol. % of oxides of zinc and/or compounds containing zinc. In some of these embodiments, the concentration of oxides of zinc or compounds containing zinc in the glass composition may be less than or equal to about 0.2 mol. % or even less than or equal to about 0.1 mol. %. In some other embodiments, the glass compositions are substantially free from zinc and compounds containing zinc.

Lead and bismuth also form species in the glass composition which are highly volatile at the elevated temperatures used for glass forming and reforming. Accordingly, in the embodiments described herein, the concentration of lead, bismuth, compounds containing lead, and compounds containing bismuth in the glass compositions from which the glass containers are formed is limited to mitigate delamination. In some embodiments, oxides of lead, oxides of bismuth, compounds containing lead and/or compounds containing bismuth, are each present in the glass compositions in concentrations of less than or equal to about 0.3 mol. %. In some of these embodiments, oxides of lead, oxides of bismuth, compounds containing lead and/or, compounds containing bismuth are each present in the glass compositions in concentrations of less than or equal to about 0.2 mol. % or even concentrations of less than about 0.1 mol. %. In some other embodiments, the glass compositions are substantially free from lead and/or bismuth and compounds containing lead and/or bismuth.

Species containing chlorine, fluorine, and oxides of tin, are also highly volatile at the elevated temperatures used for glass forming and reforming. Accordingly, in the embodiments described herein, chlorine, fluorine, and oxides of tin and compounds containing tin, chlorine, or fluorine, are present in the glass compositions in concentrations which do not affect the resistance to delamination of the resultant glass. Specifically, chlorine, fluorine, and oxides of tin and compounds containing tin, chlorine, or fluorine, are present in the glass compositions from which the glass containers are formed in concentrations less than or equal to about 0.5 mol. % or even less than or equal to about 0.3 mol. %. In some embodiments, the glass compositions are substantially free from tin, chlorine, and fluorine, and compounds containing tin, chlorine, or fluorine.

The glass compositions from which the containers are formed are not phase separated when the glass container is in the as-formed condition. The term "phase separated," as used herein, refers to the separation of the glass composition into separate phases with each phase having different compositional characteristics. For example, alkali borosilicate glasses are generally known to phase separate at elevated temperatures (such as the forming and reforming temperatures) into a boron-rich phase and a silica-rich phase. In the embodiments described herein, the concentration of oxides of boron in the glass compositions is sufficiently low (i.e., less than or equal to about 0.3 mol %) such that the glass compositions do not undergo phase separation when the glass container is in as-formed condition.

The chemical durability of the glass is not generally degraded by the ion-exchange process and, as such, reference to the chemical durability of the glass includes both before and after ion-exchange unless otherwise specified. The glass compositions from which the glass containers are formed are chemically durable and resistant to degradation as determined by the ISO 720 standard. The ISO 720 standard is a measure of the resistance of the glass to degradation in distilled water (i.e., the hydrolytic resistance of the glass). In brief, the ISO 720 standard protocol utilizes crushed grass grains which are placed in contact with 18 MΩ water under autoclave conditions (121° C., 2 atm) for 30 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 720 standard is broken into individual types. Type HGA1 is indicative of up to 62 μg extracted equivalent of $Na_2O$; Type HGA2 is indicative of more than 62 μg and up to 527 μg extracted equivalent of $Na_2O$; and Type HGA3 is indicative of more than 527 μg and up to 930 μg extracted equivalent of $Na_2O$. The glass compositions described herein have an ISO 720 type HGA2 hydrolytic resistance with some embodiments having a type HGA1 hydrolytic resistance.

The glass compositions from which the glass containers are formed are also chemically durable and resistant to degradation as determined by the ISO 719 standard. The ISO 719 standard is a measure of the resistance of the glass to degradation in distilled water (i.e., the hydrolytic resistance of the glass). In brief, the ISO 719 standard protocol utilizes crushed glass grains which are placed in contact with 18 MΩ water at a pressure of 2 atm and a temperature of 98° C. for 60 minutes. The solution is then titrated colorimetrically with dilute HCl to neutral pH. The amount of HCl required to titrate to a neutral solution is then converted to an equivalent of $Na_2O$ extracted from the glass and reported in μg of glass with smaller values indicative of greater durability. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 type HGB2 hydrolytic resistance with some embodiments having a type HGB1 hydrolytic resistance.

With respect to the USP <660> test and/or the European Pharmacopeia 3.2.1 test, the glass containers described herein have a Type 1 chemical durability. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the interior surface of the glass containers.

It should be understood that, when referring to the above referenced classifications according to ISO 719 and ISO 720, a glass composition or glass article which has a specified classification "or better" means that the performance of the glass composition is as good as or better than the specified classification. For example, a glass article which has an ISO 719 hydrolytic resistance of "HGB2" or better may have an ISO 719 classification of either HGB2 or HGB1.

The delamination resistant glass containers are formed by providing a stock material formed from a delamination resistant glass composition, such as glass tubing, glass sheet or the like, and shaping the delamination resistant glass composition into a glass container using conventional shaping techniques such that the glass container has at least one of a persistent surface homogeneity, a persistent layer homogeneity, a delamination factor of 1 and/or combinations thereof.

In the embodiments described herein, the glass containers are formed from glass compositions which have a temperature at which the viscosity of the glass is 1000 poise at a temperature of less than or equal to about 1700° C. (i.e., the 1000 poise temperature), which aids in reforming the glass into its final container shape without the need for excessively high temperatures which may promote further volatilization of certain species in the glass. As described further herein, higher $SiO_2$ concentrations improve the chemical durability of the glass but diminish the formability of the glass. Accordingly, the high $SiO_2$ glass compositions may be formulated with constituents which lower the viscosity of the glass while maintaining the chemical durability. In some embodiments, the 1000 poise temperature may be less than or equal to about 1675° C. or even less than or equal to about 1650° C. In some other embodiments, the 1000 poise temperature may be less than or equal to about 1625° C. or even less than or equal to about 1600° C.

In a first exemplary embodiment, the glass containers are formed from a delamination resistant glass composition such as the alkali aluminosilicate glass compositions described in U.S. patent application Ser. No. 13/660,450 filed Oct. 25, 2012 and entitled "Glass Compositions With Improved Chemical And Mechanical Durability", the entirety of which is incorporated herein by reference. This first exemplary glass composition generally includes a combination of $SiO_2$, $Al_2O_3$, at least one alkaline earth oxide, and one or more alkali oxides, such as $Na_2O$ and/or $K_2O$. In some embodiments of this first exemplary glass composition, the glass composition may be free from boron and compounds containing boron. The combination of these components enables a glass composition which is resistant to chemical degradation and is also suitable for chemical strengthening by ion exchange. In some embodiments this exemplary glass composition may further comprise minor amounts of one or more additional oxides such as, for example, $SnO_2$, $ZrO_2$, $ZnO$, $TiO_2$, $As_2O_3$ or the like. These components may be added as fining agents and/or to further enhance the chemical durability of the glass composition.

In embodiments of this first exemplary glass composition, $SiO_2$ is the largest constituent of the composition and, as such, is the primary constituent of the resulting glass network. $SiO_2$ enhances the chemical durability of the glass and, in particular, the resistance of the glass composition to decomposition in acid and the resistance of the glass composition to decomposition in water. Accordingly, a high $SiO_2$ concentration is generally desired. In the embodiments described herein, the glass composition generally comprises $SiO_2$ in an amount greater than or equal to about 67 mol. % and less than or equal to about 80 mol. % or even less than or equal to about 78 mol. %. In some embodiments, the amount of $SiO_2$ in the glass composition may be greater than about 68 mol. %, greater than about 69 mol. % or even greater than about 70 mol. %. In some other embodiments, the amount of $SiO_2$ in the glass composition may be greater than about 72 mol. %, greater than about 73 mol. % or even greater than about 74 mol. %. For example, in some embodiments, the glass composition may include from about 68 mol. % to about 80 mol. % or even to about 78 mol. % $SiO_2$. In some other embodiments the glass composition may include from about 69 mol. % to about 80 mol. % or even to about 78 mol. % $SiO_2$. In some other embodiments the glass composition may include from about 70 mol. % to about 80 mol. % or even to about 78 mol. % $SiO_2$. In still other embodiments, the glass composition comprises $SiO_2$ in an amount greater than or equal to about 70 mol. % and less than or equal to about 78 mol. %. In some embodiments, $SiO_2$ may be present in the glass composition in an amount from about 72 mol. % to about 78 mol. %. In some other embodiments, $SiO_2$ may be present in the glass composition in an amount from about 73 mol. % to about 78 mol. %. In other embodiments, $SiO_2$ may be present in the glass composition in an amount from about 74 mol. % to about 78 mol. %. In still other embodiments, $SiO_2$ may be present in the glass composition in an amount from about 70 mol. % to about 76 mol. %.

Embodiments of this first exemplary glass composition may further include $Al_2O_3$. $Al_2O_3$, in conjunction with alkali oxides present in the glass composition such as $Na_2O$ or the like, improves the chemical durability and the susceptibility of the glass to ion exchange strengthening. In the embodiments described herein, $Al_2O_3$ is present in the glass compositions in X mol. % while the alkali oxides are present in the glass composition in Y mol. %. The ratio Y:X in the glass compositions described herein is greater than 1 in order to facilitate the melting behavior and aforementioned susceptibility to ion exchange strengthening. Specifically, the diffusion coefficient or diffusivity D of the glass composition relates to the rate at which alkali ions penetrate into (and out of) the glass surface during ion exchange. Glasses which have a ratio Y:X greater than about 0.9 or even greater than about 1 have a greater diffusivity than glasses which have a ratio Y:X less than about 0.9. Glasses in which the alkali ions have a greater diffusivity can obtain a greater depth of layer for a given ion exchange time and ion exchange temperature than glasses in which the alkali ions have a lower diffusivity. Moreover, as the ratio of Y:X increases, the strain point, anneal point, and softening point of the glass decrease, such that the glass is more readily formable. In addition, for a given ion exchange time and ion exchange temperature, it has been found that compressive stresses induced in glasses which have a ratio Y:X greater than about 0.9 and less than or equal to about 2 are generally greater than those generated in glasses in which the ratio Y:X is less than about 0.9 or greater than about 2. Accordingly, in some embodiments, the ratio of Y:X is greater than about 0.9 or even greater than about 1. In some embodiments, the ratio of Y:X is greater than about 0.9, or even greater than about 1, and less than or equal to about 2. In still other embodiments, the ratio of Y:X may be greater than or equal to about 1.3 and less than or equal to about 2.0 in order to maximize the amount of compressive stress induced in the glass for a specified ion exchange time and a specified ion exchange temperature.

However, if the amount of $Al_2O_3$ in the glass composition is too high, the resistance of the glass composition to acid attack is diminished. Accordingly, the glass compositions described herein generally include $Al_2O_3$ in an amount greater than or equal to about 2 mol. % and less than or equal to about 10 mol. %. In some embodiments, the amount of $Al_2O_3$ in the glass composition is greater than or equal to about 4 mol. % and less than or equal to about 8 mol. %. In some other embodiments, the amount of $Al_2O_3$ in the glass composition is greater than or equal to about 5 mol. % to less than or equal to about 7 mol. %. In some other embodiments, the amount of $Al_2O_3$ in the glass composition is greater than or equal to about 6 mol. % to less than or equal to about 8 mol. %. In still other embodiments, the amount of $Al_2O_3$ in the glass composition is greater than or equal to about 5 mol. % to less than or equal to about 6 mol. %.

The glass compositions of this first exemplary embodiment may also include one or more alkali oxides such as $Na_2O$ and/or $K_2O$. The alkali oxides facilitate the ion exchangeability of the glass composition and, as such, facilitate chemically strengthening the glass. The alkali oxide may include one or more of $Na_2O$ and $K_2O$. The alkali oxides are generally present in the glass composition in a total concentration of Y mol. %. In some embodiments described herein, Y may be greater than about 2 mol. % and less than or equal to about 18 mol. %. In some other embodiments, Y may be greater than about 8 mol. %, greater than about 9 mol. %, greater than about 10 mol. % or even greater than about 11 mol. %. For example, in some embodiments described herein Y is greater than or equal to about 8 mol. % and less than or equal to about 18 mol. %. In still other embodiments, Y may be greater than or equal to about 9 mol. % and less than or equal to about 14 mol. %.

The ion exchangeability of the glass composition of this first exemplary embodiment is primarily imparted to the glass composition by the amount of the alkali oxide $Na_2O$ initially present in the glass composition prior to ion exchange. Accordingly, in the embodiments of the glass compositions described herein, the alkali oxide present in the glass composition includes at least $Na_2O$. Specifically, in order to achieve the desired compressive strength and depth of layer in the glass composition upon ion exchange strengthening, the glass compositions include $Na_2O$ in an amount from about 2 mol. % to about 15 mol. %. In some embodiments the glass composition includes at least about 8 mol. % of $Na_2O$. For example, the concentration of $Na_2O$ may be greater than about 9 mol. %, greater than about 10 mol. % or even greater than about 11 mol. %. In some embodiments, the concentration of $Na_2O$ may be greater than or equal to about 9 mol. % or even greater than or equal to about 10 mol. %. For example, in some embodiments the glass composition may include $Na_2O$ in an amount greater than or equal to about 9 mol. % and less than or equal to about 15 mol. % or even greater than or equal to about 9 mol. % and less than or equal to about 13 mol. %.

As noted above, the alkali oxide in the first exemplary glass composition may further include $K_2O$. As the amount of $K_2O$ present in the first exemplary glass composition increases, the compressive stress obtainable through ion exchange decreases as result of the exchange of potassium and sodium ions. Accordingly, it is desirable to limit the amount of $K_2O$ present in the glass composition. In some embodiments, the amount of $K_2O$ is greater than or equal to 0 mol. % and less than or equal to about 3 mol. %. In some embodiments, the amount of $K_2O$ is less or equal to about 2 mol. % or even less than or equal to about 1.0 mol. %. In embodiments where the glass composition includes $K_2O$, the $K_2O$ may be present in a concentration greater than or equal to about 0.01 mol. % and less than or equal to about 3.0 mol. % or even greater than or equal to about 0.01 mol. % and less than or equal to about 2.0 mol. %. In some embodiments, the amount of $K_2O$ present in the glass composition is greater than or equal to about 0.01 mol. % and less than or equal to about 1.0 mol. %. Accordingly, it should be understood that $K_2O$ need not be present in the glass composition. However, when $K_2O$ is included in the glass composition, the amount of $K_2O$ is generally less than about 3 mol. %.

In the embodiments described herein, the glass compositions may include at least one alkaline earth oxide constituent. The alkaline earth oxides present in the first exemplary glass composition improve the meltability of the glass batch materials and increase the chemical durability of the glass composition. In the glass compositions described herein, the total mol. % of alkaline earth oxides present in the glass compositions is generally less than the total mol. % of alkali oxides present in the glass compositions in order to improve the ion exchangeability of the glass composition. In the embodiments described herein, the glass compositions generally include from about 3 mol. % to about 13 mol. % of alkaline earth oxide. In some of these embodiments, the amount of alkaline earth oxide in the glass composition may be from about 4 mol. % to about 8 mol. % or even from about 4 mol. % to about 7 mol. %.

The alkaline earth oxide in the first exemplary glass composition may include MgO, CaO, SrO, BaO or combinations thereof. For example, in the embodiments of the first exemplary glass composition described herein the alkaline earth oxide includes MgO. MgO is present in the glass composition in an amount which is greater than or equal to about 3 mol. % and less than or equal to about 8 mol. % MgO. In some embodiments, MgO may be present in the glass composition in an amount which is greater than or equal to about 3 mol. % and less than or equal to about 7 mol. % or even greater than or equal to 4 mol. % and less than or equal to about 7 mol. %.

In some embodiments of the first exemplary glass composition, the alkaline earth oxide may further include CaO. In these embodiments CaO is present in the glass composition in an amount from about 0 mol. % to less than or equal to about 6 mol. %. For example, the amount of CaO present in the glass composition may be less than or equal to about 5 mol. %, less than or equal to about 4 mol. %, less than or equal to about 3 mol. %, or even less than or equal to about 2 mol. %. In some of these embodiments, CaO may be present in the glass composition in an amount greater than or equal to about 0.1 mol. % and less than or equal to about 1.0 mol. %. For example, CaO may be present in the glass composition in an amount greater than or equal to about 0.2 mol. % and less than or equal to about 0.7 mol. % or even in an amount greater than or equal to about 0.3 mol. % and less than or equal to about 0.6 mol. %.

In the embodiments of this first exemplary glass composition, the glass compositions are generally rich in MgO, (i.e., the concentration of MgO in the glass composition is greater than the concentration of the other alkaline earth oxides in the glass composition including, without limitation, CaO). Forming the glass composition such that the glass composition is MgO-rich improves the hydrolytic resistance of the resultant glass, particularly following ion exchange strengthening. Moreover, glass compositions which are MgO-rich generally exhibit improved ion exchange performance relative to glass compositions which are rich in other alkaline earth oxides. Specifically, glasses formed from MgO-rich glass compositions generally have a greater alkali diffusivity than glass compositions which are rich in other alkaline earth oxides, such as CaO. The greater alkali diffusivity enables the formation of a deeper depth of layer in the glass. MgO-rich glass compositions also enable a higher compressive stress to be achieved in the surface of the glass compared to glass compositions which are rich in other alkaline earth oxides such as CaO. In addition, it is generally understood that as the ion exchange process proceeds and alkali ions penetrate more deeply into the glass, the maximum compressive stress achieved at the surface of the glass may decrease with time. However, glasses formed from glass compositions which are MgO-rich exhibit a lower reduction in compressive stress than glasses formed from glass compositions that are CaO-rich or rich in other alkaline earth oxides (i.e., glasses which are MgO-poor). Thus, MgO-rich glass compositions enable glasses which have higher compressive stress at the surface and greater depths of layer than glasses which are rich in other alkaline earth oxides.

In order to fully realize the benefits of MgO in the glass compositions described herein, it has been determined that the ratio of the concentration of CaO to the sum of the concentration of CaO and the concentration of MgO in mol. % (i.e., (CaO/(CaO+MgO))) should be minimized. Specifically, it has been determined that (CaO/(CaO+MgO)) should be less than or equal to about 0.5. In some embodiments (CaO/(CaO+MgO)) is less than or equal to about 0.3 or even less than or equal to about 0.2. In some other embodiments (CaO/(CaO+MgO)) may even be less than or equal to about 0.1.

This first exemplary glass composition may optionally further comprise one or more fining agents such as, for example, $SnO_2$, $As_2O_3$, and/or $Cl^-$ (from NaCl or the like). When a fining agent is present in the glass composition, the fining agent may be present in an amount less than or equal to about 0.5 mol. %. For example, in some embodiments the glass composition may include $SnO_2$ as a fining agent. In these embodiments $SnO_2$ may be present in the glass composition in an amount greater than about 0 mol. % and less than or equal to about 0.5 mol. % or even an amount less than or equal to about 0.30 mol. %.

Boron oxide ($B_2O_3$) is a flux which may be added to glass compositions to reduce the viscosity at a given temperature (e.g., the strain, anneal and softening temperatures) thereby improving the formability of the glass. However, it has been found that additions of boron significantly decrease the diffusivity of sodium and potassium ions in the glass composition which, in turn, adversely impacts the ion exchange performance of the resultant glass. In particular, it has been found that additions of boron significantly increase the time required to achieve a given depth of layer relative to glass compositions which are boron free. Accordingly, in some embodiments described herein, the amount of boron added to the glass composition is minimized in order to improve the ion exchange performance of the glass composition.

For example, it has been determined that the impact of boron on the ion exchange performance of a glass composition can be mitigated by controlling the ratio of the concentration of $B_2O_3$ to the difference between the total concentration of the alkali oxides (i.e., $R_2O$, where R is the alkali metals) and alumina (i.e., $B_2O_3$ (mol. %)/($R_2O$ (mol. %)-$Al_2O_3$ (mol. %)). In particular, it has been determined that when the ratio of $B_2O_3/(R_2O—Al_2O_3)$ is greater than or equal to about 0 and less than about 0.3 or even less than about 0.2, the diffusivities of alkali oxides in the glass compositions are not diminished and, as such, the ion exchange performance of the glass composition is maintained. Accordingly, in some embodiments, the ratio of $B_2O_3/(R_2O—Al_2O_3)$ is greater than 0 and less than or equal to about 0.3. In some of these embodiments, the ratio of $B_2O_3/(R_2O—Al_2O_3)$ is greater than 0 and less than or equal to about 0.2. In some embodiments, the ratio of $B_2O_3/(R_2O—Al_2O_3)$ is greater than 0 and less than or equal to about 0.15 or even less than or equal to about 0.1. In some other embodiments, the ratio of $B_2O_3/(R_2O—Al_2O_3)$ may be greater than 0 and less than or equal to about 0.05. Maintaining the ratio $B_2O_3/(R_2O—Al_2O_3)$ to be less than or equal to about 0.3 or even less than or equal to about 0.2 permits the inclusion of $B_2O_3$ to lower the strain point, anneal point and softening point of the glass composition without the $B_2O_3$ adversely impacting the ion exchange performance of the glass.

In the embodiments described herein, the concentration of $B_2O_3$ in the glass composition is generally less than or equal to about 1 mol. %. For example, in embodiments where $B_2O_3$ is present in the glass composition, the concentration of $B_2O_3$ may be greater than about 0.01 mol. % and less than or equal to about 1 mol. %. In some of these embodiments, the concentration of $B_2O_3$ may be greater than about 0.01 mol. % and less than or equal to about 0.9 mol. % In some embodiments, the $B_2O_3$ may be present in an amount greater than or equal to about 0.01 mol. % and less than or equal to about 0.8 mol. %, or even less than or equal to about 0.7 mol. %. Alternatively, the $B_2O_3$ may be present in an amount greater than or equal to about 0.01 mol. % and less than or equal to about 0.6 mol. %, greater than or equal to about 0.01 mol. % and less than or equal to about 0.5 mol. % or even greater than or equal to about 0.01 mol. % and less than or equal to about 0.4 mol. %. In some of these embodiments, the concentration of $B_2O_3$ may be greater than or equal to about 0.01 mol. % and less than or equal to about 0.3 mol. %.

While in some embodiments the concentration of $B_2O_3$ in the glass composition is minimized to improve the forming properties of the glass without detracting from the ion exchange performance of the glass, in some other embodiments the glass compositions are free from boron and compounds of boron such as $B_2O_3$. Specifically, it has been determined that forming the glass composition without boron or compounds of boron improves the ion exchangeability of the glass compositions by reducing the process time and/or temperature required to achieve a specific value of compressive stress and/or depth of layer.

In some embodiments of this first exemplary glass composition, the glass compositions are free from phosphorous and compounds containing phosphorous including, without limitation, $P_2O_5$. Specifically, it has been determined that formulating the glass composition without phosphorous or compounds of phosphorous increases the chemical durability of the glass composition.

In addition to the $SiO_2$, $Al_2O_3$, alkali oxides and alkaline earth oxides, the glass compositions of the first exemplary glass composition may optionally further comprise one or more fining agents such as, for example, $SnO_2$, $As_2O_3$, and/or Cl⁻ (from NaCl or the like). When a fining agent is present in the glass composition, the fining agent may be present in an amount less than or equal to about 0.5 mol. % or even less than or equal to about 0.4 mol. %. For example, in some embodiments the glass composition may include $SnO_2$ as a fining agent. In these embodiments $SnO_2$ may be present in the glass composition in an amount greater than about 0 mol. % and less than or equal to about 0.5 mol. % or even an amount greater than or equal to about 0.01 mol. % and less than or equal to about 0.30 mol. %.

Moreover, the embodiments of this first exemplary glass composition may comprise one or more additional metal oxides to further improve the chemical durability of the glass composition. For example, the glass composition may further include ZnO, $TiO_2$, or $ZrO_2$, each of which further improves the resistance of the glass composition to chemical attack. In these embodiments, the additional metal oxide may be present in an amount which is greater than or equal to about 0 mol. % and less than or equal to about 2 mol. %. For example, when the additional metal oxide is ZnO, the ZnO may be present in an amount less than or equal to about 0.5 mol. %. When the additional metal oxide is $ZrO_2$ or $TiO_2$, the $ZrO_2$ or $TiO_2$ may be present in an amount less than or equal to about 1 mol. %.

Based on the foregoing, it should be understood that, The first exemplary glass composition may include $SiO_2$ in a concentration greater than about 74 mol. %; alkaline earth oxide comprising MgO and CaO, wherein CaO is present in an amount greater than or equal to about 0.1 mol. % and less than or equal to about 1.0 mol. %, and a ratio (CaO (mol. %)/(CaO (mol. %)+MgO (mol. %))) is less than or equal to 0.5; and Y mol. % alkali oxide, wherein the alkali oxide comprises $Na_2O$ in an amount greater than about 8 mol. %, wherein the glass composition is free of boron and compounds of boron.

In another embodiment, the first exemplary glass composition may include from about 74 mol. % to about 78 mol. % $SiO_2$; from about 4 mol. % to about 8 mol. % alkaline earth oxide, wherein the alkaline earth oxide comprises both MgO and CaO and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1, and the glass composition is free of boron and compounds of boron.

In another embodiment, the first exemplary glass composition may include from about 74 mol. % to about 78 mol. % $SiO_2$; from about 3 mol. % to about 13 mol. % alkaline earth oxide comprising both CaO and MgO, wherein the alkaline earth oxide comprises CaO in an amount greater than or equal to about 0.1 mol. % and less than or equal to about 1.0 mol. %, and a ratio (CaO (mol. %)/(CaO (mol. %)+MgO (mol. %))) is less than or equal to 0.5; X mol. % $Al_2O_3$, wherein X is greater than or equal to about 2 mol. % and less than or equal to about 10 mol. %; and Y mol. % alkali oxide, wherein the alkali oxide comprises from about 0.01 mol. % to about 1.0 mol. % $K_2O$ and a ratio of Y:X is greater than 1, and the glass composition is free of boron and compounds of boron.

In another embodiment, the first exemplary glass composition may include from about 74 mol. % to about 78 mol. % $SiO_2$; from about 4 mol. % to about 8 mol. % alkaline earth oxide, wherein the alkaline earth oxide comprises CaO in an amount greater than or equal to about 0.1 mol. % and less than or equal to about 1.0 mol. %, MgO, and a ratio (CaO (mol. %)/(CaO (mol. %)+MgO (mol. %))) is less than or equal to 0.5; X mol. % $Al_2O_3$, wherein X is greater than or equal to about 4 mol. % and less than or equal to about 8 mol. %; and Y mol. % alkali oxide, wherein the alkali oxide comprises $Na_2O$ in an amount greater than or equal to about 9 mol. % and less than or equal to about 15 mol. %, a ratio of Y:X is greater than 1, and the glass composition is free of boron and compounds of boron, wherein the glass composition has a type HGA1 hydrolytic resistance according to ISO 720.

In another exemplary embodiment, the glass containers are formed from a delamination resistant glass composition such as the alkaline earth aluminosilicate glass compositions described in U.S. Provisional patent application Ser. No. 13/660,141 filed Oct. 25, 2012 and entitled "Alkaline Earth Alumino-Silicate Glass Compositions with Improved Chemical And Mechanical Durability", the entirety of which is incorporated herein by reference. This second exemplary glass composition generally includes a combination of $SiO_2$, $Al_2O_3$, at least one alkaline earth oxide, and alkali oxide including at least $Na_2O$ and $K_2O$. This second exemplary glass composition is substantially free from boron and compounds containing boron. The combination of these components enables a glass composition which is resistant to chemical degradation and is also suitable for chemical strengthening by ion exchange. In some embodiments, the glass compositions may further comprise minor amounts of one or more additional oxides such as, for example, $SnO_2$, $ZrO_2$, ZnO, or the like. These components may be added as fining agents and/or to further enhance the chemical durability of the glass composition.

In the embodiments of the second exemplary glass composition, $SiO_2$ is the largest constituent of the composition and, as such, is the primary constituent of the glass network. $SiO_2$ enhances the chemical durability of the glass and, in particular, the resistance of the glass composition to decomposition in acid. Accordingly, a high $SiO_2$ concentration is generally desired. However, if the content of $SiO_2$ is too high, the formability of the glass may be diminished as higher concentrations of $SiO_2$ increase the difficulty of melting the glass which, in turn, adversely impacts the formability of the glass. However, additions of alkali oxide assist in offsetting this effect by decreasing the softening point of the glass. In the embodiments of this second exemplary glass composition, the glass composition generally comprises $SiO_2$ in an amount greater than or equal to about 65 mol. % and less than or equal to about 75 mol. %. In some embodiments $SiO_2$ is present in the glass composition in an amount greater than or equal to about 67 mol. % and less than or equal to about 75 mol. %. In some other embodiments, $SiO_2$ is present in the glass composition in an amount greater than or equal to about 67 mol. % and less than or equal to about 73 mol. %. In each of these embodiments, the amount of $SiO_2$ present in the glass composition may be greater than or equal to about 70 mol. % or even greater than or equal to about 72 mol. %.

The second exemplary glass composition also includes $Al_2O_3$. $Al_2O_3$, in conjunction with alkali oxides present in the glass compositions, such as $Na_2O$ or the like, improves the susceptibility of the glass to ion exchange strengthening. Moreover, additions of $Al_2O_3$ to the composition reduce the propensity of alkali constituents (such as Na and K) from leaching out of the glass and, as such, additions of $Al_2O_3$ increase the resistance of the composition to hydrolytic degradation. The second exemplary glass composition described herein generally include $Al_2O_3$ in an amount greater than or equal to about 6 mol. % and less than or equal to about 12.5 mol. %. In some embodiments, the amount of $Al_2O_3$ in the glass composition is greater than or equal to about 6 mol. % and less than or equal to about 10 mol. %. In some other embodiments, the amount of $Al_2O_3$ in the glass composition is greater than or equal to about 7 mol. % and less than or equal to about 10 mol. %.

The second exemplary glass composition also includes at least two alkali oxides. The alkali oxides facilitate the ion exchangeability of the glass composition and, as such, facilitate chemically strengthening the glass substrate. The alkali oxides also lower the softening point of the glass thereby offsetting the increase in the softening point due to higher concentrations of $SiO_2$ in the glass composition. The alkali oxides also assist in improving the chemical durability of the glass composition. The alkali oxides are generally present in the second exemplary glass composition in an amount greater than or equal to about 5 mol. % and less than or equal to about 12 mol. %. In some of these embodiments, the amount of alkali oxides may be greater than or equal to about 5 mol. % and less than or equal to about 10 mol. %. In some other embodiments, the amount of alkali oxide may be greater than or equal to about 5 mol. % and less than or equal to about 8 mol. %. In all the glass compositions described herein, the alkali oxides comprise at least $Na_2O$ and $K_2O$. In some embodiments, the alkali oxides further comprise $Li_2O$.

The ion exchangeability of the glass composition is primarily imparted to the glass composition by the amount of the alkali oxide $Na_2O$ initially present in the glass composition prior to ion exchange. Specifically, in order to achieve the desired compressive strength and depth of layer in the glass composition upon ion exchange strengthening, the second exemplary glass composition includes $Na_2O$ in an amount greater than or equal to about 2.5 mol. % and less than or equal to about 10 mol. %. In some embodiments the glass composition may include $Na_2O$ in an amount greater than or equal to about 3.5 mol. % and less than or equal to about 8 mol. %. In some of these embodiments the glass composition may include $Na_2O$ in an amount greater than or equal to about 6 mol. % and less than or equal to about 8 mol. %.

As noted above, the alkali oxides in the second exemplary glass composition also include $K_2O$. The amount of $K_2O$ present in the glass composition also relates to the ion exchangeability of the glass composition. Specifically, as the amount of $K_2O$ present in the glass composition increases, the compressive stress obtainable through ion exchange decreases. Accordingly, it is desirable to limit the amount of $K_2O$ present in the second exemplary glass composition. In some embodiments, the amount of $K_2O$ is greater than 0 mol. % and less than or equal to about 2.5 mol. %. In some of these embodiments, the amount of $K_2O$ present in the glass composition is less than or equal to about 0.5 mol. %.

In some embodiments, the alkali oxide in the second exemplary glass composition further comprises $Li_2O$. Including $Li_2O$ in the glass composition further decreases the softening point of the glass. In embodiments where the alkali oxide includes $Li_2O$, the $Li_2O$ may be present in an amount greater than or equal to about 1 mol. % and less than or equal to about 3 mol. %. In some embodiments, $Li_2O$ may be present in the glass composition in an amount which is greater than about 2 mol. % and less than or equal to about 3 mol. %. However, in some other embodiments, the glass composition may be substantially free of lithium and compounds containing lithium.

Alkaline earth oxides in the second exemplary glass composition improve the meltability of the glass batch materials and increase the chemical durability of the glass composition. Embodiments of the second exemplary glass composition generally include at least one alkaline earth oxide in a concentration greater than or equal to about 8 mol. % or even 8.5 mol. % and less than or equal to about 15 mol. %. In some embodiments, the glass composition may comprise from about 9 mol. % to about 15 mol. % of alkaline earth oxide. In some of these embodiments, the amount of alkaline earth oxide in the glass composition may be from about 10 mol. % to about 14 mol. %.

The alkaline earth oxide in the second exemplary glass composition may include MgO, CaO, SrO, BaO or combinations thereof. For example, in the embodiments described herein the alkaline earth oxide includes MgO. MgO is present in the glass composition in an amount which is greater than or equal to about 2 mol. % and less than or equal to about 7 mol. % or even greater than or equal about 3 mol. % and less than or equal to about 5 mol. %. In some other embodiments, the concentration of MgO in the glass composition may be reduced in order to lower the liquidus temperature of the glass composition and increase the liquidus viscosity, both of which improve the formability of the glass composition. For example, in some embodiments, the concentration of MgO may be greater than 0 mol. % and less than or equal to about 3.5 mol. %. In some other embodiments, the concentration of MgO may be greater than 0 mol. % and less than or equal to about 3.0 mol. % or even less than or equal to about 2.5 mol. %.

In some embodiments, the alkaline earth oxide in the second exemplary glass composition also includes CaO. In these embodiments, CaO is present in the glass composition in an amount from about 2 mol. % to less than or equal to about 7 mol. %. In some embodiments, CaO is present in the glass composition in an amount from about 3 mol. % to less than or equal to about 7 mol. %. In some of these embodiments, CaO may be present in the glass composition in an amount greater than or equal to about 4 mol. % and less than or equal to about 7 mol. %. In some other embodiments, CaO may be present in the glass composition in an amount greater than or equal to about 5 mol. % and less than or equal to about 6 mol. %, such as when CaO is substituted for MgO in the alkaline earth oxide to decrease the liquidus temperature and increase the liquidus viscosity. In still other embodiments, CaO may be present in the glass in an amount greater than or equal to about 2 mol. % and less than or equal to about 5 mol. %, such as when SrO is substituted for MgO in the alkaline earth oxide to decrease the liquidus temperature and increase the liquidus viscosity.

In some embodiments described herein, the alkaline earth oxide in the second exemplary glass composition further comprises at least one of SrO or BaO. The inclusion of SrO reduces the liquidus temperature of the glass composition and, as a result, improves the formability of the glass composition. In some embodiments the glass composition may include SrO in an amount greater than 0 mol. % and less than or equal to about 6.0 mol. %. In some other embodiments, the glass composition may include SrO in an amount greater than about 0 mol. % and less than or equal to about 5 mol. %. In some of these embodiments, the glass composition may include greater than or equal to about 2 mol. % and less than or equal to about 4 mol. % SrO, such as when CaO is substituted for MgO in the alkaline earth oxide to decrease the liquidus temperature and increase the liquidus viscosity. In some other embodiments, the glass composition may include from about 1 mol. % to about 2 mol. % SrO. In still other embodiments, SrO may be present in the glass composition in an amount greater than or equal to about 3 mol. % and less than or equal to about 6 mol. %, such as when SrO is substituted for MgO in the alkaline earth oxide to decrease the liquidus temperature and increase the liquidus viscosity.

In embodiments where the glass composition includes BaO, the BaO may be present in the second exemplary glass composition in an amount greater than about 0 mol. % and less than about 2 mol. %. In some of these embodiments, BaO may be present in the glass composition in an amount less than or equal to about 1.5 mol. % or even less than or equal to about 0.5 mol. %. However, in some other embodiments, the glass composition is free from barium and compounds of barium.

In the embodiments of the second exemplary glass compositions described herein, the glass compositions generally contain less than about 1 mol. % of boron or oxides of boron, such as $B_2O_3$. For example, in some embodiments the glass compositions may comprise greater than or equal to about 0 mol. % $B_2O_3$ and less than or equal to about 1 mol. % $B_2O_3$. In some other embodiments, the glass compositions may comprise greater than or equal to about 0 mol. % $B_2O_3$ and less than or equal to about 0.6 mol. % $B_2O_3$. In still other embodiments, the glass compositions are substantially free from boron and compounds of boron such as $B_2O_3$. Specifically, it has been determined that forming the glass composition with a relatively low amount of boron or compounds of boron (i.e., less than or equal to about 1 mol. %) or without boron or compounds of boron significantly increases the chemical durability of the glass composition and decreases the susceptibility to delamination. In addition, it has also been determined that forming the glass composition with a relatively low amount of boron or compounds of boron or without boron or compounds of boron improves the ion exchangeability of the glass compositions by reducing the process time and/or temperature required to achieve a specific value of compressive stress and/or depth of layer.

In addition to the $SiO_2$, $Al_2O_3$, alkali oxides and alkaline earth oxides, the second exemplary glass compositions described herein may optionally further comprise one or more fining agents such as, for example, $SnO_2$, $As_2O_3$, and/or $Cl^-$ (from NaCl or the like). When a fining agent is present in the glass composition, the fining agent may be present in an amount less than or equal to about 0.5 mol. %. For example, in some embodiments the glass composition may include $SnO_2$ as a fining agent. In these embodiments $SnO_2$ may be present in the glass composition in an amount greater than about 0 mol. % and less than or equal to about 0.30 mol. %.

Moreover, the glass compositions described herein may comprise one or more additional metal oxides to further improve the chemical durability of the glass composition. For example, the glass composition may further include ZnO or $ZrO_2$, each of which further improves the resistance of the glass composition to chemical attack. In these embodiments, the additional metal oxide may be present in an amount which is greater than or equal to about 0 mol. % and less than or equal to about 2.0 mol. %. For example, when the additional metal oxide is $ZrO_2$, the $ZrO_2$ may be present in an amount less than or equal to about 1.5 mol. %. Alternatively or additionally, the additional metal oxide may include ZnO in an amount less than or equal to about 2.0 mol. %. In some embodiments, ZnO may be included as a substitute for one or more of the alkaline earth oxides. For example, in embodiments where the glass composition includes the alkaline earth oxides MgO, CaO and SrO, the amount of MgO may be reduced to decrease the liquidus temperature and increase the liquidus viscosity, as described above. In these embodiments, ZnO may be added to the glass composition as a partial substitute for MgO, in addition to or in place of at least one of CaO or SrO.

In order to provide a glass composition which is readily formable into 3-dimensional shapes, the molten glass formed from the second exemplary glass composition generally have a liquidus viscosity of greater than or equal to 90 kilopoise (kP). It has been determined that glass compositions with liquidus viscosities of greater than 90 kP can be obtained by controlling the ratio of MgO to the sum of the concentrations of the divalent cations ($\Sigma RO$). Divalent cations include the alkaline earth oxides (e.g., MgO, CaO, SrO, BaO), ZnO, and the like. Specifically, it has been determined that when MgO:$\Sigma RO$ is less than about 0.30, the glass compositions generally have a liquidus viscosity of greater than or equal to about 90 kP, preferably greater than or equal to about 100 kP or even greater than or equal to about 115 kP. Accordingly, in some embodiments described herein, the ratio MgO:$\Sigma RO$ is less than about 0.3.

Based on the foregoing, it should be understood that, in one embodiment, the second exemplary glass composition may include: from about 65 mol. % to about 75 mol. % $SiO_2$; from about 6 mol. % to about 12.5 mol. % $Al_2O_3$; and from about 5 mol. % to about 12 mol. % alkali oxide, wherein the alkali oxide comprises $Na_2O$ and $K_2O$. The $K_2O$ may be present in an amount less than or equal to 0.5 mol. %. The glass composition may also include from about 8.0 mol. % to about 15 mol. % of alkaline earth oxide. The glass composition may be susceptible to strengthening by ion-exchange.

In another embodiment of the second exemplary glass composition, the glass composition includes from about 67 mol. % to about 75 mol. % $SiO_2$; from about 6 mol. % to about 10 mol. % $Al_2O_3$; from about 5 mol. % to about 12 mol. % alkali oxide; and from about 8 mol. % to about 15 mol. % of alkaline earth oxide. The alkali oxide may include $K_2O$ in an amount less than or equal to about 0.5 mol. %. The alkaline earth oxide may include at least one of SrO and BaO. The glass composition may be free from boron and compounds of boron and phosphorous and compounds of phosphorous. The glass composition may be ion exchangeable to a depth of layer greater than or equal to about 15 μm with a corresponding compressive stress greater than or equal to about 250 MPa.

In yet another embodiment of the second exemplary glass composition, the glass composition may include from about 67 mol. % to about 75 mol. % $SiO_2$; from about 6 mol. % to about 10 mol. % $Al_2O_3$; from about 5 mol. % to about 12 mol. % alkali oxide; and from about 9 mol. % to about 15 mol. % of alkaline earth oxide. The alkaline earth oxide comprises at least one of SrO and BaO. The glass composition is free from boron and compounds of boron and is susceptible to ion exchange thereby facilitating chemically strengthening the glass to improve the mechanical durability.

EXAMPLES

The embodiments of glass containers with improved resistance to delamination described herein will be further clarified by the following examples.

Comparative Example 1

Figure 4:
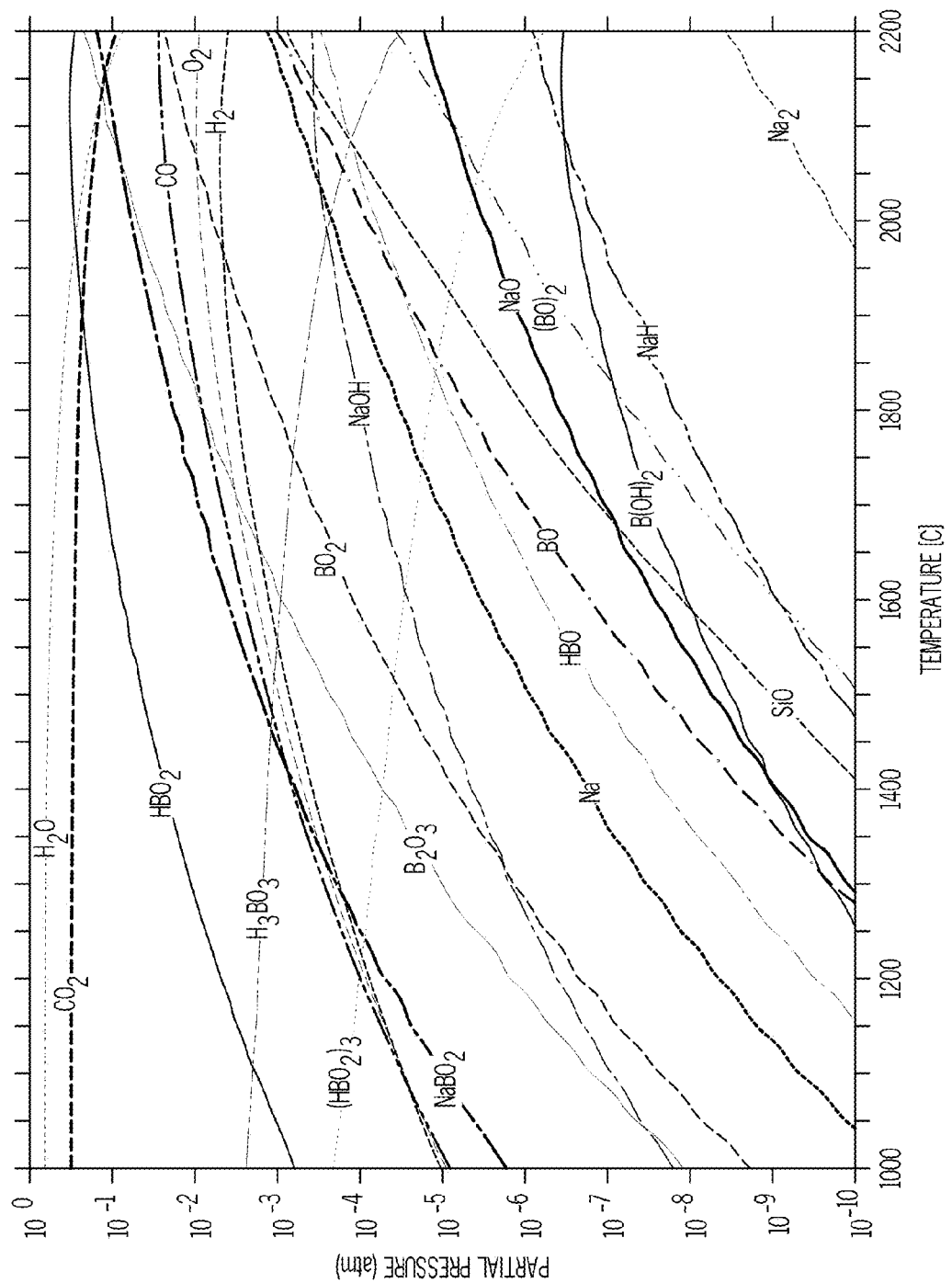
FIG. 4 graphically depicts the partial pressure (y-axis) of various species of the glass composition as a function of temperature (x-axis) for a conventional Type 1a borosilicate glass in equilibrium with a stoichiometric methane flame.

To illustrate the volatility of boron and sodium in a conventional Type 1a borosilicate glass composition, thermochemical calculations were performed on Type 1a glass equilibrated in a stoichiometric flame with an oxygen to methane ratio of 2. The modeled Type 1a glass composition includes 83.4 mol. % $SiO_2$, 1.5 mol. % $Al_2O_3$, 11.2 mol. % $B_2O_3$; and 3.8 mol. % $Na_2O$. The composition of the gas phase in equilibrium with the glass in a stoichiometric methane flame was calculated from chemical thermodynamics using FACTsage software as a function of temperature. FIG. 4 graphically depicts the partial pressure (y-axis) of the main gas phase species as a function of temperature (x-axis). As shown in FIG. 4, both the boron and sodium species have relatively high partial pressures in the temperature range of 1000° C. to 1600° C. This temperature range generally corresponds to the temperatures utilized to reform glass stock into a glass container. Accordingly, it is believed that both the boron and sodium species in the Type 1a glass would volatilize and evaporate from the heated interior surfaces of the glass as the glass is reformed, thereafter condensing on cooler portions of the interior surface of the glass. This behavior causes heterogeneities in the surface composition of the glass which may lead to delamination.

Comparative Example 2

Figure 5:
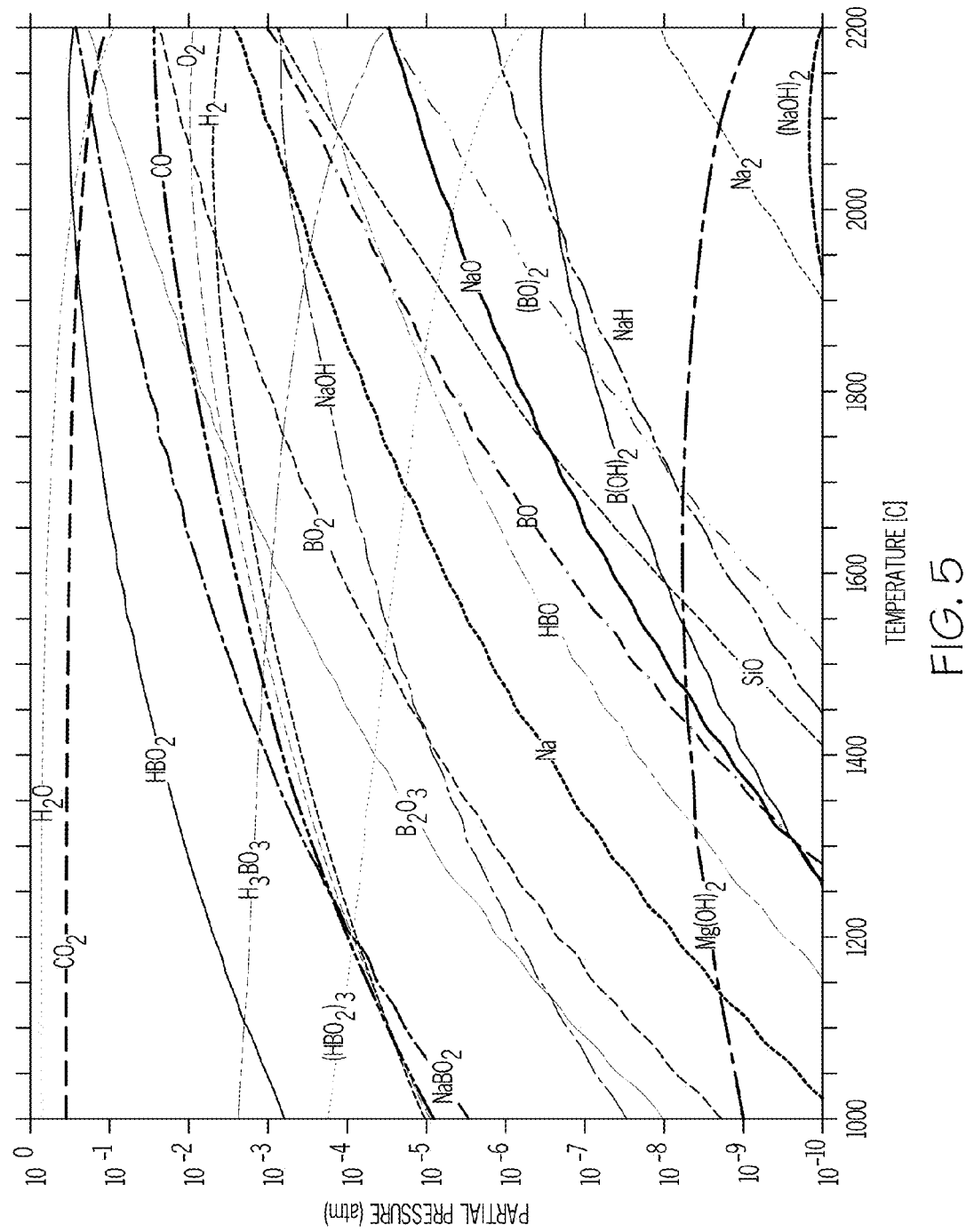
FIG. 5 graphically depicts the partial pressure (y-axis) of various species of the glass composition as a function of temperature (x-axis) for a conventional Type 1b borosilicate glass in equilibrium with a stoichiometric methane flame.

To illustrate the volatility of boron and sodium in a conventional Type 1b borosilicate glass composition, thermochemical calculations were performed on Type 1b glass equilibrated in a stoichiometric flame with an oxygen to methane ratio of 2. This modeled glass composition included 76.2 mol. % $SiO_2$, 4.2 mol. % $Al_2O_3$, 10.5 mol. % $B_2O_3$, 8.2 mol. % $Na_2O$, 0.4 mol. % MgO and 0.5 mol. % CaO. The composition of the gas phase in equilibrium with the glass in a stoichiometric methane flame was calculated from chemical thermodynamics using FACTsage software as a function of temperature. FIG. 5 graphically depicts the partial pressure (y-axis) of the main gas phase species as a function of temperature (x-axis). As with Comparative Example 1, both the boron and sodium species in Comparative Example 2 have relatively high partial pressures in the temperature range of 1000° C. to 1600° C. This temperature range generally corresponds to the temperatures utilized to reform glass stock into a glass container. Accordingly, it is believed that both the boron and sodium species from the Type 1b glass would volatilize and evaporate from the heated interior surfaces of the glass as the glass is reformed and thereafter condense on cooler portions of the glass. This behavior causes heterogeneities in the composition of the glass which may lead to delamination.

Comparative Example 3

Figure 6:
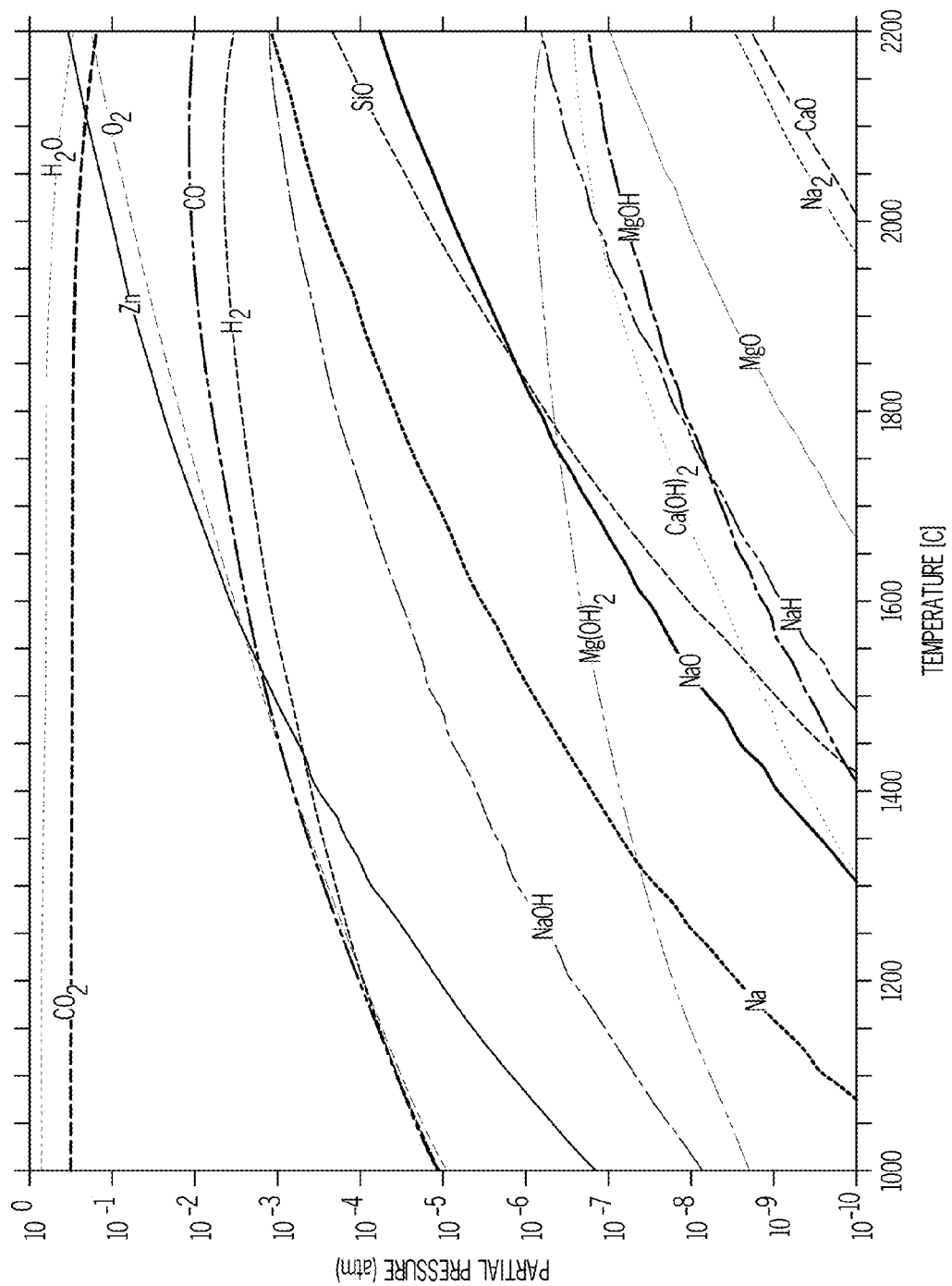
FIG. 6 graphically depicts the partial pressure (y-axis) of various species of the glass composition as a function of temperature (x-axis) for a specific ZnO containing glass in equilibrium with a stoichiometric methane flame.

To illustrate the volatility of zinc in a glass composition comprising ZnO, thermochemical calculations were performed on a ZnO-containing glass equilibrated in a stoichiometric flame with an oxygen to methane ratio of 2. The glass composition included 74.3 mol. % $SiO_2$, 7.4 mol. % $Al_2O_3$, 5.1 mol. % $Na_2O$, 5.0 mol. % MgO, 5.1 mol. % CaO, and 3.1 mol. % ZnO. The composition of the gas phase in equilibrium with the glass in a stoichiometric methane flame was calculated from chemical thermodynamics using FACTsage software as a function of temperature. FIG. 6 graphically depicts the partial pressure (y-axis) of the main gas phase as a function of temperature (x-axis). The zinc species in Comparative Example 3 have relatively high partial pressures in the temperature range of 1000° C. to 1600° C. This temperature range generally corresponds to the temperatures utilized to reform glass stock into a glass container.

Accordingly, it is believed that the zinc species in this glass composition would volatilize and evaporate from the heated interior surfaces of the glass as the glass is reformed and thereafter condense on cooler portions of the glass. Volatilization of zinc from this glass when exposed to a flame has been experimentally observed. This behavior causes heterogeneities in the composition of the glass which may lead to delamination.

Example 1

Figure 7:
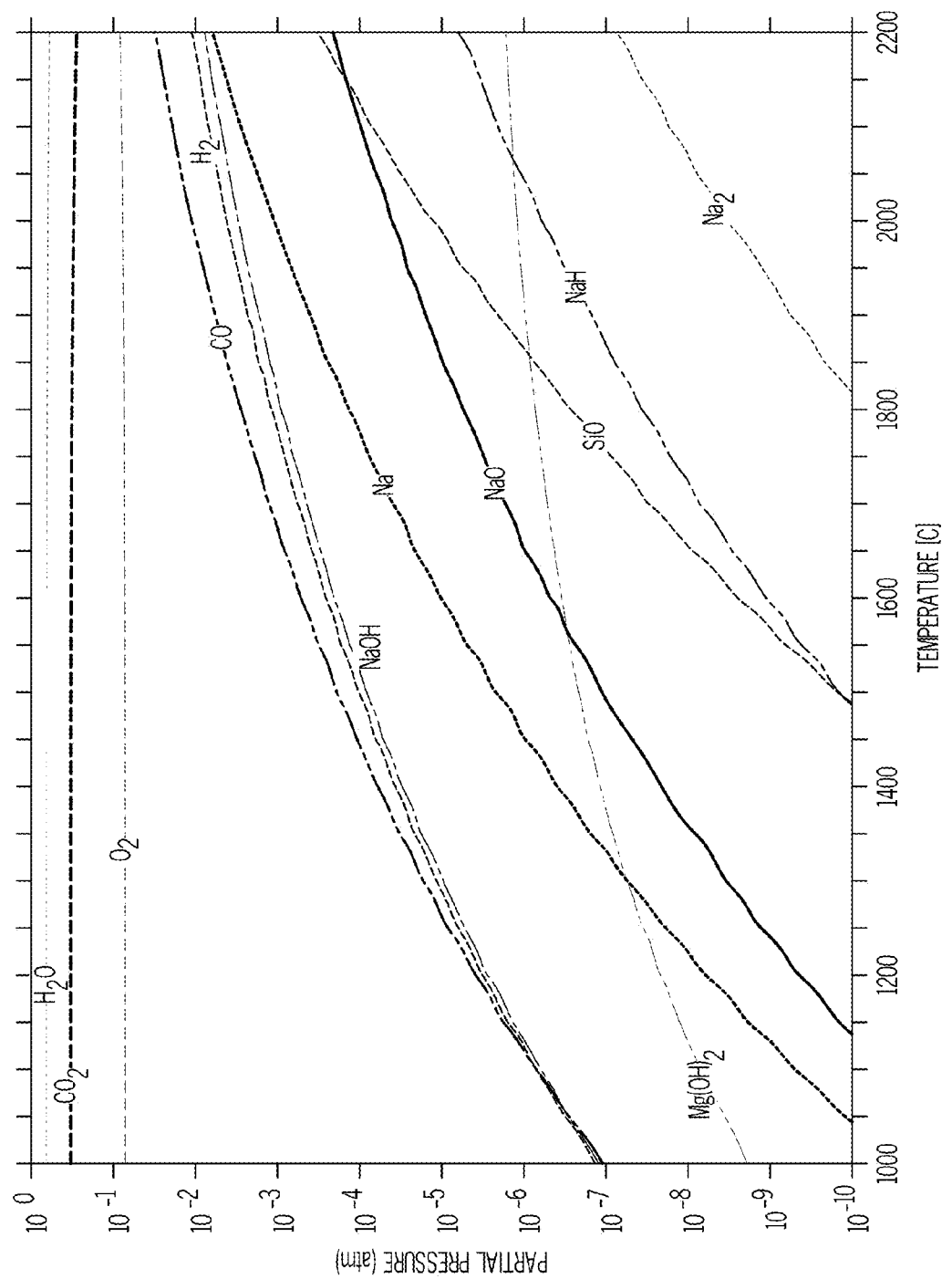
FIG. 7 graphically depicts the partial pressure (y-axis) of various species of the glass composition as a function of temperature (x-axis) for an exemplary alkali aluminosilicate glass in equilibrium with a stoichiometric methane flame.

To illustrate the relatively low volatility of an exemplary alkali aluminosilicate glass composition, thermochemical calculations were performed on this glass equilibrated in a stoichiometric flame with an oxygen to methane ratio of 2. This glass composition includes 76.8 mol. % $SiO_2$, 6.0 mol. % $Al_2O_3$, 11.7 mol. % $Na_2O$, 0.5 mol. % CaO, and 4.8 mol. % MgO. The composition of the gas phase in equilibrium with the glass in a stoichiometric methane flame was calculated from chemical thermodynamics using FACTsage software as a function of temperature. FIG. 7 graphically depicts the partial pressure (y-axis) of the main gas phase species as a function of temperature (x-axis). As shown in FIG. 7, the partial pressure of the sodium, magnesium, and calcium species in the alkali aluminosilicate glass were relatively low over the temperature range of 1000° C. to 1600° C. compared to the boron and sodium species of the Type 1a (Comparative Example 1) and Type 1b (Comparative Example 2) glasses. This indicates that the sodium, magnesium, and calcium species were less likely to volatilize at the reforming temperatures and, as such, glass containers formed from the alkali aluminosilicate glass were more likely to have a homogenous composition at the surface and through the thickness of the glass container.

Comparative Example 4

Figure 8A:
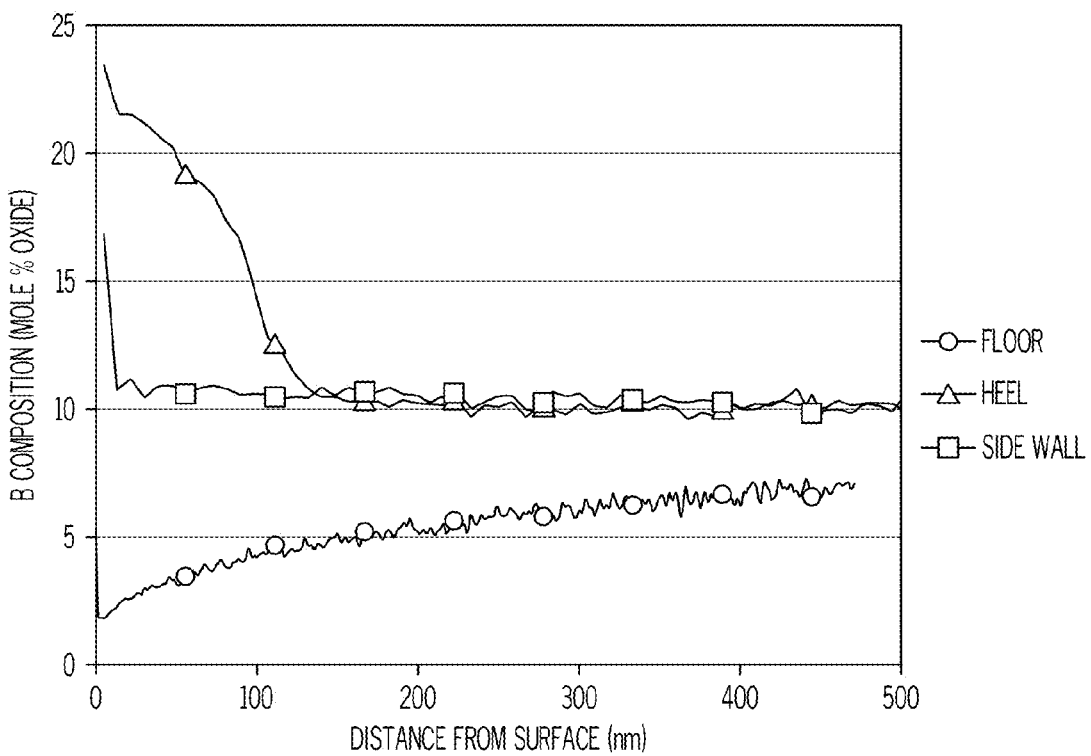
FIG. 8A graphically depicts the concentration (y-axis) of boron as a function of depth from the interior surface of heel, floor, and sidewall portions of a glass vial formed from a conventional Type 1b borosilicate glass.
Figure 8B:
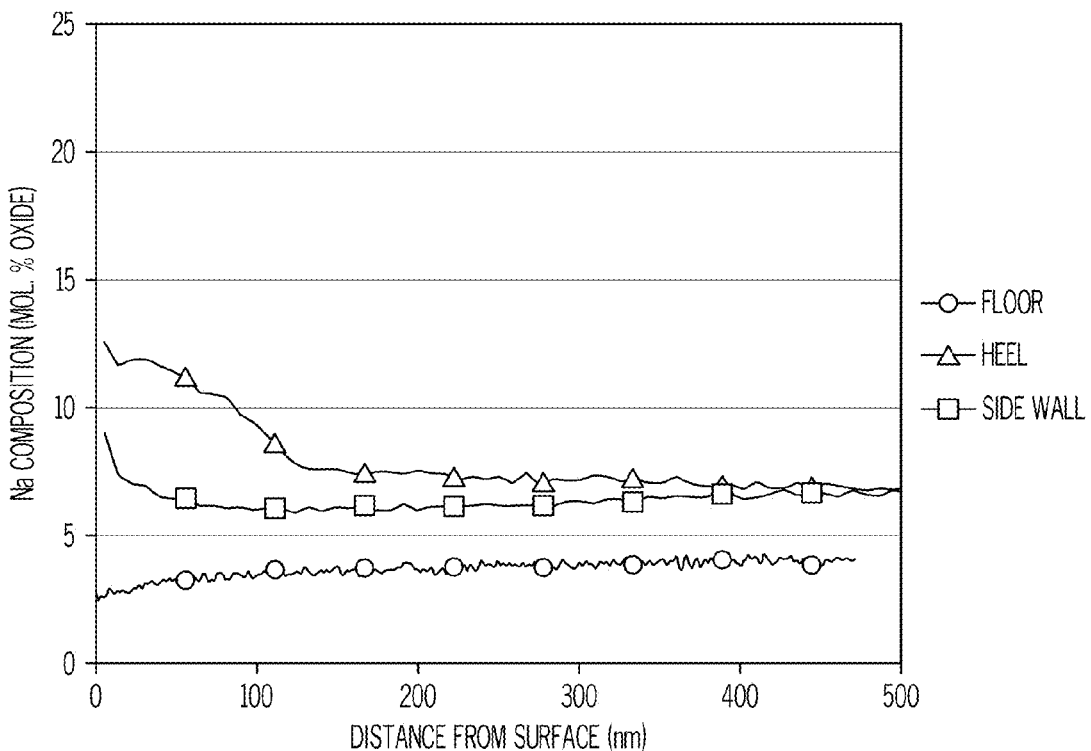
FIG. 8B graphically depicts the concentration (y-axis) of sodium as a function of depth from the interior surface of heel, floor, and sidewall portions of a glass vial formed from a conventional Type 1b borosilicate glass.

The compositional characteristics of a glass vial formed from a conventional Type 1b borosilicate glass composition in as-formed condition were assessed. The glass vials were formed from Type 1b borosilicate glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. A sample of the vial was collected from the interior surface of the heel region between the sidewall and the floor portion of the vial at a location approximately 1.5 mm from the floor portion of the vial. A second sample of the vial was collected from the interior surface of the floor portion of the vial near the center of the floor portion. A third sample was collected from the side wall 15 mm up from the floor portion. Each sample was analyzed by dynamic secondary ion mass spectroscopy (D-SIMS). D-SIMS was conducted with a PHI Adept-1010 instrument having a quadrapole mass spectrometer. Because glass is an electrically insulating material, the surface tends to build charge during extended bombardment by the energetic ion beam. As a result, this charging effect must be properly neutralized by use of a secondary ion gun or electron beam in order to prevent migration of mobile sodium ions through the glass surface matrix. In this study, instrumental conditions to minimize sodium migration were arrived at by profiling fresh fracture surfaces of glass rods that were prepared from comparative Type 1B bulk glasses and from bulk glasses alkali aluminosilicate glass compositions, such as the glass composition described in Example 1 above. The proper conditions were ensured by obtaining constant (flat) Na profiles from the outermost glass surface using ions of positive polarity. Relative sensitivity factors for quantization of each glass element (Si, Al, B, Na, K, Ca, Mg) were also obtained from analysis of the glass rod fracture surfaces and calibrating to the bulk glass compositions as measured by inductively coupled plasma mass spectrometry (ICP-MS). Because the matrix and surface electronic properties of the vial surfaces are not identical to fracture surfaces, expected relative error is about 10%. The depth scales were based on sputter rates calculated from the depths of the analytical craters in the glass, as measured by stylus profilimetry with NIST traceable calibration. The one sigma accuracy of the depth calibration was within ±1-10% (i.e. ±0.01-0.1×[depth]). FIG. 8A shows the boron concentration of the sample from the floor, heel, and sidewall regions (y-axis) as a function of depth (x-axis) from the surface while FIG. 8B shows the sodium concentration of the sample from the floor, heel, and sidewall regions (y-axis) as a function of depth (x-axis) from the surface. The composition of the sample in the heel region indicated that a boron-rich and sodium-rich layer was present at the interior surface of the heel region to a depth of 100 nm. However, the concentration of both boron and sodium was significantly lower at depths greater than 100 nm, indicating that additional boron and sodium had been enriched in the heel portion of the vial during formation. FIGS. 8A and 8B show that the concentration of boron and sodium in the floor portion of the vial increased with depth, indicating that boron and sodium had been volatilized from the floor portion during formation. Accordingly, FIGS. 8A and 8B indicate that the borosilicate glass vial had compositional heterogeneities through the thickness of the glass vial as well as over the surface region of the glass vial.

Example 2

Figure 9:
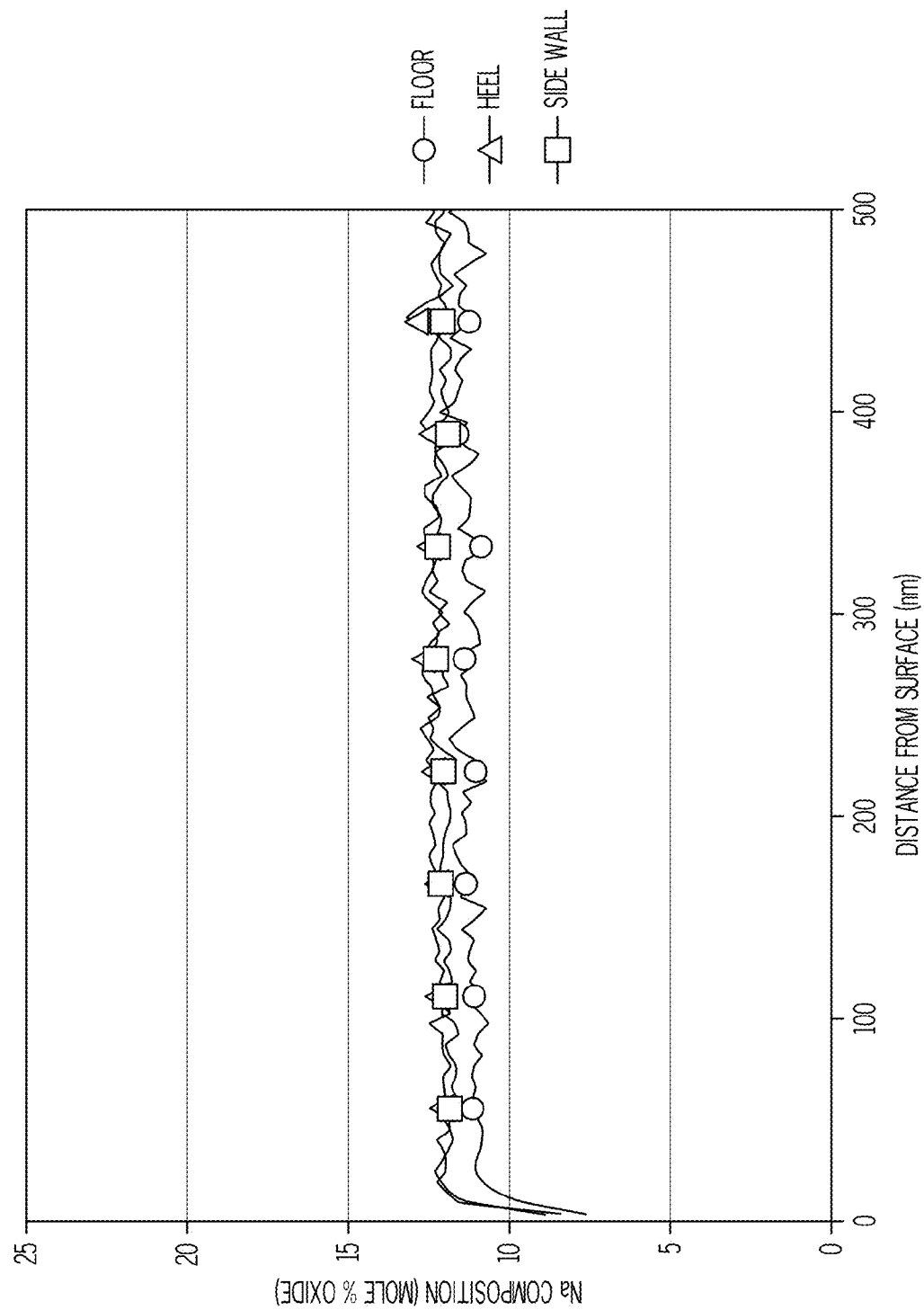
FIG. 9 graphically depicts the concentration (y-axis) of sodium as a function of depth from the interior surface of heel, floor, and sidewall portions of a glass vial formed from an exemplary boron-free alkali aluminosilicate glass.

The compositional characteristics of a glass vial formed from boron-free alkali aluminosilicate glass composition in as-formed condition were assessed. The glass vials were formed from boron-free alkali aluminosilicate glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. Samples of the vial were collected from the interior surface of the floor, heel (between the sidewall and the floor portions of the vial at a location approximately 1.5 mm from the floor portion), and sidewall regions. Each sample was analyzed by dynamic secondary ion mass spectroscopy, as described above. FIG. 9 shows the sodium concentration of the sample from the floor, heel, and sidewall regions (y-axis) as a function of depth (x-axis) from the surface. FIG. 9 indicates that the composition of the samples from the floor, heel, and sidewall regions was uniform and homogenous from the interior surface of the vial to a depth of at least 500 nm and usually extends to a depth of at least 2 μm. Accordingly, FIG. 9 indicates that the composition of the vial formed from boron-free alkali aluminosilicate glass was substantially homogenous through the thickness of the glass vial as well as over the surface region of the glass vial. It is believed that this compositional homogeneity is directly related to the reduced delamination observed in the boron-free alkali aluminosilicate glass vials.

Example 3

Figure 10:
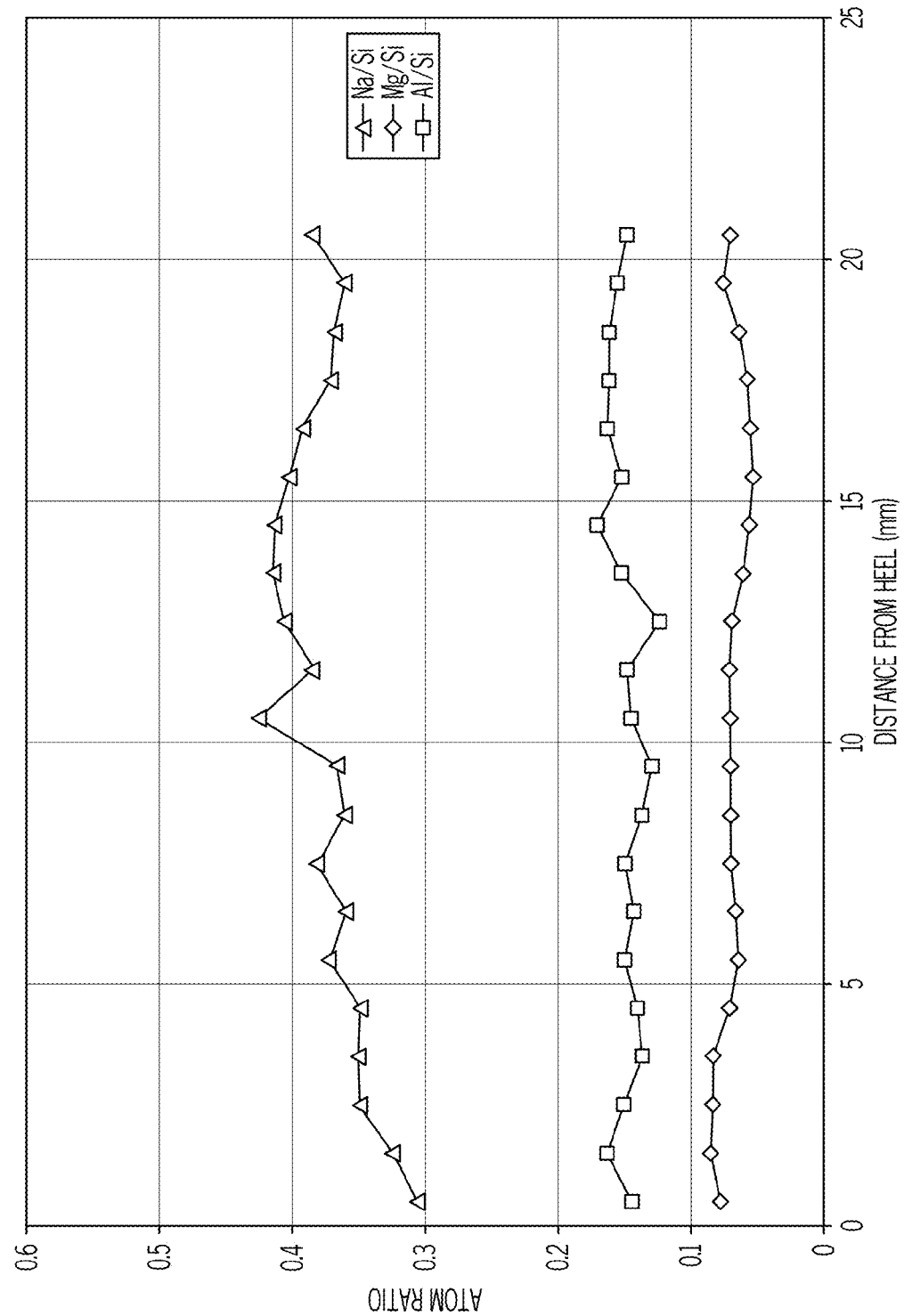
FIG. 10 graphically depicts the atomic ratio (y-axis) as a function of distance (x-axis) for the interior surface of a glass vial formed from an exemplary alkali aluminosilicate glass showing surface homogeneity.

A glass vial was formed from an alkali aluminosilicate glass composition which included 76.8 mol. % $SiO_2$, 6.0 mol. % $Al_2O_3$, 11.6 mol. % $Na_2O$, 0.1 mol. % $K_2O$, 0.5 mol. % CaO, 4.8 mol. % MgO, and 0.2 mol. % $SnO_2$. The glass vials were formed from glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. The surface concentration of constituent components in the glass composition were measured at discrete points within the surface region extending to a depth of 10 nm from the interior surface of the glass composition as a function of distance from the heel of the vial by x-ray photoelectron spectroscopy. The surface concentration of those elements in the glass composition having a concentration of less than 2 mol. % were not analyzed. In order to accurately quantify the surface concentration of the glass composition using x-ray photoelectron spectroscopy (XPS), relative sensitivity factors were employed that were derived from standard reference materials. The analysis volume for the measurement is the product of the analysis area (spot size or aperture size) and the depth of information. Photoelectrons are generated within the x-ray penetration depth (typically many microns), but only the photoelectrons which have sufficient kinetic energy to escape the surface (approximately three times the photoelectron escape depth) are detected. Escape depths are on the order of 15-35 Å, which leads to an analysis depth of approximately 50-100 Å. Typically, 95% of the signal originates from within this depth. An electron energy analyzer and detector were used to collect the emitted photoelectrons from the glass surface and measure their kinetic energies. The specific kinetic energy of each emitted photoelectron is a unique signature of the element and core electronic level from which it originated. The number of emitted photoelectrons are counted (signal intensity) and plotted as a function of kinetic energy to create a photoelectron spectrum. Peaks in the spectrum are unique to core electronic levels of individual elements. The area under each peak is integrated and then divided by the appropriate relative sensitivity factor (derived from standard reference materials) in order to quantify the atom fraction of each constituent in the glass surface. When analyzing data by XPS, there are multiple lines associated with each element. For elements with low bulk concentration, the line with the highest signal to noise ratio should be used. For example, the Mg KLL line over the Mg (2p) line should be used even though the latter is more conventionally used since it can easily be included with other elements. The samples were measured with a carbon content less than 5 atomic %. The surfaces of the samples may be cleaned by UV/ozone, alcohols or other non-aqueous measures. The elemental composition (in atomic %) as determined from XPS was ratioed vs. Si. This atom ratio was then plotted as function of distance from the heel in mm, as shown in FIG. 10. As shown in FIG. 10, the composition of the glass container in the surface region varied by less than 25% from the average.

Comparative Example 5

Figure 11:
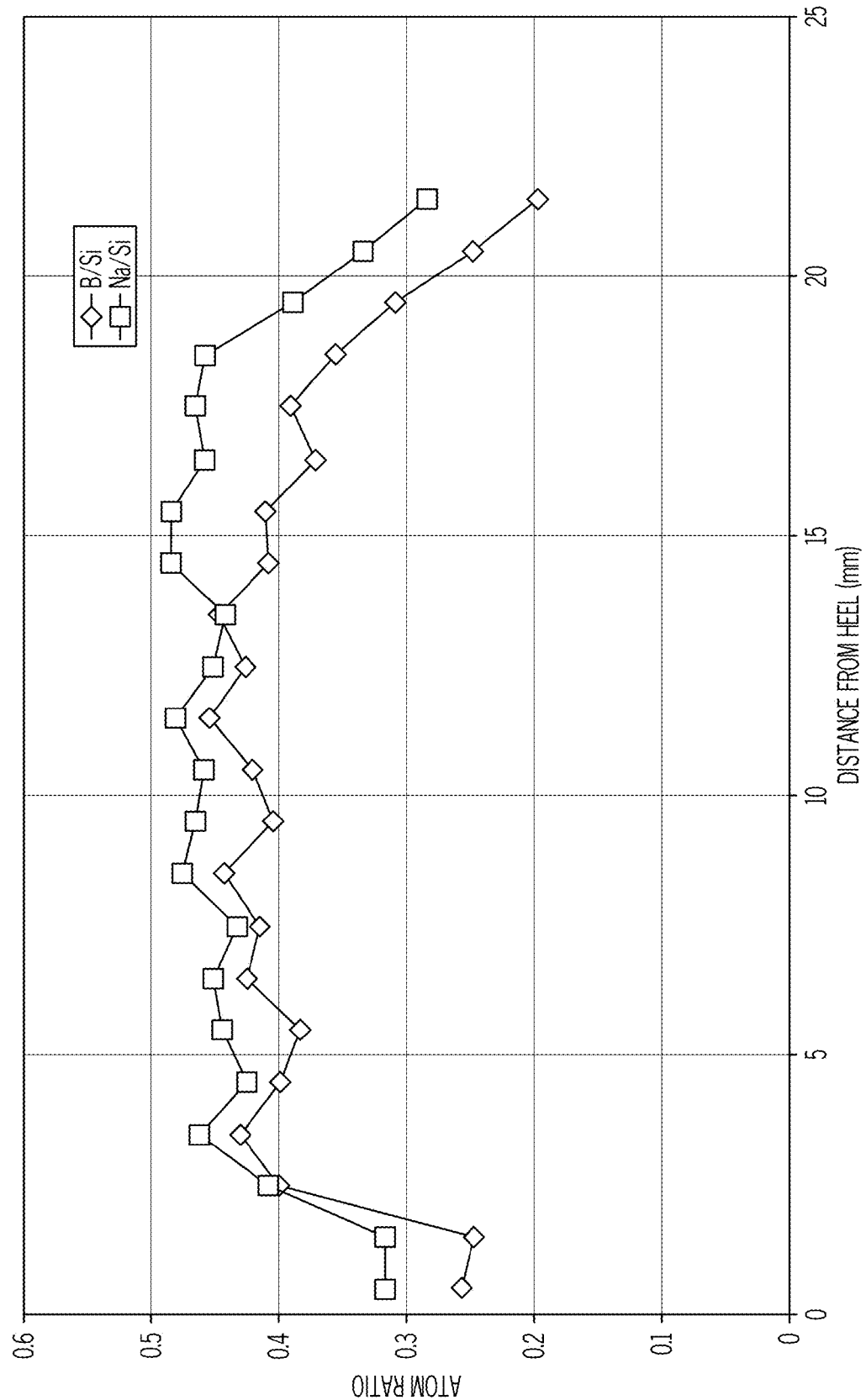
FIG. 11 graphically depicts the atomic ratio (y-axis) as a function of distance (x-axis) for the interior surface of a glass vial formed from a conventional Type 1B glass showing surface heterogeneity.

A glass vial was formed from Type 1b borosilicate glass tubing with an outer diameter of approximately 17 mm and a wall thickness of approximately 1.1 mm. Conventional tube-to-vial conversion processes were used to form the glass tubing into standard 3-4 ml vials using direct flames and standard conversion equipment. The surface concentration of constituent components in the glass composition were measured at discrete points within the surface region extending to a depth of 10 nm from the interior surface of the glass composition as a function of distance from the heel of the vial by XPS, as described above. The surface concentration of those elements in the glass composition having a concentration of less than 2 mol. % were not analyzed. The elemental composition (in atomic %) as determined from XPS was ratioed vs. Si. This atom ratio was then plotted as function of distance from the heel in mm, as shown in FIG. 11. As shown in FIG. 11, the composition of the glass container in the surface region varied by more than 30% for boron and sodium species.

Example 4

To illustrate the threshold volatility of boron in an alkali aluminosilicate glass composition, thermochemical calculations were performed on this glass equilibrated in a stoichiometric flame with an oxygen to methane ratio of 2 at a temperature of 1500° C. The modeled glass composition included 76.8 mol. % $SiO_2$, 6.0 mol. % $Al_2O_3$, 11.7 mol. % $Na_2O$, 0.5 mol. % CaO, and 4.8 mol. % MgO. The composition of the gas phase in equilibrium with the glass in a stoichiometric methane flame was calculated from chemical thermodynamics using FACTsage software as a function of added $B_2O_3$. The amount of $B_2O_3$ added on top of the composition was varied from about 0.001 mol. % to about 10 mol. %. In this Example, the composition of the equilibrated gas phase was expressed as element fractions. Instead of actual specific species (e.g. $HBO_2$, $NaBO_2$, etc.), the gas phase is viewed as being comprised of elements (e.g. H, B, Na, O, etc.). All of the species in the gas phase are broken into their constituent elements (e.g. 1 mol $HBO_2$ becomes 1 mol H+1 mol B+2 mol O) and then the concentrations are expressed on an elemental basis. As an example, consider the glass from Comparative Example 1 in a stoichiometric flame (shown in FIG. 4). The number of moles of Na in the equilibrated gas is:

and the elemental fraction of Na is:

where n denotes number of moles. The elemental fraction of boron in the equilibrated gas of the present example was calculated in the same manner.

Figure 12:
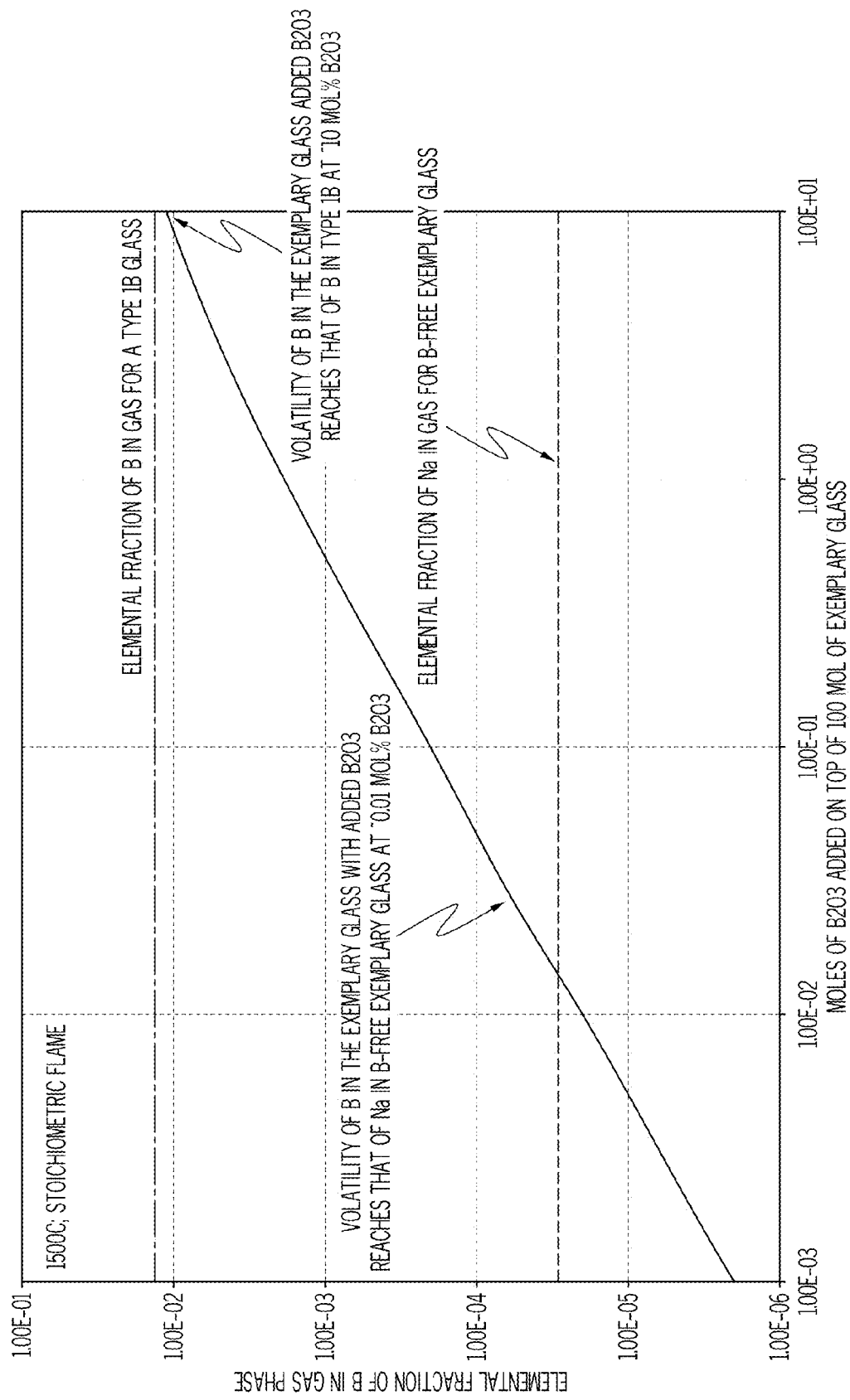
FIG. 12 graphically depicts the elemental fraction (y-axis) of boron in the gas phase as a function of $B_2O_3$ (x-axis) added to an inventive glass composition in equilibrium with a stoichiometric methane flame at 1500° C.

FIG. 12 graphically depicts the elemental fraction of boron in the gas phase as a function of $B_2O_3$ added on top of the glass composition. FIG. 12 also depicts the elemental fraction of Na for this particular glass composition as well as the elemental fraction of boron for a conventional Type 1b borosilicate glass. Without the addition of $B_2O_3$, sodium is the most volatile component in the glass composition. However, as $B_2O_3$ is added to the composition, boron quickly becomes the most volatile component in the glass, exceeding sodium at a concentration of approximately 0.01 mol. %. Utilizing this modeling data, it has been determined that some concentration of $B_2O_3$ can be introduced into a glass composition without significantly increasing the propensity for delamination. As noted above, the threshold for $B_2O_3$ additions in the embodiments described herein is less than or equal to 1.0 mol. %.

Example 5

Vials prone to delamination were compared to vials that are not prone to delamination by forming a borosilicate glass composition (Composition A) and aluminosilicate glass composition (Composition B) into tubes, converting the tubes into vials and subjecting the vials to accelerated delamination testing. Composition A included 75.9 mol. % $SiO_2$, 4.1 mol. % $Al_2O_3$, 10.5 mol. % $B_2O_3$, 6.6 mol. % $Na_2O$, 1.6 mol. % $K_2O$, 0.5 mol. % MgO, 0.6 mol. % CaO, and 0.1 mol. % Cl. Composition B included 76.8 mol. % $SiO_2$, 6.0 mol. % $Al_2O_3$, 11.6 mol. % $Na_2O$, 0.1 mol. % $K_2O$, 4.8 mol. % MgO, 0.5 mol. % CaO, and 0.2 mol. % $SnO_2$. The melted compositions were formed into tubes directly from the melt and then subsequently converted into vials of approximately 3 mL size using industry standard converting equipment such as an AMBEG machine. The glass tubing had an outer diameter of approximately 17 mm and a wall thickness of approximately 1.1 mm. Conversion of the tubes was performed using exaggerated heating conditions while still maintaining the ability to form a quality vial. The vials were then subjected to the accelerated delamination test described herein. Thirty vials of each type were washed of debris in a sink, depyrogenated at 320° C. for 1 hour, and filled with 20 mM Glycine solution brought to a pH=10 with NaOH. The vials were stoppered and capped. The vials were autoclaved for 2 hours at 121° C. and then placed into a convection oven at 50° C. for 10 days. Flakes were counted in the manner previously described herein. The results of that test are shown in Table 2 below.

TABLE 2

Delamination Test Results of Vials Formed From Composition A and Composition B

| Vial Type | Trial # | Number of Flakes larger than 50 μm | Delamination Factor |
|---|---|---|---|
| Composition A | 1 | 137 | 71 |
|  | 2 | 116 |  |
|  | 3 | 128 |  |
| Composition B | 1 | 1* | 1 |
|  | 2 | 0 |  |
|  | 3 | 1* |  |

Figure 13A:
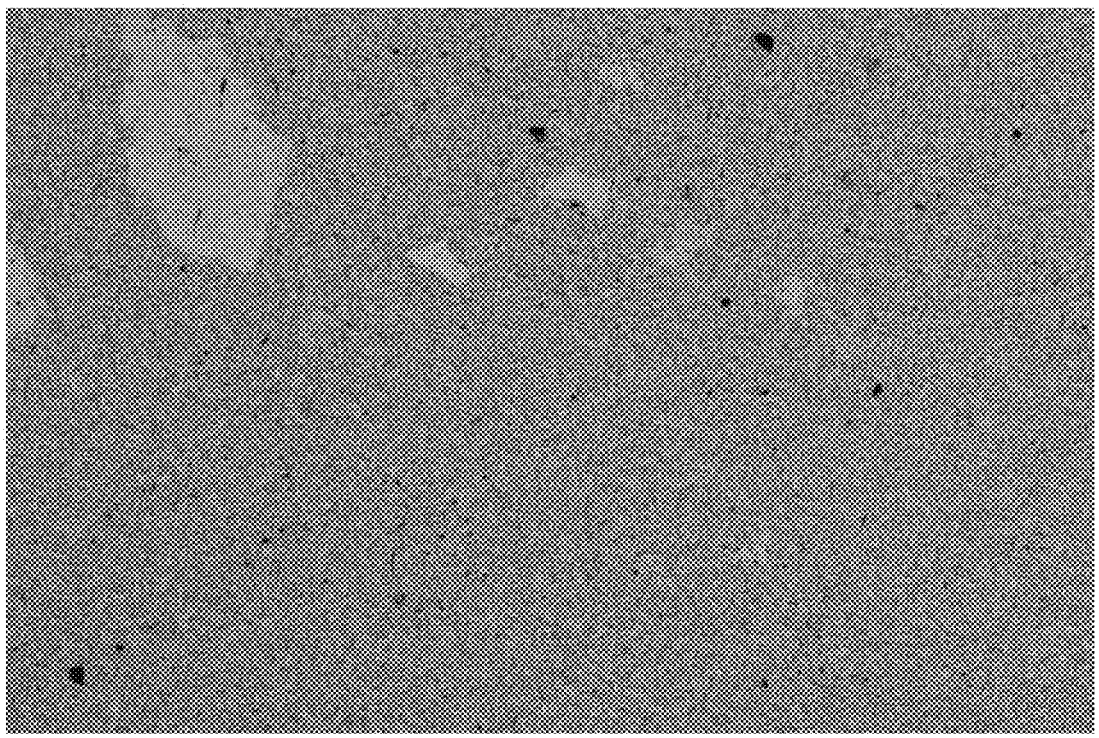
FIG. 13A is an optical micrograph of flakes developed during a delamination test for a glass vial formed from a glass composition prone to delamination.
Figure 13B:
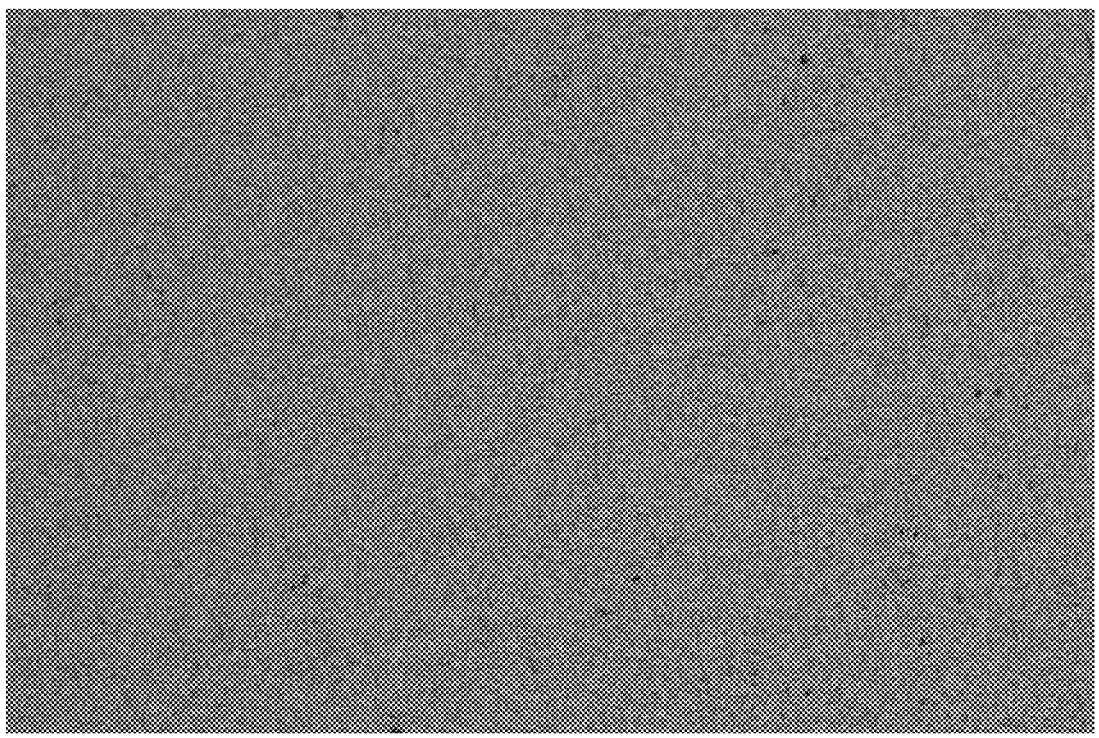
FIG. 13B is an optical micrograph of flakes developed during a delamination test for a glass vial formed from a glass composition resistant to delamination.

The results show that Composition B did not delaminate under the test conditions while Composition A did delaminate. Furthermore, in Composition B, the detected particles (indicated by * in Table 2) were just over 50 μm in length. It could not be clearly ascertained by optical microscopy if these detected particles were flakes or tramp particles. Accordingly, the particles were counted as flakes. Similar arguments could be made for one or two particles from Composition A. However, the large number of flakes consistently observed from the vials formed from Composition A indicates that the flakes primarily originate from delamination and are not tramp particles. Examples of the flakes observed for each composition are shown in FIGS. 13A (Composition A) and 13B (Composition B). In FIG. 13A there are flakes with shiny surfaces and black flakes which have rough surfaces, both of which are displayed on a mottled gray background. It is believed that the shiny surfaces of the flakes are indicative of the interior surface of the vial while the rough surfaces of the black flakes are most likely the underside of the shiny flakes. In FIG. 13B, the image is essentially of the surface of the filter medium used due to the lack of flakes shed from the surface of the vials formed from Composition B.

Example 6

Ion exchanged (IOX) vials prone to delamination were compared to ion exchanged vials that are not prone to delamination by forming a borosilicate glass composition (Composition A) and aluminosilicate glass composition (Composition B) into tubes, converting the tubes into vials, ion exchanging the vials, and subjecting the vials to accelerated delamination testing. Composition A included 75.9 mol. % $SiO_2$, 4.1 mol. % $Al_2O_3$, 10.5 mol. % $B_2O_3$, 6.6 mol. % $Na_2O$, 1.6 mol. % $K_2O$, 0.5 mol. % MgO, 0.6 mol. % CaO, and 0.1 mol. % Cl prior to ion exchange. Composition B included 76.8 mol. % $SiO_2$, 6.0 mol. % $Al_2O_3$, 11.6 mol. % $Na_2O$, 0.1 mol. % $K_2O$, 4.8 mol. % MgO, 0.5 mol. % CaO, and 0.2 mol. % $SnO_2$ prior to ion exchange. The melted compositions were formed into tubes directly from the melt and then subsequently converted into vials of approximately 3 mL size using industry standard converting equipment such as an AMBEG machine. The glass tubing had an outer diameter of approximately 17 mm and a wall thickness of approximately 1.1 mm. Conversion of the tubes was performed using exaggerated heating conditions while still maintaining the ability to form a quality vial. The vials formed from Composition A and Composition B were ion exchanged in a 100% $KNO_3$ salt bath from 3-10 hours at a temperature of 400-500° C. The vials were then subjected to the accelerated delamination test described herein. Thirty vials of each type were washed of debris in a sink, depyrogenated at 320° C. for 1 hour, and filled with 20 mM Glycine solution brought to a pH=10 with NaOH. The vials were stoppered and capped. The vials were autoclaved for 2 hours at 121° C. and then placed into a convection oven at 50° C. for 10 days. Flakes were counted in a manner previously described. The results of the test are shown in Table 3 below.

TABLE 3

Delamination Test Results of Ion Exchanged Vials formed from Composition A and Composition B

| Vial Type | Trial # | Number of Flakes larger than 50 μm | Delamination Factor |
|---|---|---|---|
| Composition A, IOX | 1 | 125 | 94 |
|  | 2 | 226 |  |
|  | 3 | 151 |  |
| Composition B, IOX | 1 | 1* | 1 |
|  | 2 | 1* |  |
|  | 3 | 0 |  |

Figure 14A:
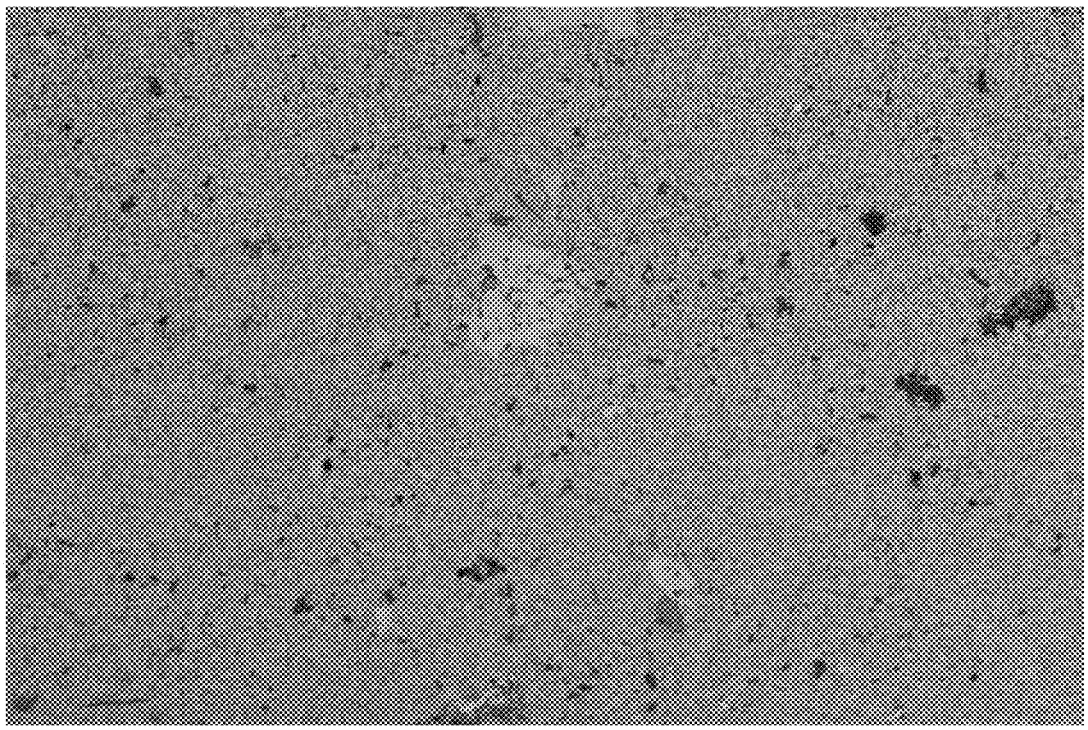
FIG. 14A is an optical micrograph of flakes developed during a delamination test for an ion exchanged glass vial formed from a glass composition prone to delamination.
Figure 14B:
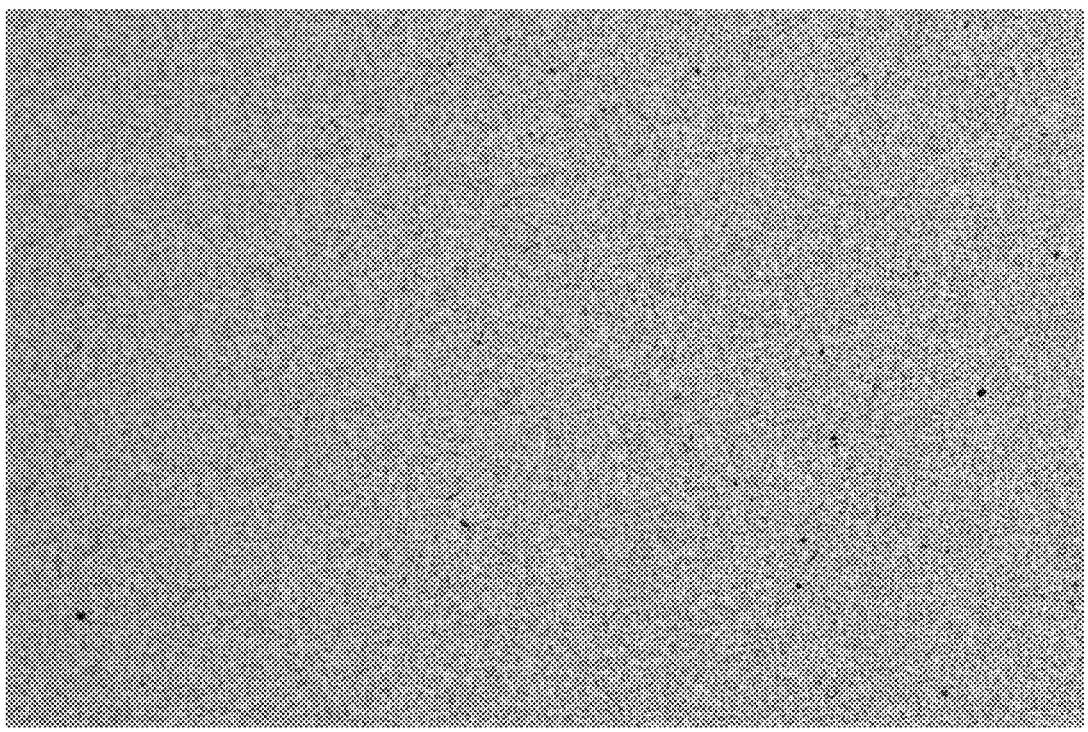
FIG. 14B is an optical micrograph of flakes developed during a delamination test for an ion exchanged glass vial formed from a glass composition resistant to delamination.

The results show that the ion exchanged vials formed from Composition B did not delaminate under the test conditions while the ion exchanged vials formed from Composition A did delaminate. Furthermore, for the ion exchanged vials formed from Composition B, the detected particles (indicated by * in Table 3) were just over 50 μm in length. It could not be clearly ascertained by optical microscopy whether these detected particles were flakes or tramp particles. Accordingly, these particles were counted as flakes. Similar arguments could be made for one or two particles from the ion exchanged vials formed from Composition A. However, the large number of flakes consistently observed from the ion exchanged vials formed from Composition A indicates that the flakes primarily originate from delamination and are not tramp particles. Examples of the flakes observed for each composition are shown in FIGS. 14A (Composition A) and 14B (Composition B). In FIG. 14A there are flakes with shiny surfaces that are smooth and black flakes which have rough surfaces, both of which are displayed on a mottled gray background. It is believed that the shiny surfaces of the flakes are indicative of the interior surface of the vial while the rough surfaces of the black flakes are most likely the underside of the shiny flakes. In FIG. 14B, the image is essentially of the surface of the filter medium used due to the lack of flakes shed from the surface of the ion exchanged vials formed from Composition B.

It should now be understood that the glass containers described herein have homogenous compositions through the thickness of the glass body as well as over the interior surfaces of the glass body. This homogeneity leads to a reduction in the propensity of the glass to delaminate after long term exposure to solutions. As such, the glass containers described herein are well suited for use as packaging materials for pharmaceutical applications.

It should also be understood that the glass containers and methods for forming glass containers described herein may be described in terms of a number of aspects. In a first aspect, a delamination resistant glass container may include a glass article having a glass body extending between an interior surface and an exterior surface and defining an interior volume. The glass article may also include an interior region extending from about 10 nm below the interior surface of the body into a thickness of the body with a persistent layer homogeneity such that the body is resistant to delamination.

In a second aspect, a delamination resistant glass container may include a glass article having a glass body extending between an interior surface and an exterior surface and defining an interior volume, the glass body having a delamination factor less than or equal to 10.

In a third aspect, a delamination resistant glass container may include a glass article having a glass body extending between an interior surface and an exterior surface and defining an interior volume. An interior region may extend from about 10 nm below the interior surface of the body into a thickness of the body and have a persistent layer homogeneity. The glass body may have a delamination factor less than or equal to 10.

In a fourth aspect, a delamination resistant glass container may include a glass article formed from an ion-exchangeable glass composition. The glass article may have a glass body extending between an interior surface and an exterior surface and defining an interior volume. An interior region may extend from about 10 nm below the interior surface of the body into a thickness of the body and have a thickness $T_{LR}$ of at least about 100 nm. An extrema in a layer concentration of each constituent component of the ion-exchangeable glass composition in the interior region may be greater than or equal to about 80% and less than or equal to about 120% of a bulk concentration of a same constituent component in the glass composition at a mid-point of the thickness of the glass body when the glass container is in an as-formed condition.

In a fifth aspect, a delamination resistant glass container may include a glass article having a glass body extending between an interior surface and an exterior surface and defining an interior volume. A surface region may extend over an entire interior surface of the glass container and have a depth extending from the interior surface of the glass container into a thickness of the body. The surface region may have a persistent surface homogeneity such that the glass body is resistant to delamination.

In a sixth aspect, a delamination resistant glass container may include a glass article having a glass body extending between an interior surface and an exterior surface and defining an interior volume. A surface region may extend over an entire interior surface of the glass container and have a depth extending from the interior surface of the glass container into a thickness of the body. The surface region may have a persistent surface homogeneity. The glass body may have a delamination factor less than or equal to 10.

In a seventh aspect, a delamination resistant glass container may include a glass article formed from an ion-exchangeable glass composition. The glass article may have a glass body extending between an interior surface and an exterior surface and defining an interior volume. A surface region may extend over an entire interior surface of the glass container to a depth of about 10 nm from the interior surface of the glass container. For a discrete point on the interior surface of the glass container, an extrema of a surface concentration of each constituent component in the surface region at the discrete point may be greater than or equal to about 70% and less than or equal to about 130% of a same constituent component in the surface region at any second discrete point on the interior surface of the glass container when the glass container is in an as-formed condition.

In an eighth aspect, a delamination resistant glass container may include a glass article having a body extending between an interior surface and an exterior surface. The body may include a wall portion that transitions to a floor portion through a heel portion. The body may also include an interior region in at least the heel portion of the body which extends from about 10 nm below the interior surface of the body into a thickness of the body. The interior region may have a persistent layer homogeneity such that the body is resistant to delamination.

In a ninth aspect, a delamination resistant glass container may include a glass article having a body extending between an interior surface and an exterior surface and comprising a wall portion that transitions to a floor portion through a heel portion. A surface region may extend over at least a surface of the heel portion and have a depth extending from the interior surface of the glass container into a thickness of the body. The surface region may have a persistent surface homogeneity such that at least the heel portion is resistant to delamination.

A tenth aspect includes the glass container of any of the first through ninth aspects wherein the glass article is formed from a glass composition which has a 1000 poise temperature of less than or equal to about 1700° C.

An eleventh aspect includes the glass container of any of the first through tenth aspects wherein the glass article is formed from a glass composition which is ion-exchangeable.

A twelfth aspect includes the glass container of any of the first through eleventh aspects wherein the interior region of the glass container with persistent layer homogeneity has a thickness $T_{LR}$ of at least about 100 nm. In embodiments, the thickness $T_{LR}$ may be at least about 200 nm, at least about 350 nm, or even at least about 500 nm.

A thirteenth aspect includes the glass container of any of the first through twelfth aspects wherein the glass article is formed from a glass composition that comprises less than or equal to about 1.0 mol. % of oxides of boron and less than or equal to about 1.0 mol. % of compounds containing boron.

A fourteenth aspect includes the glass container of any of the first through thirteenth aspects wherein the glass article is formed from a glass composition that comprises less than or equal to about 0.3 mol. % of oxides of boron and less than or equal to about 0.3 mol. % of compounds containing boron.

A fifteenth aspect includes the glass container of any of the first through fourteenth aspects wherein the glass article is formed from a glass composition that is substantially free from boron and compounds containing boron.

A sixteenth aspect includes the glass container of any of the first through fifteenth aspects wherein the glass article is formed from a glass composition that comprises less than or equal to about 0.3 mol. % of oxides of phosphorous or less than or equal to about 0.3 mol. % of compounds containing phosphorous.

A seventeenth aspect includes the glass container of any of the first through sixteenth aspects wherein the glass article is formed from a glass composition that is substantially free of phosphorous and compounds containing phosphorous.

An eighteenth aspect includes the glass container of any of the first through seventeenth aspects wherein the glass article is formed from a glass composition that comprises less than or equal to about 0.5 mol. % of oxides of zinc or less than or equal to about 0.5 mol. % of compounds containing zinc.

A nineteenth aspect includes the glass container of any of the first through eighteenth aspects wherein the glass article is formed from a glass composition that is substantially free of zinc and compounds containing zinc.

A twentieth aspect includes the glass container of any of the first through nineteenth aspects wherein the glass article is formed from a glass composition that comprises less than or equal to about 0.5 mol. % each of, chlorine, fluorine, oxides of tin, compounds containing tin, compounds containing chlorine, or compounds containing fluorine.

A twenty first aspect includes the glass container of any of the first through twentieth aspects wherein the glass article is formed from a glass composition that is substantially free from species which significantly volatilize at temperatures that correspond to the glass composition having a viscosity in a range from about 200 poise to about 100 kilopoise.

A twenty second aspect includes the glass container of any of the first through twenty first aspects wherein the glass container is ion-exchange strengthened.

A twenty third aspect includes the glass container of any of the first through twenty second aspects wherein the glass container comprises a compressive stress greater than or equal to about 300 MPa and a depth of layer greater than or equal to about 10 μm.

A twenty fourth aspect includes the glass container of any of the first through twenty second aspects wherein the glass container has an ISO Standard 720 hydrolytic resistance of type HGA2 or better.

A twenty fifth aspect includes the glass container of any of the first through twenty fourth aspects wherein the glass container has an ISO Standard 719 hydrolytic resistance of type HGB2 or better.

A twenty sixth aspect includes the glass container of any of the first through fourth and eighth through twenty fifth aspects wherein the body further comprises a surface region extending over the interior surface of the glass container to a depth from about 10 nm to about 50 nm from the interior surface of the glass container; and the surface region has a persistent surface homogeneity such that the glass body is resistant to delamination.

A twenty seventh aspect includes the glass container of any of the first through twenty sixth aspects wherein the glass body has a delamination factor less than or equal to 10.

A twenty eighth aspect includes the glass container of any of the first through twenty seventh aspects wherein the glass body has a delamination factor less than or equal to 1.

A twenty ninth aspect includes the glass container of any of the first through fourth and eighth through twenty eighth aspects wherein the body further comprises a surface region extending over the interior surface of the glass container to a depth from about 10 nm to about 50 nm from the interior surface of the glass container; and for a discrete point on the interior surface of the glass container, an extrema of a surface concentration of each constituent component of the glass in the surface region at the discrete point is greater than or equal to about 70% and less than or equal to about 130% of a same constituent component in the surface region at any second discrete point on the interior surface of the glass container when the glass container is in an as-formed condition.

A thirtieth aspect includes the glass container of any of the first through twenty ninth aspects wherein an extrema in a layer concentration of each constituent component in the interior region is greater than or equal to about 90% and less than or equal to about 110% of a bulk concentration of a same constituent component at a mid-point of the thickness of the glass body when the glass container is in an as-formed condition.

A thirty first aspect includes the glass container of any of the first through thirtieth aspects, wherein the glass article is formed from a glass composition which comprises at least one alkali oxide constituent.

A thirty second aspect includes the glass container of any of the first through thirty first aspects, wherein the glass article is formed from a glass composition which comprises at least one alkaline earth oxide constituent.

A thirty third aspect includes the glass container of any of the seventh through thirty second aspects wherein a depth of the surface region is at least about 10 nm. In some embodiments, the depth of the surface region may be at least about 50 nm.

A thirty fourth aspect includes the glass container of the thirty third aspect further comprising an interior region extending from about 10 nm below the interior surface of the body into a thickness of the body and having a persistent layer homogeneity such that the body is resistant to delamination.

A thirty fifth aspect includes the glass container of any of the thirty third or thirty fourth aspects, wherein for a discrete point on the interior surface of the glass container, an extrema of a surface concentration of each constituent component of the glass in the surface region at the discrete point is greater than or equal to about 75% and less than or equal to about 125% of a same constituent component in the surface region at any second discrete point on the interior surface of the glass container when the glass container is in an as-formed condition.

In a thirty sixth aspect, a method for forming a delamination resistant glass container includes providing stock material formed from a delamination resistant glass composition; and shaping stock material into a glass article having a glass body extending between an interior surface and an exterior surface and defining an interior volume such that the glass body has an interior region extending from about 10 nm below the interior surface of the body into a thickness of the body, the interior region having a persistent layer homogeneity such that the glass body is resistant to delamination.

In a thirty seventh aspect, a method for forming a delamination resistant glass container includes providing stock material formed from a delamination resistant glass composition; and shaping the stock material into a glass article having a glass body extending between an interior surface and an exterior surface and defining an interior volume such that the glass body has a surface region extending over an entire interior surface of the body, the surface region having a depth extending from the interior surface of the body into a thickness of the body and a persistent surface homogeneity such that the body is resistant to delamination.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A delamination resistant glass container comprising:
a glass article having a glass body extending between an interior surface and an exterior surface and defining an interior volume, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
an interior region extending from about 10 nm below the interior surface of the glass body into a thickness of the glass body and having a persistent layer homogeneity such that the glass body is resistant to delamination and an extrema in the concentration of each constituent component of the aluminosilicate glass in the interior region is greater than or equal to about 80% and less than or equal to about 120% of a bulk concentration of the same constituent component at a mid-point of the thickness of the glass body when the glass container is in an as-formed condition.

2. The glass container of claim 1, wherein the glass article is formed from a glass composition which has a 1000 poise temperature of less than or equal to about 1700° C.

3. The glass container of claim 1, wherein the glass article is formed from a glass composition which is ion-exchangeable.

4. The glass container of claim 1, wherein the interior region has a thickness $T_{LR}$ of at least about 100 nm.

5. The glass container of claim 1, wherein the interior region has a thickness $T_{LR}$ of at least about 200 nm.

6. The glass container of claim 1, wherein the interior region has a thickness $T_{LR}$ of at least about 350 nm.

7. The glass container of claim 1, wherein the interior region has a thickness $T_{LR}$ of at least about 500 nm.

8. The glass container of claim 1, wherein the glass article is formed from a glass composition that comprises less than or equal to about 0.3 mol. % of oxides of boron and less than or equal to about 0.3 mol. % of compounds containing boron.

9. The glass container of claim 1, wherein the glass article is formed from a glass composition that is substantially free from boron and compounds containing boron.

10. The glass container of claim 1, wherein the glass article is formed from a glass composition that comprises less than or equal to about 0.3 mol. % of oxides of phosphorous or less than or equal to about 0.3 mol. % of compounds containing phosphorous.

11. The glass container of claim 1, wherein the glass article is formed from a glass composition that is substantially free of phosphorous and compounds containing phosphorous.

12. The glass container of claim 1, wherein the glass article is formed from a glass composition that comprises less than or equal to about 0.5 mol. % of oxides of zinc or less than or equal to about 0.5 mol. % of compounds containing zinc.

13. The glass container of claim 1, wherein the glass article is formed from a glass composition that is substantially free of zinc and compounds containing zinc.

14. The glass container of claim 1, wherein the glass article is formed from a glass composition that comprises less than or equal to about 0.5 mol. % each of, chlorine, fluorine, oxides of tin, compounds containing tin, compounds containing chlorine, or compounds containing fluorine.

15. The glass container of claim 1, wherein the glass article is formed from a glass composition that is substantially free from species which significantly volatilize at temperatures at which the glass composition has a viscosity in a range from about 200 poise to about 100 kilopoise.

16. The glass container of claim 1, wherein the glass container is ion-exchange strengthened.

17. The glass container of claim 1, wherein the glass container comprises a compressive stress greater than or equal to about 300 MPa and a depth of layer greater than or equal to about 10 µm.

18. The glass container of claim 1, wherein the glass container has an ISO Standard 719 hydrolytic resistance of type HGB2 or better.

19. The glass container of claim 1, wherein:
the glass body further comprises a surface region extending over the interior surface of the glass container to a depth from about 10 nm to about 50 nm from the interior surface of the glass container; and
the surface region has a persistent surface homogeneity such that the glass body is resistant to delamination and for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition.

20. The glass container of claim 19, wherein the glass body has a delamination factor less than or equal to 10.

21. The glass container of claim 19, wherein the glass body has a delamination factor less than or equal to 1.

22. The glass container of claim 1, wherein an extrema in the concentration of each constituent component in the interior region is greater than or equal to about 90% and less than or equal to about 110% of a bulk concentration of the same constituent component at a mid-point of the thickness of the glass body when the glass container is in an as-formed condition.

23. The glass container of claim 1, wherein the glass article is formed from a glass composition which comprises at least one alkali oxide constituent.

24. The glass container of claim 1, wherein the glass body has a delamination factor less than or equal to 10.

25. The glass container of claim 1, wherein the glass container is a pharmaceutical package for containing a pharmaceutical formulation.

26. The glass container of claim 1, wherein the glass article is formed from a glass composition that comprises $Na_2O$ in an amount greater than or equal to about 9 mol. % and less than or equal to about 13 mol. %.

27. The glass container of claim 1, wherein the glass article is formed from a glass composition that comprises $K_2O$ in an amount greater than or equal to about 0.01 mol. % and less than or equal to about 2.0 mol. %.

28. The glass container of claim 1, wherein the glass article is formed from a glass composition that comprises $K_2O$ in an amount greater than or equal to about 0.01 mol. % and less than or equal to about 1.0 mol. %.

29. The glass container of claim 1, wherein the glass article is formed from a glass composition that comprises:
$B_2O_3$ in an amount less than or equal to about 0.5 mol. %; and
alkali oxide in an amount greater than 8 mol. %.

30. The glass container of claim 1, wherein the glass article is formed from a glass composition that comprises:
$B_2O_3$ in an amount less than or equal to about 0.5 mol. %; and
$Na_2O$ in an amount greater than or equal to about 8 mol. %.

31. The glass container of claim 1, wherein the glass article is formed from a glass composition that comprises X mol. % of $Al_2O_3$ and Y mol. % of alkali oxides, wherein a ratio Y:X is greater than 0.9.

32. The glass container of claim 1, wherein the glass article is formed from a glass composition that comprises:
$SiO_2$ in an amount greater than or equal to about 67 mol. % and less than or equal to about 78 mol. %; and
alkali oxide in an amount greater than 8 mol. %.

33. The glass container of claim 1, wherein the glass article is formed from a glass composition that comprises:
$SiO_2$ in an amount greater than or equal to about 67 mol. % and less than or equal to about 78 mol. %; and
$Na_2O$ in an amount greater than or equal to about 8 mol. %.

34. The glass container of claim 1, wherein the glass article is formed from a glass composition that comprises:
$SiO_2$ in an amount greater than or equal to about 67 mol. % and less than or equal to about 78 mol. %; and
X mol. % of $Al_2O_3$ and Y mol. % of alkali oxides, wherein a ratio Y:X is greater than 0.9.

35. The glass container of claim 1, wherein the glass article is formed from a glass composition that comprises alkali oxides in an amount greater than or equal to about 9 mol. % and less than or equal to about 14 mol. %.

36. The glass container of claim 1, wherein the glass article is formed from a glass composition that comprises greater than or equal to 6 mol. % $Al_2O_3$.

37. A delamination resistant glass container comprising:
a glass article having a glass body extending between an interior surface and an exterior surface and defining an interior volume, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
an interior region extending from about 10 nm below the interior surface of the glass body into a thickness of the glass body and having a persistent layer homogeneity such that an extrema in the concentration of each constituent component of the aluminosilicate glass in the interior region is greater than or equal to about 80% and less than or equal to about 120% of a bulk concentration of the same constituent component at a mid-point of the thickness of the glass body when the glass container is in an as-formed condition; and
the glass body has a delamination factor less than or equal to 10.

38. The glass container of claim 37, wherein the glass container is a pharmaceutical package for containing a pharmaceutical formulation.

39. A delamination resistant glass container comprising:
a glass article formed from an ion-exchangeable aluminosilicate glass composition having a Class HGA1 hydrolytic resistance when tested according to the ISO 720 testing standard, the glass article having a glass body extending between an interior surface and an exterior surface and defining an interior volume and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
an interior region extending from about 10 nm below the interior surface of the glass body into a thickness of the glass body and having a thickness $T_{LR}$ of at least about 100 nm, wherein an extrema in the concentration of each constituent component of the ion-exchangeable glass composition in the interior region is greater than or equal to about 80% and less than or equal to about 120% of a bulk concentration of the same constituent component at a mid-point of the thickness of the glass body when the glass container is in an as-formed condition.

40. The delamination resistant glass container of claim 39, wherein the glass body has a delamination factor less than or equal to 10.

41. The glass container of claim 39, wherein the glass container is a pharmaceutical package for containing a pharmaceutical formulation.

42. A delamination resistant glass container comprising:
a glass article having a glass body extending between an interior surface and an exterior surface and defining an interior volume, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
a surface region extending over the entire interior surface of the glass container and having a depth extending from the interior surface of the glass container into a thickness of the glass body, the surface region having a persistent surface homogeneity such that the glass body is resistant to delamination and for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition.

43. The glass container of claim 42, wherein a depth of the surface region is at least about 10 nm.

44. The glass container of claim 42, wherein a depth of the surface region is at least about 50 nm.

45. The glass container of claim 42, wherein the glass body has a delamination factor less than or equal to 1.

46. The glass container of claim 42, further comprising an interior region extending from about 10 nm below the interior surface of the glass body into a thickness of the glass body and having a persistent layer homogeneity such that the glass body is resistant to delamination and an extrema in the concentration of each constituent component in the interior region is greater than or equal to about 80% and less than or equal to about 120% of a bulk concentration of the same constituent component at a mid-point of the thickness of the glass body when the glass container is in an as-formed condition.

47. The glass container of claim 42, wherein for a discrete point on the interior surface of the glass container, an extrema of the concentration of each constituent component of the glass in the surface region at the discrete point is greater than or equal to about 75% and less than or equal to about 125% of the same constituent component in the surface region at any second discrete point on the interior surface of the glass container when the glass container is in an as-formed condition.

48. The glass container of claim 42, wherein the glass article is formed from a glass composition that comprises less than or equal to about 0.3 mol. % of oxides of boron and less than or equal to about 0.3 mol. % of compounds containing boron.

49. The glass container of claim 42, wherein the glass article is formed from a glass composition that is substantially free from boron and compounds containing boron.

50. The glass container of claim 42, wherein the glass article is formed from a glass composition that comprises less than or equal to about 0.3 mol. % of oxides of phosphorous or less than or equal to about 0.3 mol. % of compounds containing phosphorous.

51. The glass container of claim 42, wherein the glass article is formed from a glass composition that is substantially free of phosphorous and compounds containing phosphorous.

52. The glass container of claim 42, wherein the glass article is formed from a glass composition that comprises less than or equal to about 0.5 mol. % of oxides of zinc or less than or equal to about 0.5 mol. % of compounds containing zinc.

53. The glass container of claim 42, wherein the glass article is formed from a glass composition that is substantially free of zinc and compounds containing zinc.

54. The glass container of claim 42, wherein the glass article is formed from a glass composition that comprises less than or equal to about 0.5 mol. % each of, chlorine, fluorine, oxides of tin, compounds containing tin, compounds containing chlorine, or compounds containing fluorine.

55. The glass container of claim 42, wherein the glass article is formed from a glass composition that is substantially free from species which significantly volatilize at temperatures at which the glass composition has a viscosity in a range from about 200 poise to about 100 kilopoise.

56. The glass container of claim 42, wherein the glass container is ion-exchange strengthened.

57. The glass container of claim 42, wherein the glass article is formed from a glass composition which is ion-exchangeable.

58. The glass container of claim 42, wherein the glass container comprises a compressive stress greater than or equal to about 300 MPa and a depth of layer greater than or equal to about 10 μm.

59. The glass container of claim 42, wherein the glass container has an ISO Standard 719 hydrolytic resistance of type HGB2 or better.

60. The glass container of claim 42, wherein the glass container is a pharmaceutical package for containing a pharmaceutical formulation.

61. A delamination resistant glass container comprising:
a glass article having a glass body extending between an interior surface and an exterior surface and defining an interior volume, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
a surface region extending over the entire interior surface of the glass container and having a depth extending from the interior surface of the glass container into a thickness of the glass body, the surface region having a persistent surface homogeneity such that for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition; and
the glass body has a delamination factor less than or equal to 10.

62. The glass container of claim 61, wherein the glass container is a pharmaceutical package for containing a pharmaceutical formulation.

63. A delamination resistant glass container comprising:
a glass article formed from an ion-exchangeable aluminosilicate glass composition having a Class HGA1 hydrolytic resistance when tested according to the ISO 720 testing standard, the glass article having a glass body extending between an interior surface and an exterior surface and defining an interior volume and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
a surface region extending over the entire interior surface of the glass container to a depth of about 10 nm from the interior surface of the glass container, wherein, for a discrete point on the interior surface of the glass container, an extrema of the concentration of each constituent component in the surface region at the discrete point is greater than or equal to about 70% and less than or equal to about 130% of the same constituent component in the surface region at any second discrete point on the interior surface of the glass container when the glass container is in an as-formed condition.

64. The glass container of claim 63, wherein the glass container has an ISO Standard 719 hydrolytic resistance of type HGB2 or better.

65. The glass container of claim 63, wherein the glass body has a delamination factor less than or equal to 10.

66. The glass container of claim 63, wherein the glass container is a pharmaceutical package for containing a pharmaceutical formulation.

67. A delamination resistant glass container comprising:
a glass article having a glass body extending between an interior surface and an exterior surface, the glass body comprising a wall portion that transitions to a floor portion through a heel portion, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
an interior region in at least the heel portion of the glass body, the interior region extending from about 10 nm below the interior surface of the glass body into a thickness of the glass body and having a persistent layer homogeneity such that the glass body is resistant to delamination and an extrema in the concentration of each constituent component of the aluminosilicate glass in the interior region is greater than or equal to about 80% and less than or equal to about 120% of a bulk concentration of the same constituent component at a mid-point of the thickness of the glass body when the glass container is in an as-formed condition.

68. The glass container of claim 67, wherein the glass container is a pharmaceutical package for containing a pharmaceutical formulation.

69. A delamination resistant glass container comprising:
a glass article having a glass body extending between an interior surface and an exterior surface and comprising a wall portion that transitions to a floor portion through a heel portion, the glass body formed from an aluminosilicate glass having a Class HGA1 hydrolytic resistance when tested according to the ISO 720 testing standard and comprising:
greater than 5 mol. % $Al_2O_3$;
$B_2O_3$ in an amount less than or equal to 0.5 mol. %; and
alkaline earth oxides in an amount from 5 mol. % to 8 mol. %; and
a surface region extending over at least a surface of the heel portion and having a depth extending from the interior surface of the glass container into a thickness of the body, the surface region having a persistent surface homogeneity such that at least the heel portion is resistant to delamination and for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition.

70. The glass container of claim 69, wherein the glass container is a pharmaceutical package for containing a pharmaceutical formulation.

71. A method for forming a delamination resistant glass container comprising:
providing stock material formed from a delamination resistant aluminosilicate glass composition having a Class HGA1 hydrolytic resistance when tested according to the ISO 720 testing standard, the aluminosilicate glass comprising:
greater than 5 mol. % $Al_2O_3$;
$B_2O_3$ in an amount less than or equal to 0.5 mol. %; and
alkaline earth oxides in an amount from 5 mol. % to 8 mol. %; and
shaping the stock material into a glass article having a glass body extending between an interior surface and an exterior surface and defining an interior volume such that the glass body has an interior region extending from about 10 nm below the interior surface of the glass body into a thickness of the glass body, the interior region having a persistent layer homogeneity such that the glass body is resistant to delamination and an extrema in the concentration of each constituent component of the aluminosilicate glass in the interior region is greater than or equal to about 80% and less than or equal to about 120% of a bulk concentration of the same constituent component at a mid-point of the thickness of the glass body when the glass container is in an as-formed condition.

72. The method of claim 71, wherein the interior region has a thickness $T_{LR}$ of at least about 100 nm.

73. The method of claim 71, wherein the interior region has a thickness $T_{LR}$ of at least about 200 nm.

74. The method of claim 71, wherein the interior region has a thickness $T_{LR}$ of at least about 350 nm.

75. The method of claim 71, wherein the interior region has a thickness $T_{LR}$ of at least about 500 nm.

76. The method of claim 71, wherein the glass body has a delamination factor less than or equal to 10.

77. The method of claim 71, wherein the stock material is shaped such that the glass body further comprises a surface region extending over the entire interior surface of the glass body to a depth of about 10 nm from the interior surface of the glass body and the surface region has a persistent surface homogeneity such that the glass body is resistant to delamination and that for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition.

78. The method of claim 71, further comprising ion exchange strengthening the glass article.

79. A method for forming a delamination resistant glass container comprising:
providing stock material formed from a delamination resistant aluminosilicate glass composition having a Class HGA1 hydrolytic resistance when tested according to the ISO 720 testing standard, the aluminosilicate glass comprising:
greater than 5 mol. % $Al_2O_3$;
$B_2O_3$ in an amount less than or equal to 0.5 mol. %; and
alkaline earth oxides in an amount from 5 mol. % to 8 mol. %; and
shaping the stock material into a glass article having a glass body extending between an interior surface and an exterior surface and defining an interior volume such that the glass body has a surface region extending over the entire interior surface of the glass body, the surface region having a depth extending from the interior surface of the glass body into a thickness of the glass body and the surface region has a persistent surface homogeneity such that the glass body is resistant to delamination and that for a discrete point on the interior surface of the glass container, an extrema of the concentration of each constituent component of the aluminosilicate glass in the surface region at the discrete point is greater than or equal to about 70% and less than or equal to about 130% of the same constituent component in the surface region at any second discrete point on the interior surface of the glass container when the glass container is in an as-formed condition.

80. The method of claim 79, wherein a depth of the surface region is at least about 10 nm.

81. The method of claim 79, wherein the glass body has a delamination factor less than or equal to 10.

82. The method of claim 79, wherein the stock material is shaped such that the glass body further comprises an interior region extending from about 10 nm below the interior surface of the glass body into a thickness of the glass body, the interior region having a persistent layer homogeneity such that the glass body is resistant to delamination and an extrema in the concentration of each constituent component in the interior region is greater than or equal to about 80% and less than or equal to about 120% of a bulk concentration of the same constituent component at a mid-point of the thickness of the glass body when the glass container is in an as-formed condition.

\* \* \* \* \*

UNITED STATES PATENT AND TRADEMARK OFFICE
CERTIFICATE OF CORRECTION

PATENT NO. : 9,988,174 B2
APPLICATION NO. : 13/912457
DATED : June 5, 2018
INVENTOR(S) : Kaveh Adib et al.

Page 1 of 1

It is certified that error appears in the above-identified patent and that said Letters Patent is hereby corrected as shown below:

On the Title Page

In Column 2, item (74), Attorney, Line 1, delete "Dinsmore & Shol LLP" and insert -- Dinsmore & Shohl LLP --, therefor.

On page 4, Column 2, item (56), other publications, Line 36, delete "Offce" and insert -- Office --, therefor.

Signed and Sealed this
Thirty-first Day of March, 2020

Andrei Iancu
*Director of the United States Patent and Trademark Office*